United States Patent
Marty et al.

(10) Patent No.: US 11,836,929 B2
(45) Date of Patent: Dec. 5, 2023

(54) SYSTEMS AND METHODS FOR DETERMINING TRAJECTORIES OF BASKETBALL SHOTS FOR DISPLAY

(71) Applicant: Pillar Vision, Inc., Menlo Park, AL (US)

(72) Inventors: Alan W. Marty, Menlo Park, CA (US); Thomas A. Edwards, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 17/328,546

(22) Filed: May 24, 2021

(65) Prior Publication Data

US 2022/0122269 A1 Apr. 21, 2022

Related U.S. Application Data

(63) Continuation of application No. 16/433,428, filed on Jun. 6, 2019, now Pat. No. 11,049,258, which is a
(Continued)

(51) Int. Cl.
| | |
|---|---|
| A63B 24/00 | (2006.01) |
| G06T 7/20 | (2017.01) |
| A63B 71/06 | (2006.01) |
| A63B 69/00 | (2006.01) |
| G06T 7/70 | (2017.01) |

(Continued)

(52) U.S. Cl.
CPC ............ G06T 7/20 (2013.01); A63B 24/0003 (2013.01); A63B 24/0021 (2013.01); A63B 69/00 (2013.01); A63B 71/0605 (2013.01); G06T 7/285 (2017.01); G06T 7/70 (2017.01); H04N 23/80 (2023.01); A63B 69/0071 (2013.01); A63B 69/38 (2013.01); A63B 2024/0034 (2013.01); A63B 2220/806 (2013.01); G06T 2207/10021 (2013.01);
(Continued)

(58) Field of Classification Search
None
See application file for complete search history.

(56) References Cited

U.S. PATENT DOCUMENTS

| | | | |
|---|---|---|---|
| 7,264,554 B2 * | 9/2007 | Bentley | A63F 13/213 473/409 |
| 7,854,669 B2 | 12/2010 | Marty | |

(Continued)

*Primary Examiner* — Jay Trent Liddle
(74) *Attorney, Agent, or Firm* — Butler Snow LLP; Jon E. Holland

(57) ABSTRACT

Methods and apparatus relating to predicting outcome in a sporting environment are described. The methods and apparatus are used to relate trajectory performance of an object to body motions and body orientation associated with a generating the trajectory of the object. When equipment is utilized to generate the trajectory of an object, than the effects of equipment motions and equipment orientation can be also related to trajectory performance. The method and apparatus can be used to predict body motions and body orientations that increase the likelihood of achieving a desired outcome including specifying optimum motions and orientations for a particular individual. The method and apparatus may be used in training, coaching and broadcasting environments.

10 Claims, 29 Drawing Sheets

Related U.S. Application Data continuation of application No. 12/127,744, filed on May 27, 2008, now Pat. No. 10,360,685.

(60) Provisional application No. 60/931,950, filed on May 24, 2007.

(51) Int. Cl.
  *G06T 7/285* (2017.01)
  *H04N 23/80* (2023.01)
  *A63B 69/38* (2006.01)

(52) U.S. Cl.
  CPC ............... *G06T 2207/30196* (2013.01); *G06T 2207/30224* (2013.01); *G06T 2207/30241* (2013.01)

(56) References Cited

U.S. PATENT DOCUMENTS

| | | |
|---|---|---|
| 10,360,685 B2 | 7/2019 | Marty |
| 10,471,325 B2 | 11/2019 | Marty |
| 2003/0073518 A1 | 4/2003 | Marty |
| 2007/0167247 A1 | 7/2007 | Lindsay |
| 2008/0312010 A1 | 12/2008 | Marty et al. |
| 2020/0098113 A1 | 3/2020 | Marty |

\* cited by examiner

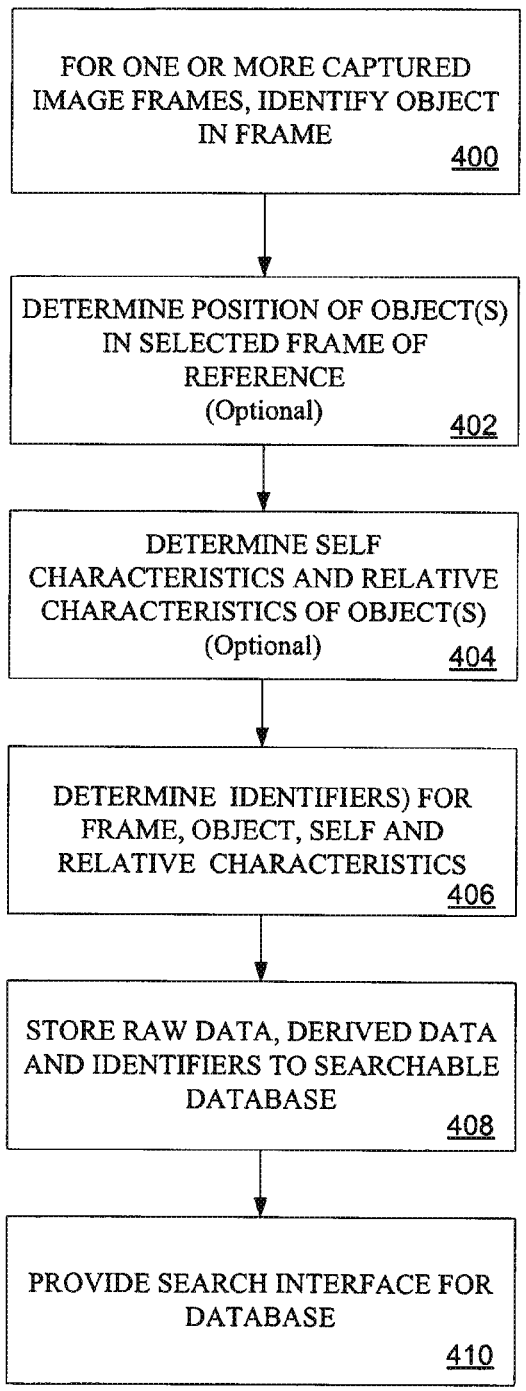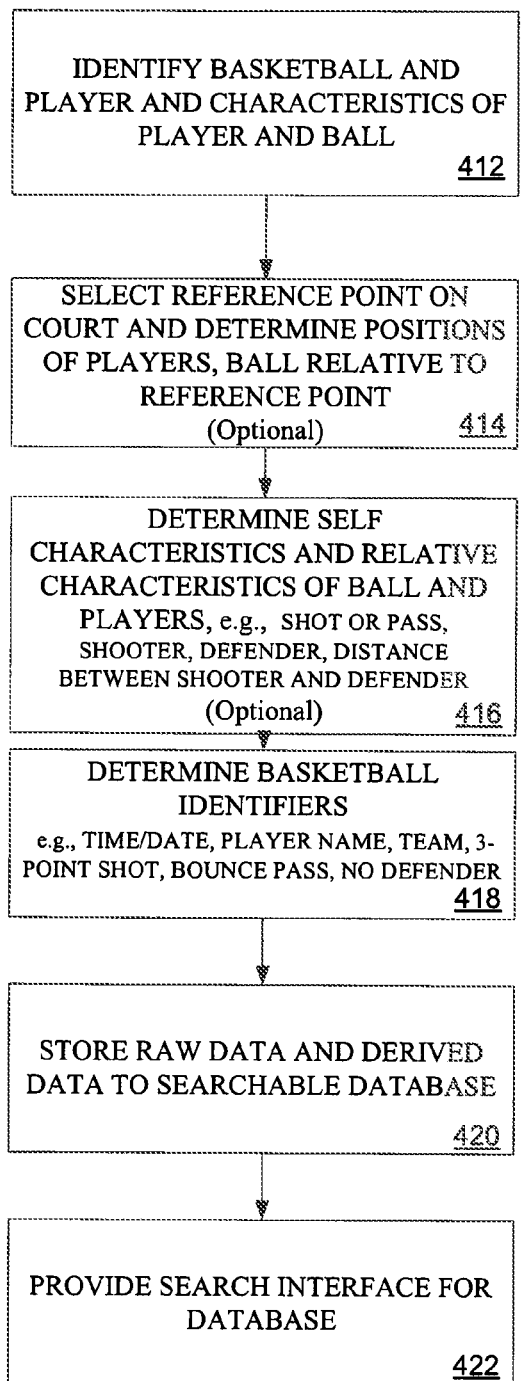
FIG. 7A                    FIG. 7B

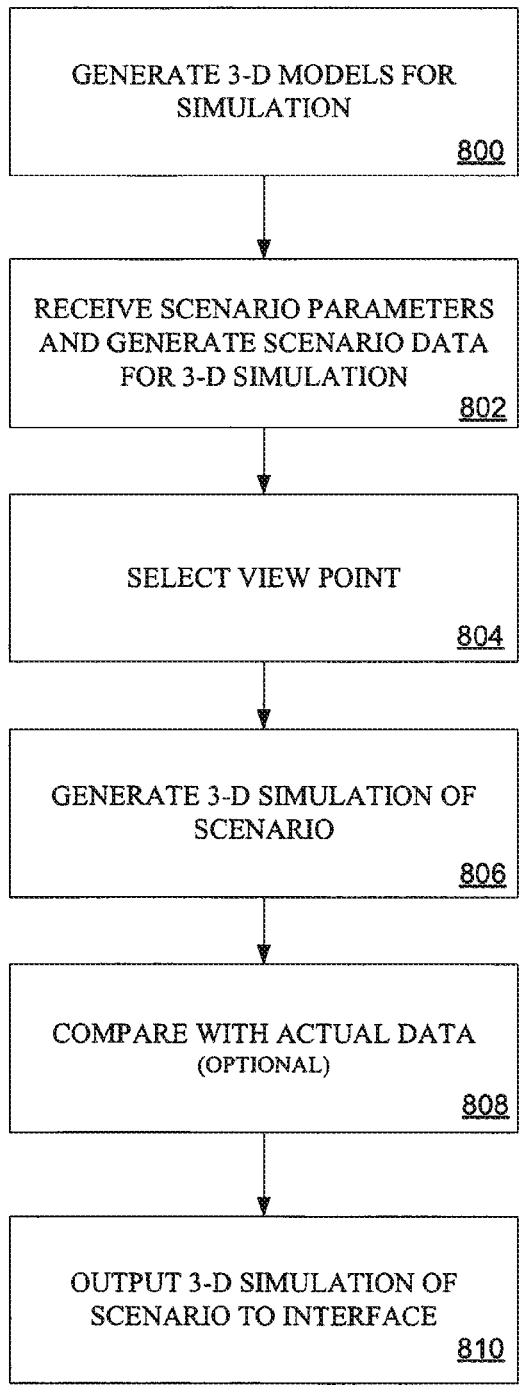
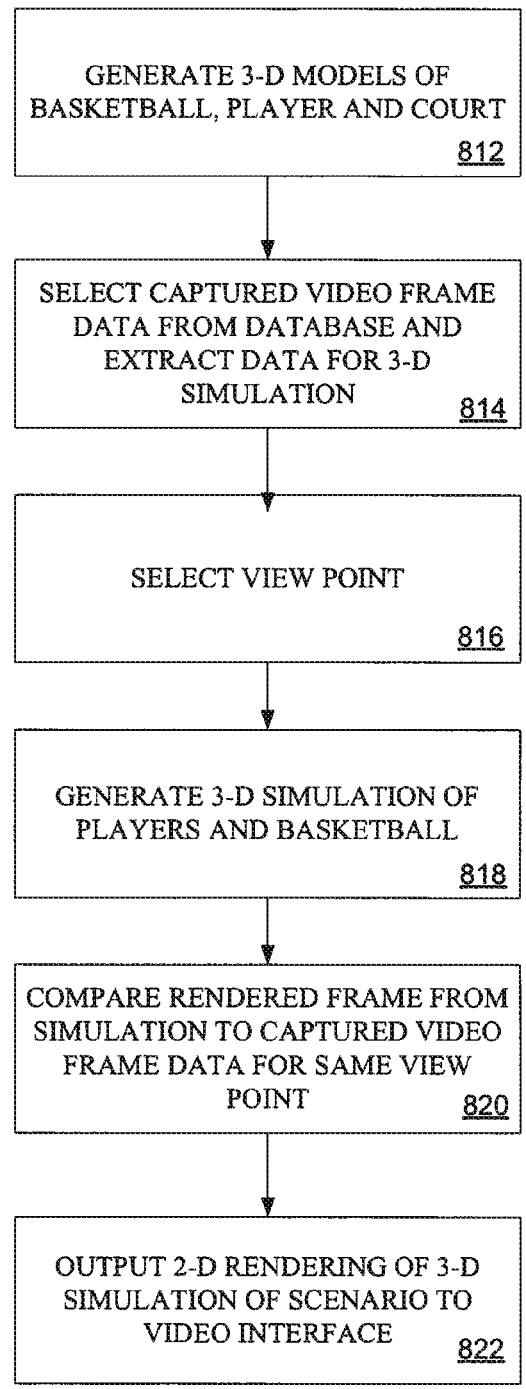
FIG. 10A
FIG. 10B

Coordinate system

SYSTEMS AND METHODS FOR DETERMINING TRAJECTORIES OF BASKETBALL SHOTS FOR DISPLAY

RELATED APPLICATION DATA

This application is a continuation of U.S. application Ser. No. 16/433,428, filed Jun. 6, 2019, entitled, "Stereoscopic Image Capture with Performance Outcome Prediction in Sporting Environments," which is incorporated herein by reference in its entirety and for all purposes. U.S. application Ser. No. 16/433,428 claims priority to U.S. Pat. No. 10,360,685, filed on May 27, 2008, entitled, "Stereoscopic Image Capture With Performance Outcome Prediction in Sporting Environments," which is incorporated herein by reference in its entirety and for all purposes. U.S. Pat. No. 10,360,685 claims priority to U.S. Provisional Patent Application No. 60/931,950, filed on May 24, 2007, entitled "STEREOSCOPIC IMAGE CAPTURE WITH PERFORMANCE OUTCOME PREDICTION IN SPORTING ENVIRONMENTS," which is incorporated herein by reference in its entirety and for all purposes.

This application is related to U.S. application Ser. Nos. 11/507,886 and 11/508,004, both filed Aug. 21, 2006 and both titled, "TRAJECTORY DETECTION AND FEEDBACK SYSTEM," each of which is incorporated herein in their entirety and for all purposes.

This application is related to U.S. application Ser. No. 11/972,553, by Marty, et al., filed Jan. 10, 2008, titled "TRAJECTORY DETECTION AND FEEDBACK SYSTEM FOR TENNIS," which is incorporated herein by reference in its entirety and for all purposes.

This application is related to U.S. application Ser. No. 12/015,445, by Marty, et al., filed Jan. 16, 2008, titled "TRAJECTORY DETECTION AND FEEDBACK SYSTEM FOR GOLF," which is incorporated herein by reference in its entirety and for all purposes.

TECHNICAL FIELD

The present invention relates generally to devices and systems for sports training and entertainment and more specifically to a trajectory detection and feed back systems and outcome prediction in sporting environments.

BACKGROUND

In sports, player performance is primarily results based. A player is said to be a good player when they produce a consistent result over some range of circumstances. For instance, a professional basketball player might be considered good when on average they produce a certain number of points per game, rebounds, assists, etc., over the course of a season. A player is said to be a great player when they produce a consistent result in more extreme circumstances, such as, in a championship or play-off game as well as providing good performances on average at other times. For example, some basketball players are known for being able to "take over a game" or impose their will on another team in certain situations and are considered to be great for this ability.

The difference between a great and a good player is often described as some intangible quality, such as their will or drive to succeed. Sometimes even when a player produces what appears to be a result consistent with a great player, it is argued that the player is not really great and their performance is a result of circumstances, such as having a really great supporting team. Further, in general, it is often difficult, in a quantifiable manner, to classify and distinguish the performances between players of varying abilities or to distinguish between varying performances by the same player, in regards to answering the questions, such as, why is player 1 good while player 2 is average, why does the performance of a player vary so much, what is a quantifiable different between two performances?

The intangible nature of describing in a quantifiable manner the differences between performances in a sporting environment can be frustrating to players, coaches, broadcasters and spectators alike. Players want to be able identify in a quantifiable manner why their own performances vary from one to another or how their performance varies from a better player so that they can improve their performance. Coaches in team and individual sports want this information so that they can help their players improve. In team sports, coaches may want this information as a way to exploit weaknesses possessed by opposing players. Broadcasters and spectators may want this information because it can add to the entertainment value of watching a sport. Further, spectators are also participants in many of the sports they watch, and thus the spectators may want to be able to quantify and compare their own performances as well as compare their performance to the performances of professional players or other participants of the sport in general.

In view of the preceding paragraphs, methods and apparatus are described in the following paragraphs for determining quantifiable differences between performances in a sporting environment that are not strictly results based. The methods and apparatus may include but are not limited to methods and apparatus related to 1) capturing a performance in a sporting environment, 2) analyzing a performance, 3) comparing performances, 4) presenting results obtained from any analyses or comparisons, 5) archiving captured performances, analyses and comparisons and 6) providing simulations of performances using captured and analyzed performance data.

SUMMARY

Methods and apparatus relating to predicting trajectory outcome in a sporting environment are described. The methods and apparatus may be used to relate trajectory performance of an object to body motions and body orientation associated with generating the trajectory of the object. When equipment is utilized to generate the trajectory of an object, than the effects of equipment motions and equipment orientation may be also related to trajectory performance. The methods and apparatus may be used to predict body motions and body orientations that increase the likelihood of achieving a desired trajectory outcome including specifying optimum motions and orientations for a particular individual to employ. The methods and apparatus may also be used to accurately assess performance and performance improvements of an individual relating to the individual generating trajectories with a desired outcome. The method and apparatus may be used in training, coaching and broadcasting environments.

One aspect of the invention may provide a method for basketball. The method may be generally characterized as comprising: 1) capturing, in a sequence of video frames, images of a basketball shot towards a basketball hoop where the images of the basketball are between leaving a hand of a shooter of the basketball and prior to the basketball making contact with a rim of the basketball hoop or a backboard coupled to the basketball hoop, 2) determining a trajectory of the basketball from the sequence of video frames; and 3) predicting an outcome of the trajectory wherein the outcome includes whether the basketball passes through the basketball hoop or does not pass through the basketball hoop. The predicting may include trajectories where the basketball makes contact with the rim.

Another aspect of the present invention may provide a method for basketball. The method may be generally characterized as comprising, 1) capturing a first plurality of actual basketball shots wherein, for each shot, images of the basketball are captured in a sequence of video frames wherein the images of the basketball are between leaving a hand of a shooter of the basketball and prior to the basketball making contact with a rim of the basketball hoop or a backboard coupled to the basketball hoop, 2) determining, for each of the first plurality of actual basketball shots, a trajectory of the basketball from the sequence of video frames associated with each shot; 3) determining a range for at least one trajectory parameter from the trajectories determined for the first plurality of actual basketball shots; and 4) generating a first plurality of simulated basketball shots including determining whether each of the first plurality of simulated basketball shots is a made or a missed shot where each of the trajectories of the first plurality of simulated basketball shots is generated using a value within the range of the at least one trajectory parameter.

In particular embodiments, a percentage of made shots in the first plurality of simulated basketball shots may be determined. The value for each the simulated trajectories may be determined using a random number. Further, the range may be determined using a statistical analysis. For example, the range may be based upon at least a statistical mean of the trajectory parameter and a deviation associated with the trajectory parameter.

Yet another aspect of the present invention may provide a method for basketball. The method may be generally characterized as comprising, 1) receiving data relating to an individual shooting a plurality of basketball shots, 2) determining a variability associated with the data; and 3) predicting a maximum shooting percentage for the individual based upon the variability. The data may be a sequence of video frames including images of the individual shooting the plurality of basketball shots. The variability may be associated with a range in parameter associated with a motion of a body part of the individual. Further, the variability may be associated with a range in a trajectory parameter associated with trajectories of a basketball generating from shooting the plurality of basketball shots. In addition, the variability may be associated with a range in a parameter associated with an orientation of a body part of the individual.

In particular embodiments, the method may further comprise relating the shooting percentage to a body orientation associated with shooting a basketball where the body orientation is associated with a release angle of a basketball as it leaves a hand of the individual or where the body orientation is associated with a release direction of a basketball as it leaves the hand of the individual.

A further aspect of the present invention provides method for basketball. The method may be generally characterized as comprising: 1) receiving data relating to an individual shooting a basketball shot, 2) generating one or more parameters associated with a body motion, a body orientation or combinations thereof of individual using the received data; and 3) predicting an outcome to the basketball shot from the one or more parameters. The data may be a sequence of video frames comprising images of the individual shooting the basketball shot. Further, the received data may include images generated during one or more of a) prior to the individual initiating a shot, b) while the shot is being taken, c) after the shot is taken and d) combinations thereof.

The method may further comprise generating an image that shows the outcome predicted for the plurality of basketball shots as a function of the one or more parameters. The one or more parameters may relate to 1) a body motion, a body orientation or combinations thereof prior to the individual initiating the shot, 2) a body motion, a body motion or combination thereof, during the shot or 3) a body motion, a body orientation or combinations after the shot. The image may be used in a broadcasting environment, coaching or training environment.

These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

FIG. 7A is a flow chart of a method for processing captured image data.

FIG. 7B is a flow chart of a specific embodiment of the method of FIG. 7A as related to basketball.

FIG. 10A is a flow chart of a method for using captured data in a 3-D simulation.

FIG. 10B is a specific embodiment for basketball of the method of FIG. 10A.

DETAILED DESCRIPTION

Figure 1A:
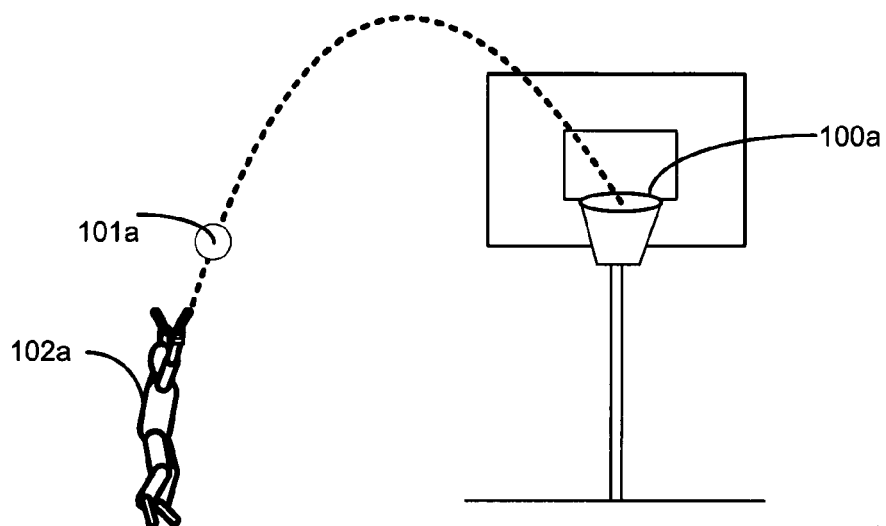
FIGS. 1A-1C, are illustrations of individuals participating in the sports of basketball, tennis and golf, respectively.
Figure 1B:
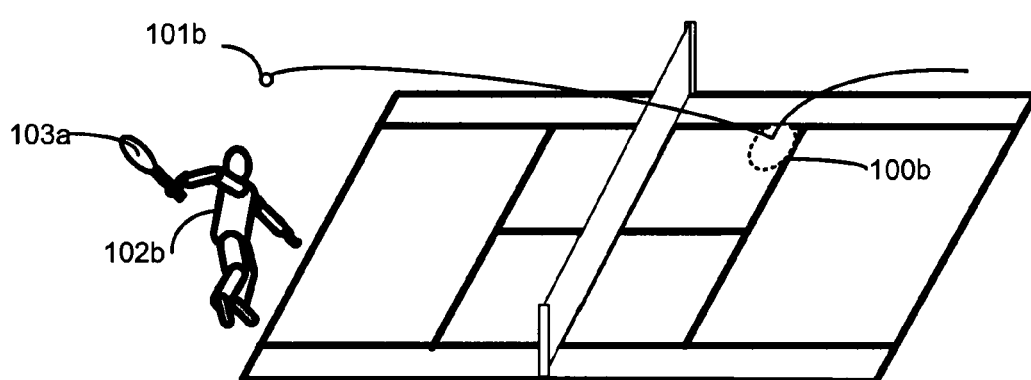
Figure 1C:
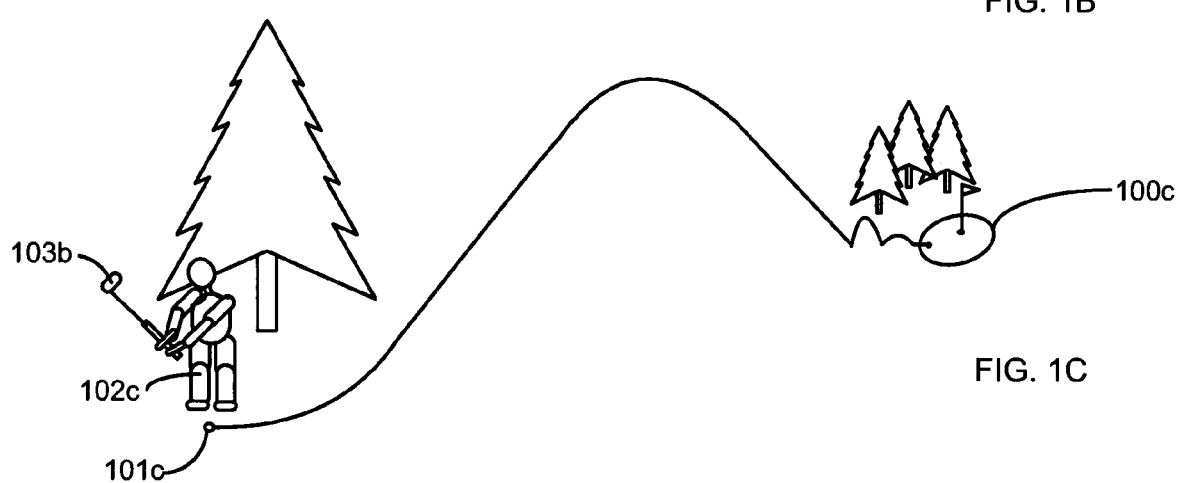

FIGS. 1A-1C, show players, 102a, 102b, 102c, participating in the sports of basketball, tennis and golf, respectively. A common goal or desire of participants in each of these sports is an ability to propel an object, e.g., basketball 101a, tennis ball 101b or golf ball 102c, such that the object, along its trajectory, passes through, lands within or hits, some desired target area within some reasonable margin of error. The object may be launched with the aid of equipment, such as a tennis racquet 103a or a golf club 103b. For each sport, many different desired target areas may be defined that may vary according to different skills and objectives that are utilized in the sport.

As examples, in basketball, the desired target area may be the hoop, where the basketball passes through the hoop 100a along its trajectory. For tennis, the desired target area may be a specific area on a tennis court, such as within an area 100b near a corner of the service box. For golf, the desired target area may be within a specific location on the golf course, such as landing a shot on the green 100c. The goal to launch an object such that it reaches a desired target area common to many other sports, such as baseball, racquetball, archery, football, soccer, hockey, volleyball, lacrosse, bowling, darts, cricket, etc., and is not limited to the examples shown in the FIGS. 1A-1C and methods described herein may be applicable to these sports.

A player is usually considered highly skilled in a particular sport if they are able to consistently get the object to its desired target area under a variety of playing conditions where the level of consistency at which one is considered highly skilled may vary from sport to sport. In developing the methodologies and apparatuses described herein, in sports involving launching objects, it has been determined that a common attribute of participants that are considered highly skilled in a given sport is the ability to consistently reproduce all the factors that result in a particular trajectory. For example, for a shot of a particular distance in basketball, it has been observed that highly skilled basketball players launch the ball with a velocity and angle that varies from shot to shot in a manner that is much less as compared to unskilled players. Thus, skilled basketball players are good at shooting the same shot with very similar body mechanics each time. It is possible for a basketball player to make the same shot using combinations of body mechanics that vary from shot to shot but this behavior has not been observed in skilled players.

Figure 1D:
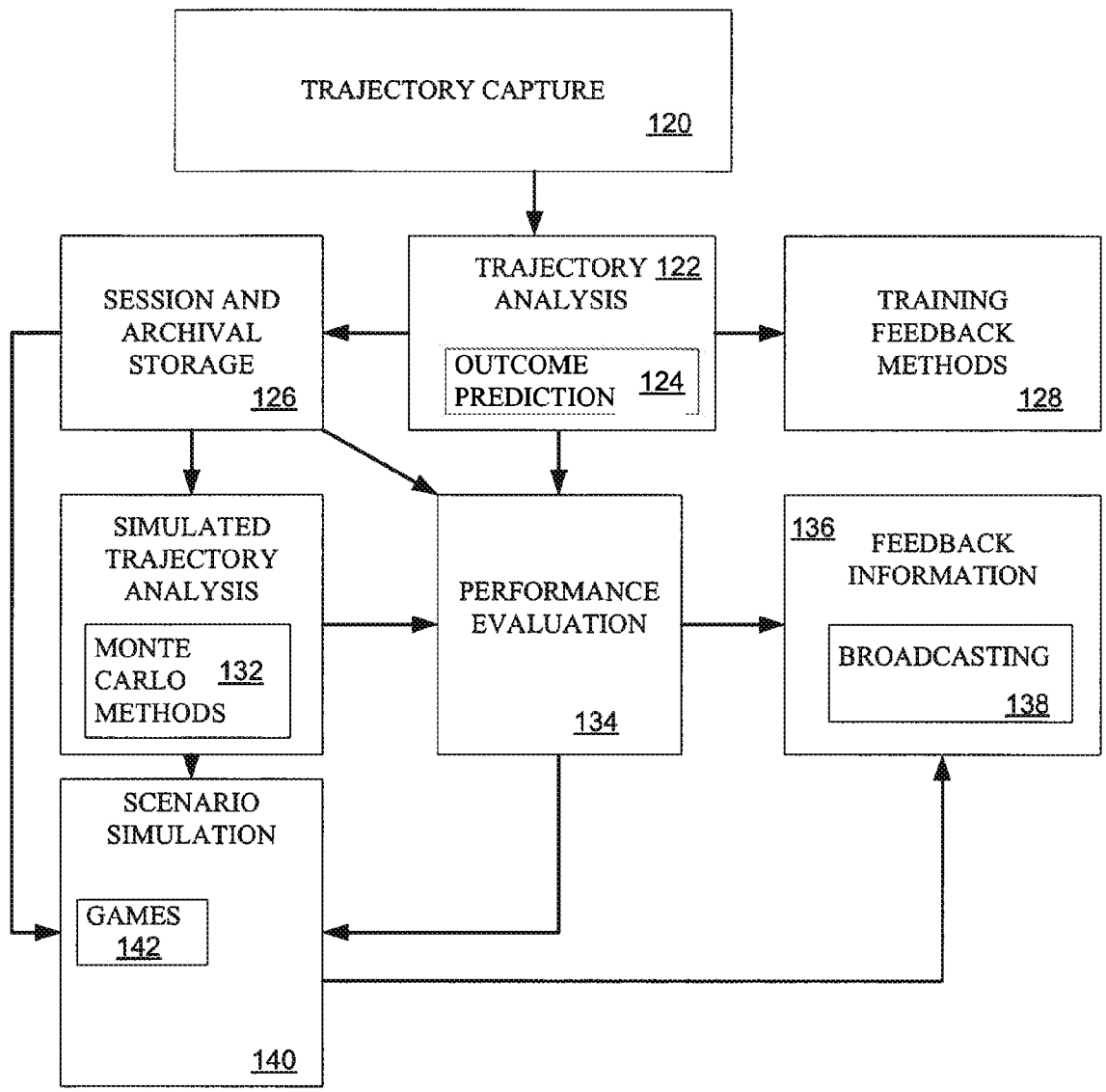
FIG. 1D is a block diagram showing some elements of systems, apparatus and methods utilized in sporting environment for embodiments described herein.

For a given sport, the observation that highly skilled participants are able to consistently reproduce the factors that lead to a particular trajectory has lead to the development of a number of systems, apparatus and methods, which are described herein. Some elements of these systems, apparatus and methods are described with respect to FIG. 1D. For example, systems, methods and methods and apparatus may be utilized to capture data relative to the trajectory of a particular object 120, such as but not limited to video capture of trajectory data.

The captured trajectory data may be used to perform trajectory analysis 122. The trajectory analysis 122 may be used to quantify the factors that characterize a particular trajectory. For example, for golf, a quantified factor may be a velocity at which a golf ball leaves a club after being struck with a club, for tennis, a quantified factor may be a velocity at which the tennis ball leaves the racket after being struck with the racquet and for basketball, a quantified factor may be a velocity at which the ball leaves a shooters hand.

The trajectory capture 120 may only provide data relate to a portion of a trajectory, such as a beginning, middle or end portion of a trajectory. Using a trajectory analysis methodology, other portions of a trajectory not captured may be simulated. In particular, after an initial portion of a trajectory is captured, a later aspect of the trajectory may be predicted. For instance, data regarding a player shooting a basketball may be used to predict whether the shot goes through a hoop or not. As described with respect to the previous figures, a hoop is a desired target area for the trajectory. In another example, data regarding a golfer striking a golf ball may be used to predict a location where the golf ball will land, such as on a green, which may be the desired target area for the shot. Method and apparatus related to trajectory predictions may be referred to as outcome prediction 124. As another example, based upon data captured of a basketball approaching a basketball hoop, it may be possible to predict the velocity, direction and angle of the ball as it left the shooters hand Thus, the beginning of a trajectory is predicted based on data captured near the end of the trajectory.

In particular embodiments, to implement a trajectory calculation, it may not be necessary to capture a motion of the object being launched. For example, based upon video data captured of an individual shooting a basketball, body motions and an orientation of the individual as they are shooting the ball may be used to determine an initial force vector, i.e., a magnitude of forces and their associated direction including rotational forces if desired, for the basketball as it is released from the shooters hand. The initial force vector may be used as the initial conditions for a trajectory calculation where the outcome of the shot is predicted.

The initial forces applied to a basketball based upon a player's body motions and orientation may be determined using other devices alone or in combination with video capture. For instance, a player may wear a device, such as a glove, with sensors. The sensor may include but are not limited to accelerometers and rotational sensors that allow forces generated by the player to be determined. This methodology is not limited to basketball, an analysis of an individual body motions and orientation to determine initial conditions for an outcome prediction of the trajectory of an object may be utilized in other sports, such as golf, tennis, skateboarding, football, soccer, racquet ball, etc.

Using an analysis of body motions and body orientation to predict trajectory outcome, the individual doesn't necessarily have to launch or strike an object. For example, an individual in tennis may practice their service motion without hitting a tennis ball. An assumption may be made about where a virtual tennis ball would make contact with a racquet and a prediction of the outcome of the trajectory of a virtual tennis ball being struck could be made and feedback could be provided to the player in regards to characteristics of the virtual trajectory of the virtual tennis ball. In a particular embodiment, an image of a virtual tennis ball might be projected, such as a projection of a virtual serve toss, and the player may pretend to strike the virtual tennis ball and then a virtual trajectory including an outcome prediction may be generated for virtual tennis ball.

In another embodiment, an actual tennis ball might be hung from a string at an optimum height for the player to strike the ball, such as an optimum height for the player to hit a particular type of serve. Then, the player may strike the tennis ball. Based upon, an orientation and motions of the racquet and/or their body, an outcome for the serve may be predicted, such as in or out, hit the net, two feet from the corner, etc.

In yet other embodiments, it may not be necessary to generate a simulated trajectory each time an outcome is predicted for a trajectory. For example, curve fits, tables and other methods/data may be developed that correlate one or more parameters to an outcome prediction. For example, for basketball, it may be possible to correlate a velocity and direction at which a hand is moving when a basketball is moving to an outcome for the basketball shot, i.e., whether the ball goes into to the hoop or not. The velocity and direction may be input into a formula, such as curve fit, that predicts outcome or may be used as input to a table look-up routine that uses a series of curves fits to predict outcome based upon these input parameters. Similarly, based upon an initial velocity and direction determined for a basketball, it may be possible to predict an outcome without performing a simulated trajectory calculation each time.

In one embodiment, the curve fits or correlations that predict outcome based upon one or input parameters may be generated from a database of actual trajectories and/or simulated trajectories. An experimental set-up for generating basketball trajectories and recording the outcome is described with respect to FIGS. 19A and 19B. Analytical methods for generating simulated trajectories and predicting outcomes for basketball are described with respect to FIGS. 15A-18B.

Trajectory analysis 122 and outcome prediction 124 may be used as part of training methodologies that help a player to develop consistency in reproducing the factors that result in a particular trajectory of an object and thus, improve their skill level. Developing correct muscle memory is a term that is often associated with training methodologies that help a player develop a skill in a sport. The method and apparatus described herein may be used to provide feedback information as part of training feedback methods 128 that help a player develop consistent muscle memory for an activity associated with a particular sport.

Data related to trajectory capture 120 and trajectory analysis 122 may be stored and archived 126 and later utilized for a number of different purposes. These purposes may include but are not limited to a) simulating trajectories 130 including utilizing Monte Carlo methods 132 and b) Scenario simulation 140 which may include applications related to 3-D rendered games 142. The simulated trajectory analysis 130 may be used to quantify and determine optimum trajectory factors for a particular trajectory, such as the best angle at which to launch a shot of a basketball.

The trajectory analysis 122, archived data 126, simulated trajectory analysis 130 and scenario simulation 140 may be used to evaluate the performance 134 of individual participants or groups of participants. The evaluation of the performance may comprise quantifying a participant's ability to reproduce the factors related to generating a particular trajectory. Once a player's ability is quantified or qualified in some manner, the evaluation of performance 134 may include comparing 1) a participants performance against himself, such as past performance against a current performance, 2) comparing a participant's performance against another participants performance, 3) comparing a participant's performance against a defined standard, such as placing the participant's performance within a defined skill ranking and 4) comparing a participant's to some optimum, such as a comparing averages of factors that a player produces to generate a particular trajectory against optimum values of these factors determined from a simulated trajectory analysis 130.

In one embodiment, the performance evaluation 134 may include predictions of future performance, such as an improvement in performance that an individual might make if the individual were to change some aspect in the manner in which they generate the factors that produce a particular trajectory or were to improve a consistency in which they generate the factors that produce a particular trajectory. This type of analysis might be performed using the simulated trajectory analysis 130 including the Monte Carlo methods 132. In another embodiment, the performance evaluation 134 may include a prediction of future performance, such as a win differential, that a group may make if the individuals in the group were to change some aspect in the manner in which they generate the factors that produce a particular trajectory or were to improve a consistency in which they generate the factors that produce a particular trajectory, such as if a basketball team improved the consistency at which they generated free throws. This type of prediction may include scenario simulation 140.

In addition, a performance evaluation may be developed for a "composite" participant. For example, in basketball, the consistency at which a group of participants generate factors that produce shot against a particular defender may be determined. The shots made by each player against the defender may be treated as if a single player had made each of the shots and analyzed accordingly. In another example, the consistency at which a group of participants in golf on a particular golf hole generate a shot may be determined. The shots made by the group of participants may be treated as if a single player had made each of the shots on the selected hole. The evaluation of performance for a composite player may involve similar comparisons as described in the previous paragraph for an individual player Once performance is evaluated for an individual player, group of players or a composite player, feedback information 136 may be provided. In many instances, the feedback information may be provided in a graphical format where the graphical format provides some indication of a level consistency at which the factors that produce a particular trajectory are being generated. In a particular embodiment, the feedback information 136 may be utilized in a real-time sports environment, such as during a televised sporting event. Thus, particular methods and apparatus related to broadcasting 138 are described herein.

In the following paragraphs, descriptions of methods and apparatus related to outcome prediction 124, simulated trajectory analysis 130 including Monte Carlo methods, performance evaluation 134, feedback information 136 including broadcasting 138 and scenario simulation 140 including games 142 are emphasized. Some details regarding trajectory capture 120, trajectory analysis 122, training feedback methods 128 and session and archival storage 126 are provided. Additional details regarding these elements are also described with respect to U.S. application Ser. Nos. 11/507,886 and 11/508,004, both filed Aug. 21, 2006 and both titled, "TRAJECTORY DETECTION AND FEEDBACK SYSTEM," U.S. application Ser. No. 11/972,553, titled "TRAJECTORY DETECTION AND FEEDBACK SYSTEM FOR TENNIS," and U.S. application Ser. No. 12/015,445, titled "TRAJECTORY DETECTION AND FEEDBACK SYSTEM FOR GOLF," incorporated by reference above.

Important aspects of sports training are assessing a participant's current ability, proscribing a training regimen and then determining whether an improvement has occurred as a result of the training regimen. In sporting activities where it is desirable to propel an object along a trajectory to a desired target area, assessing a participants current ability may involve having a participant propel the object a number of times and then counting the number of times the object reaches the desired target area and counting the number of times the object does not reach the desired target area. For example, a basketball player could be asked to take 25 free throws and based on the number of makes and misses a free throw percentage may be calculated for the player. In another example, a golfer could be asked to hit 25 shots from the same location with the same club and a percentage of shots that land within a desired target area could be calculated.

A downside of the counting methodology listed above is that a result may be used in an assessment and evaluation of the player that is statistically meaningless. In general, statistically, the sample size needed to produce an percentage error rate is proportional to $1/(\text{error rate})^2$. The exact value of the error rate may vary depending on the statistical methods that are used. Thus, qualitatively to produce an error rate that is less than ±10% the sample size is proportional to $1/(0.1)^2$ or about 100 samples. Thus, if a basketball player shot 100 free throws and made 70, one might say the player is 70% free throw shooter. The error rate may be about ±10% for this sample size. If the player practiced for a while and then shot another 100 free throws and made 75 free throws, one might say the player is 75% free throw shooter. Again, however, the error rate is about ±10%. The player may believe that they improved their free throw shooting as a result of their practice. However, based upon the statistically error rate resulting from the sample size, it is possible, the player improved but it is also possible that the player may have actually not improved and became a worse shooter.

To reduce the error rates associated with the sample size to below 1% on the order of 10,000 samples may be needed, i.e., $1/(0.01)^2$. To assess their current ability, most participants in any sport are not going to spend the time to accumulate this many samples, i.e., shoot 10,000 baskets, kick a soccer ball 10,000 times, throw a baseball 10,000 times, etc., to produce a sample size with an error rate less than ±1% and then repeat this process at a later time to assess an improvement in their ability. Further, since samples would likely have to be accumulated over many sessions over a period of time, it would be difficult to associate the samples with a player's current skill level because the player's skill level could change as the samples were accumulated over a period of time.

Figure 2A:
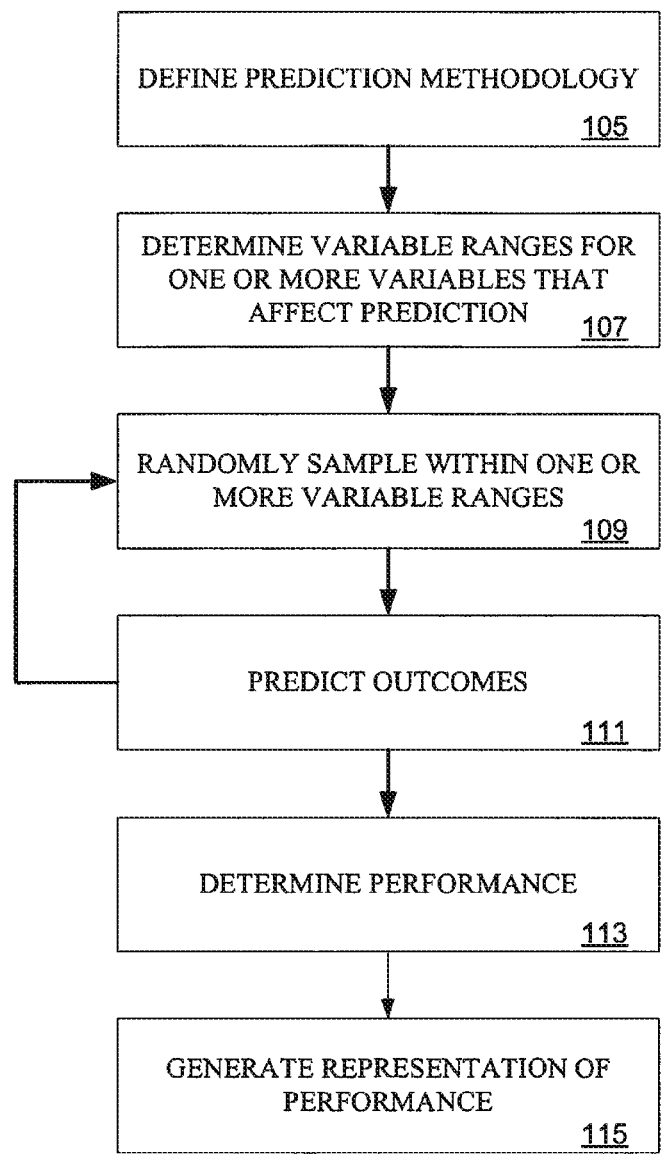
FIG. 2A is a flow chart of a methodology for characterizing an individuals skill level from a limited sample size.

A methodology is described herein that may overcome the difficulties associated with assessing a player's skill level in regards to propelling object a desired target area. In FIG. 2A, a flow chart that comprises some elements of a methodology for characterizing a player's skill level from a limited sample size is provided. In 105, a prediction methodology is defined that predicts a trajectory of an object based upon one or more input variables. The prediction methodology may be sensitive to one or more factors that may be controlled by a participant in a sporting activity involving the object. For instance, for basketball, the participant may control a height, a velocity and an initial direction at which the basketball is released and an associated trajectory prediction methodology may be sensitive to these variables. As another example, in tennis, the participant may be able to control, the velocity, direction, orientation and position ball relative to the face of the racquet as a tennis ball is struck and an associated trajectory prediction methodology that is defined may be sensitive to these variables.

Equations of motion that allow a trajectory of basketball and a golf ball to be predicted are described herein but this methodology is not limited to these objects as a trajectory prediction methodology may be defined for any type of object that may be used in a sporting activity. With the equations of motion applicable to a given object and a set of initial conditions a trajectory of an object may be predicted by solving the equations of motions. In many embodiments, the initial conditions may be determined from captured or measured data, such as from captured video data.

In some embodiments, it may not be necessary to solve equations of motions to predict an outcome for a trajectory. For example, a database may be developed that includes trajectories generated under experimental conditions, such as by using a mechanical device, to launch an object. The mechanical device may allow precise control of initial conditions for the trajectory. For each trajectory, the initial conditions and outcome for the trajectory may be recorded. An experimental database may be developed that includes the initial conditions and trajectory outcomes for a set of trajectories.

Figure 22:
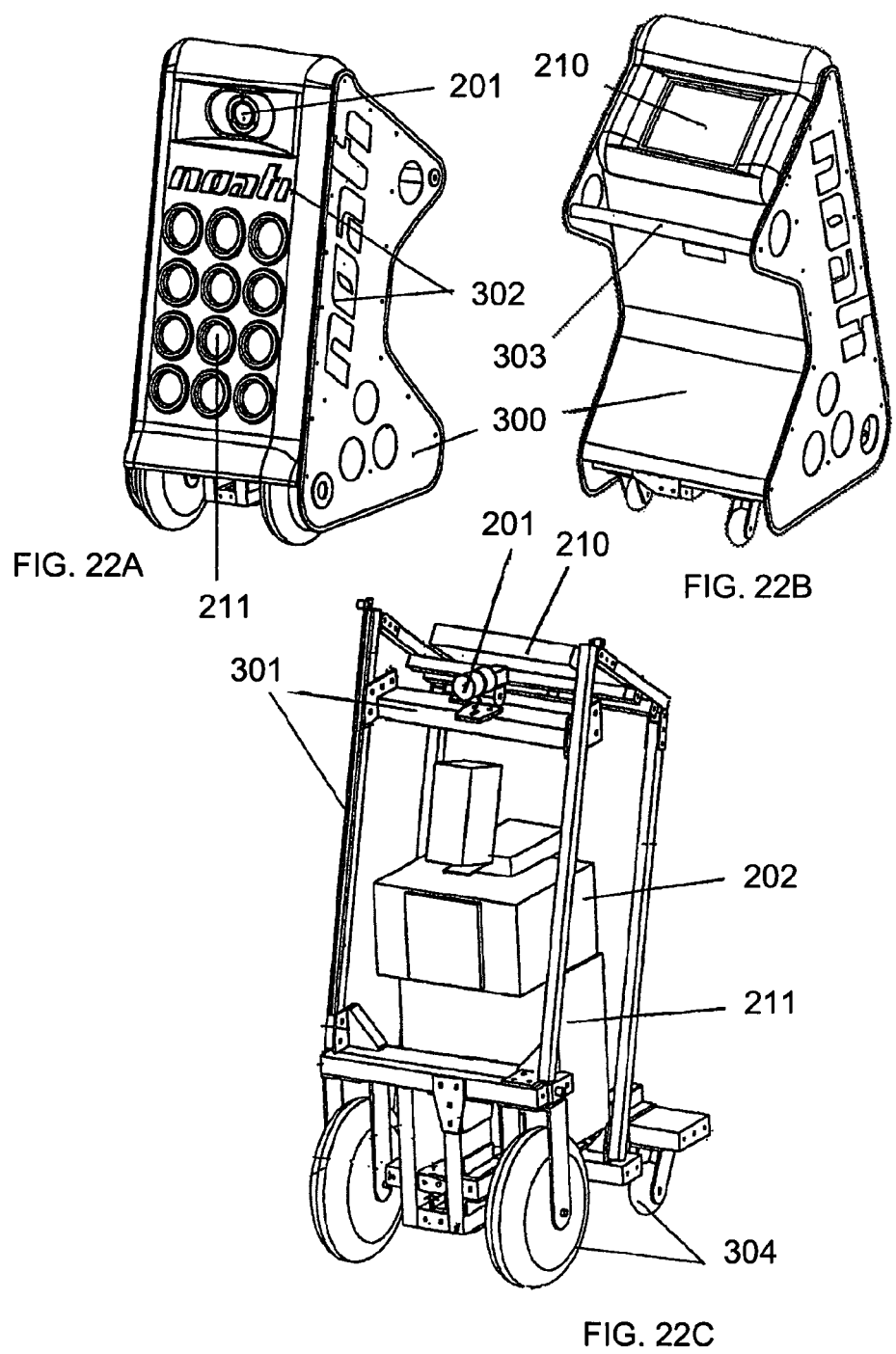
FIGS. 22A-22C are perspective drawings of one embodiment of a trajectory detection and analysis system.

Using the trajectory database, initial conditions for a trajectory may be determined and the experimental database may be used with an interpolation scheme to predict the outcome of the trajectory. For example, a set of trajectories may be experimentally generated for basketball and incorporated into one of the devices utilizing video capture to determine a trajectory of a basketball (see FIG. 22C). The experimental database may be used to predict a trajectory outcome for a shot of a player captured with the device.

A device for generating an experimental database for basketball trajectories is shown in FIG. 19. The device is set-up to automatically generate a set of basketball trajectories based on an initial set of input parameters, determine the outcome for the trajectory, i.e., if the shot is made or missed and store the outcome. For each object of interest, an appropriate device may be developed or it may be possible to modify an existing device if it allows the input conditions to be known precisely enough. For instance, mechanical devices for launching tennis balls, hitting golf balls, launching baseballs and launching footballs exist and one of these devices may possibly be modified to generate a trajectory database.

Analytical methods and methods using experimentally generated databases may be used in combination. For example, in a tennis environment, an analytic method may be used to predict where a ball will land after it is struck. After the ball hits the ground, it may bounce and the portion of a trajectory after it hits the ground may be predicted using an experimental database. Different databases might be developed for bounces on different surfaces, such as grass, clay or a synthetic surface. In a golf environment, a trajectory database to predict bounces might be developed to account a hardness of various surfaces, such as a green versus a fairway.

After a prediction methodology is defined, it may be used to assess an ability of a player. Further, it may be used to predict optimum sets of trajectory parameters for launching an object, such as via sensitivity studies. In a sensitivity study, one or more parameters that affect a trajectory may be varied over some range to see whether there is a particular range in which the chances of a desired outcome are maximized. In addition, it may be used to predict improvements when a player adopts a new set of trajectory parameters to use for launching an object (e.g., see FIGS. 2B-2E).

In 107, to initiate the applications described in the preceding paragraph, first one or more input variables to vary may be selected, then a range of one or more input variables may be determined. Not all of the variables that are input into a trajectory prediction have to be varied for a particular implementation. For example, in golf, a prediction methodology may be developed that accounts for the effects of wind. For a given set of trajectory predictions, the wind speed could be set at a constant for each trajectory, randomly varied within a range of wind speeds or set to zero. As another example, in basketball, an initial angle of a predicted series of shots may be varied where the angle varies only in a vertical plane aligned with the center of the basketball hoop and side to side errors of the ball may used in the prediction. As another example, the initial angle of predicted series shots may be varied in combination with a side-to-side error variable to account for incorrectly aligned shots, i.e., not aimed at the center of the hoop.

The range of a variable that is selected may vary according to the application. In a sensitivity study (see FIGS. 2B-2E), the one or more ranges may be varied such that a range of outcome that is generated that is representative of trajectories that may be produced by a group of players with a widely varying degree of skill level. In an assessment of an individual player, the range of variables may be selected that is representative of trajectories to be likely generated by the individual player.

In one embodiment, range of input variables for an individual player may be determined by capturing data from actual trajectories generated by a player and then using an analysis, such as a statistical analysis, to determine a mean or average for a variable of interest and then to determine an amount of variability around the mean or average. For example, in basketball environment, a player may be asked to take twenty to thirty shots from a particular location. Trajectory parameters associated with each shot may be determined using a device employing video capture. For each trajectory parameter of interest, a statistical mean and standard deviation may be calculated. Then, a range of the variable may be selected or determined. For instance, a determined range for a trajectory parameter of interest might be the statistical mean plus or minus one, two or three standard deviations.

As an example, for an individual basketball player, a range of an initial shot angle might be 42 degrees plus or minus 2 degrees where the 42 degrees is a mean value determined from a set of shots and the 2 degrees represents a range of two standard deviations. As mentioned in the description with respect to FIG. 2A, the ranges don't have to be determined necessarily from data generated by a single player, a performance evaluation may be performed where the data from a group of players is put together to form a "composite." For example, the range 42 degrees plus or minus 2 degrees may be representative of shots taken by multiple players against a particular defender. The composite player in this case may be considered a group of shooters taking shots against a particular defender. In another example, the range of 42 degrees plus or minus 2 degrees may be representative of the free throw shooting for a particular basketball team where the composite player is representative of the basketball team as a whole.

After a one or more variables are selected for an analysis and the range of these variables are determined, outcomes for a number of trajectories may be generated where for each trajectory a value for each of the one or more variables is selected such that is within the determined ranges for the variable. In one embodiment, the values to use for each trajectory may be selected such that the values fall along some preselected distribution, such as a linear distribution or a Gaussian distribution. Based upon the number of trajectories that are to be generated, the values may be selected such that they are representative of the distribution function that is being employed.

As an example, if the values are selected to fall along a linear distribution, then based upon the range value and the number of trajectories that are to be generated an interval may be determined and the analysis may step through range associated with a variable according to the determined interval. For instance, in the example of the paragraph above, a range of 4 degrees is specified about a mean of 42 degrees. For an analysis with 101 trajectories and a linear distribution, the angle may be varied from 40 degrees to 44 degrees by increments of 0.04 for each trajectory.

In another embodiment, in 109, a variable may be randomly sampled within its selected range such that a random value of the variable is within the selected range and is consistent with a selected distribution of the variable. If two are more independent variables are two be varied, then this process may be repeated for each of the variables. In 111, after values of the trajectory parameters that are to be varied are determined, a trajectory prediction may be made using these variables. For example, for a basketball shot, the outcome predicted may be a made or missed shot. For golf, the outcome predicted may be a location where the ball lands, which may or may not be within a desired target area. For tennis, the outcome predicted might be a landing location within or outside of a desired target area on the tennis court. Steps 109 and 111 may be repeated for a selected number of trajectories to be calculated. One hundred, one thousand, ten thousand or more trajectories may be calculated depending on a desired level of accuracy and a number of variables that are being varied in the trajectory analysis.

In 113, a performance evaluation may be made. For instance, a performance evaluation may be that a basketball player for their measured level of variability in shot mechanics is likely to make a certain percentage of shots from a certain distance where the percentage is determined from the predicted outcomes in 111 over the number of trajectories that were generated. This assessment may be made for a variety of shot distances. In another embodiment, a performance evaluation may be a prediction of the percentage of shots the player is likely to make from a certain distance if they were to reduce a variability in one or more variables associated with their shot mechanics (In one embodiment, the variability as described above may be characterized using a calculation of a standard deviation for one or more variables associated with a group of shots). In another embodiment, a performance evaluation may be a prediction of a shooting percentage of shots from a certain distance a player would make if they were to change their shot mechanics while maintaining their current variability, e.g., putting more arc in their shot. FIGS. 2B-2E, provide some examples of performance evaluation for basketball.

In 115, a representation of their performance may be generated. Typically, the representation may include a graphical component. The representation may include elements that quantitatively and/or qualitatively show how the variability in their mechanics affect an object's trajectory and the subsequent outcome of the trajectory which may be predicted. These graphical representations may include 2-D or 3-D components. Further details of graphical representations and formats are described with respect to figures such as, FIGS. 2B-2E, 5A-5B, 8A-8D, FIG. 11 and FIG. 19B.

Figure 2B:
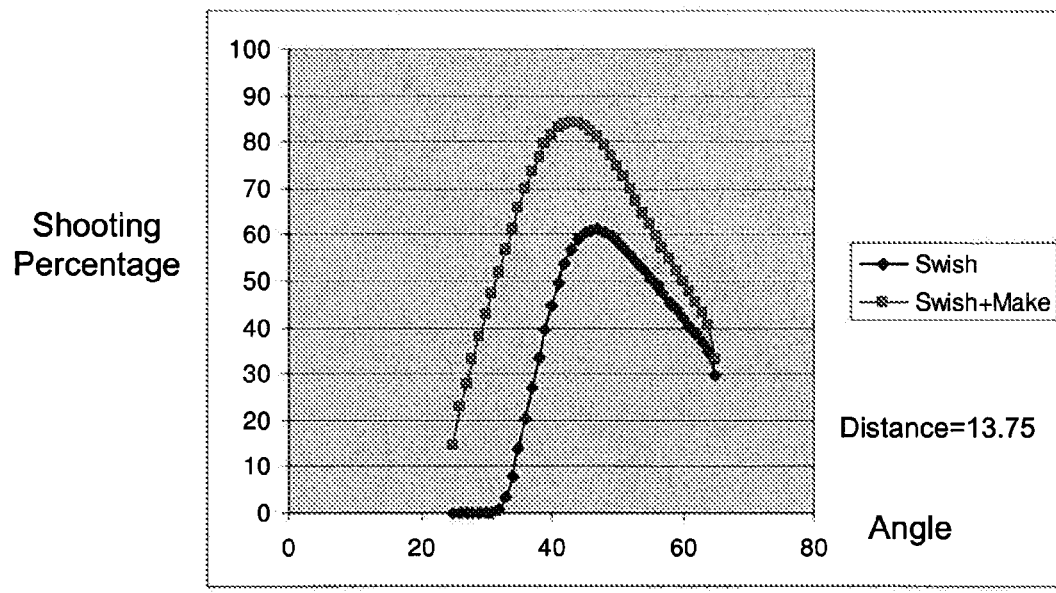
FIGS. 2B-2E are graphs of shooting percentage for a particular shot distance as a function of hoop entry angle.
Figure 2C:
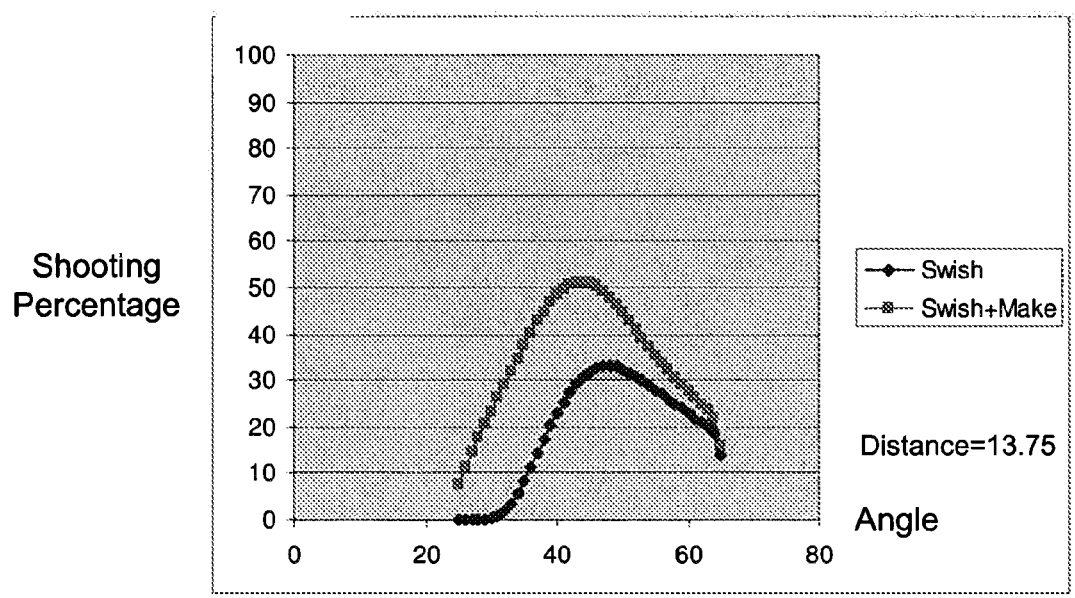
Figure 2D:
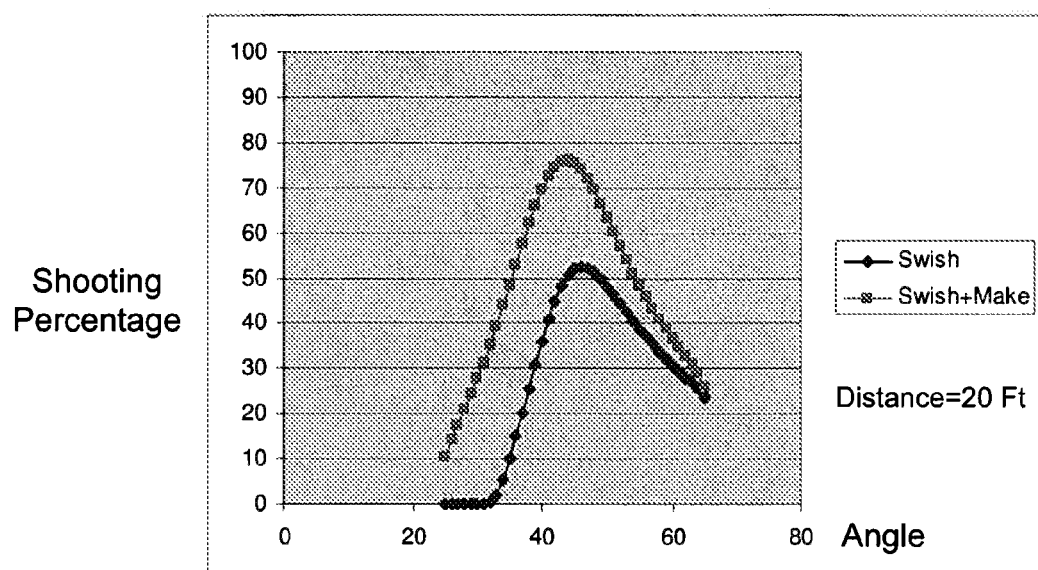
Figure 2E:
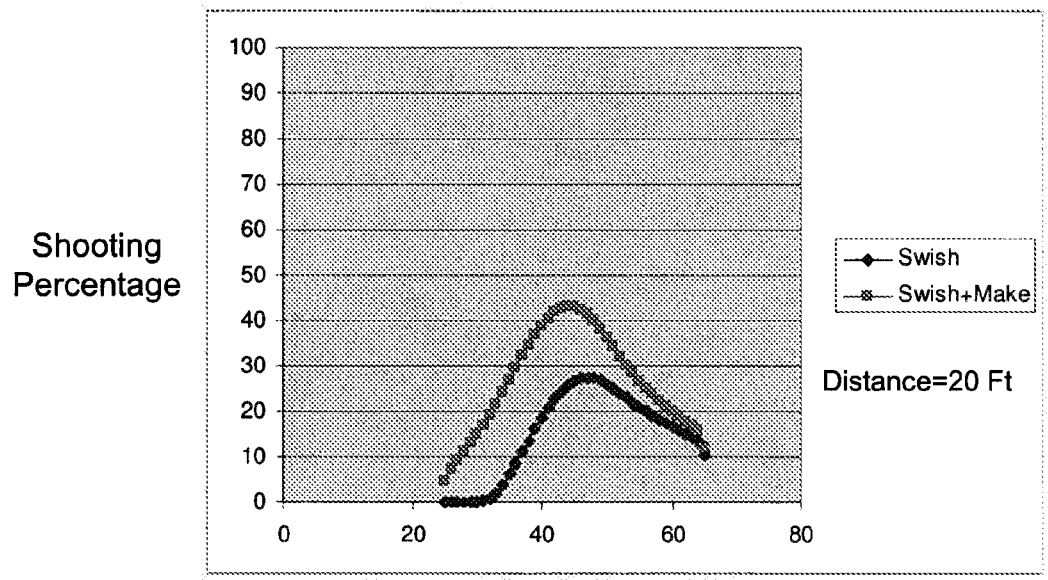

FIGS. 2B-2E are graphs of shooting percentage for a particular shot distance as a function of hoop entry angle. FIGS. 2B and 2C are for a shot distance of 13.25 feet. FIGS. 2D and 2E are for a shot distance of 20 feet. Hoop entry angle and hoop entry velocity are varied in the simulations. The hoop entry angle is directly related to the release angle of the shot. The entry velocity is directly related to the release velocity, which corresponds to the force that an individual applies to the ball prior to release. Two curves are shown on each figure. A first curve represents a swish percentage as a function of entry angle. A swish is a shot that goes through the hoop without touching the rim. Swish+ Make refers to shots that go through the hoop including shots that hit the rim first and shots that don't touch the rim (swish).

In the analysis, a standard deviation for each of the entry velocity and the entry angle is utilized, such that the entry angle and entry velocity are varied about a mean to provide a range of values for each of these parameters. In FIGS. 2B and 2D a deviation of the entry angle and entry velocity that is more consistent with a skilled player is used. In FIGS. 2C and 2E, a deviation of the entry angle and entry velocity is used that is more consistent with a less skilled player. In these examples, the deviations relating to entry angle and entry velocity for the less skilled player are twice that of the more skilled player. As described above, the amount of deviation of these shooting parameters may be an indicator of the skill level of a player where more skilled players exhibit less deviation from the mean when a group of their shots is considered.

As expected, a comparison of FIGS. 2B and 2D, to FIGS. 2C and 2E shows the player with the less deviation in their shooting parameters makes a higher percentage of their shots over a range of release angles. As described above, the entry angle plotted in the figure is directly related to the release angle. Of interest, the shooting percentage increases from zero to a maximum and value and then declines for each set of curves. The peak in shooting percentage corresponds to a release angle, which is near 45 degrees. An experimental validation of this methodology is described with respect to FIGS. 19A and 19B.

As describe above, via determinations made from actual shots, curves such as those shown in FIGS. 2B-2E could be generated for an individual player based upon a mean entry velocity and mean entry angle for a group of shots taken by the player and a deviation of these parameters associated with the player. The means and variations of the parameters could be calculated from less than 100 shots taken by the player. However, 40-60 shots may be sufficient. Although, it may be possible to use even less shots, such as 25-30. The shots used for analysis may be from shots taken in a practice environment or possibly from shots taken during an actual game or combinations thereof. From the generated curves, the player could see where their mean entry angle is relative to the peak on the curve and determine whether changing their release angle will significantly improve their shot. Further, plots could be generated for the player showing possible improvements if they were to improve the consistency with which they generate the entry angel and entry velocity, i.e., lower the deviations of these parameters associated with their shots.

Figure 3:
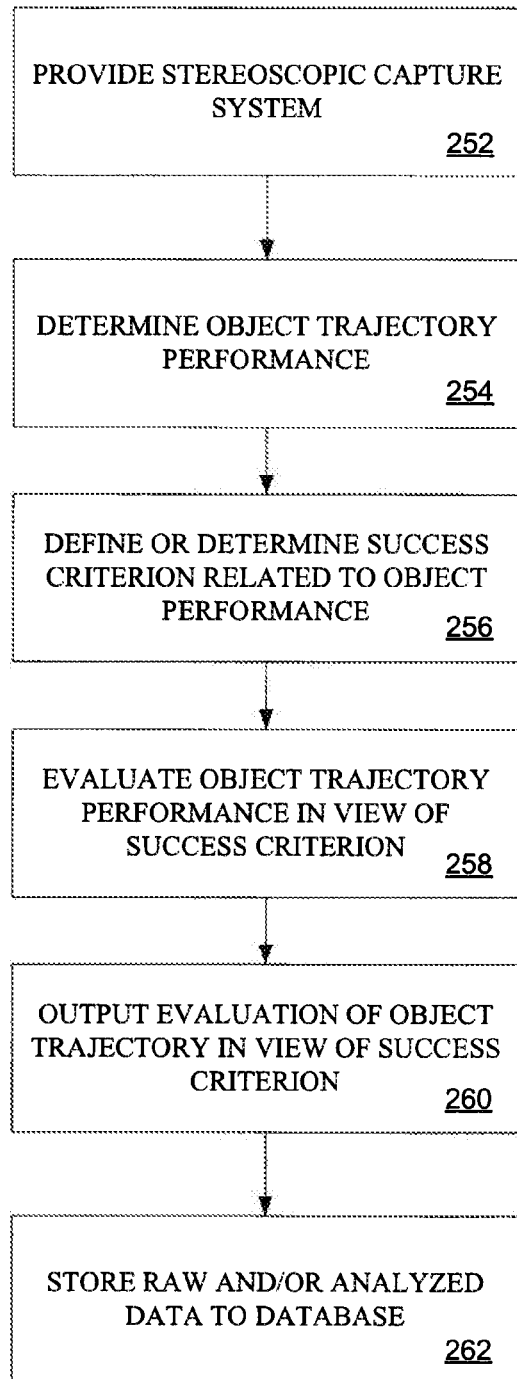
FIG. 3 is a flow chart of a method for capturing, analyzing and storing results from a sporting performance.

FIG. 3 is a flow chart of a method for capturing, analyzing and storing results from a sporting performance. In 252, first a system is provided for capturing the performance in the sporting environment. The components and the set-up of the system may vary depending on the sporting environment and the object being considered. The captured performance may include a trajectory of an object associated with the sport, such as a basketball, tennis ball, volleyball, golf ball, football, baseball, or soccer ball as well as body motions for one or more players associated with the performance. The body motions may be used to determine whether there is a relationship between a particular body motion a subsequent trajectory generated as a result of the body motion. The associated players may be players involved with launching the trajectory, such as a shooter or passer in a basketball game as well as other players participating in the performance, such as a defender in a basketball.

After the performance is captured, in 254, the object trajectory performance may be determined. The determination of the object trajectory performance may include such factors determining the trajectory of the object and determining important factors that affect the trajectory of the object may be characterized. For instance, in a golf shot, the initial trajectory of the ball may be captured and used to predict the trajectory of the golf ball. Further, the golfer's swing mechanics may be analyzed to characterize important factors affecting the shot, such as club head speed and hand speed. In another example, for a tennis serve toss, the trajectory of the toss and factors affecting the toss, such as hand speed, hand position at release and racket position at maximum height of the toss may be characterized. Methods and apparatus for capturing and/or analyzing a trajectory of an object and if desired a participant in a sporting environment are described in the following paragraphs.

In 256, a success criterion may be defined or determined using parameters relating to one or more of the object's trajectory, a participant(s) motion or combinations thereof. In one instance, the success criterion may be defined prior to capturing a sports performance and then parameters that allow the sports performance to be evaluated in view of the success criterion may be determined and output shortly after the sports performance, such as shortly after a golf shot. In another instance, data related to a sports performance may be captured and stored, a success criterion may be defined that requires a determination of parameters that were not generated in conjunction with the performance analysis. In this case, the stored data may be reanalyzed to determine the new parameters associate with the new success criterion and evaluate them against the new success criterion. One example of a success criterion is the object reaching a desired target area, which is discussed with respect to the preceding figures.

For example, for a golf shot, a default success criterion may involve a club head speed, a ball speed leaving the club and an initial angle relative to the ground. These parameters may be determined for each shot and may be stored with captured data used to determine these parameters. Later, the success criterion may be defined in regards to a distance and location for a shot, these parameters may have not been previously determined for the shot. Nevertheless, using the stored captured data and previously generated parameters when applicable, such the ball speed leaving the club, the distance and the location of the shot may be generated.

In 258, after the parameters related to the success criterion are determined, the object trajectory performance in view of the success criterion may be evaluated. For instance, a success criterion for tennis may include a range of parameters related to hitting a serve that result in a predicted target zone for the serve landing in and within a certain distance of the center line. When the trajectory performance of an actual serve is evaluated, it can be compared to the success criterion to determine whether the serve was hit in a manner that would result it landing in the predicted target zone.

In addition, the parameters associated with the trajectory performance of the actual serve may be compared to the range of parameters that provide the predicted target zone. This type of analysis allows two actual serves that fall in the predicted target zone to be compared. In a traditional results based analysis, one would just record that both serves were in. However, it may be that the mechanics used to produce a first serve that was in are much easier to consistently reproduce than a second serve that was in. The comparison of the two actual serves to the parameters that result in the predict target zone may allow the player to determine which serve is better in regards to being able to consistently reproduce and thus, focus on the body mechanics that produce the actual serve that is most easily reproduced.

In 260, after the object trajectory performance is evaluated in view of the success criterion, the results of the evaluation may be output in some manner that allows one or more of a player, coach, broadcaster or spectator to understand one or more aspects of the evaluation. The evaluation may be output in a different manner depending on the intended recipient. For example, a player or coach may desire to receive first information in a first format while a spectator or broadcaster may desire to receive second information in a second format. Finally, in 262, captured and analyzed data may be stored to a database for later recall and additional analysis. In the following, paragraphs a specific embodiment of the general method is described for basketball.

Figure 4:
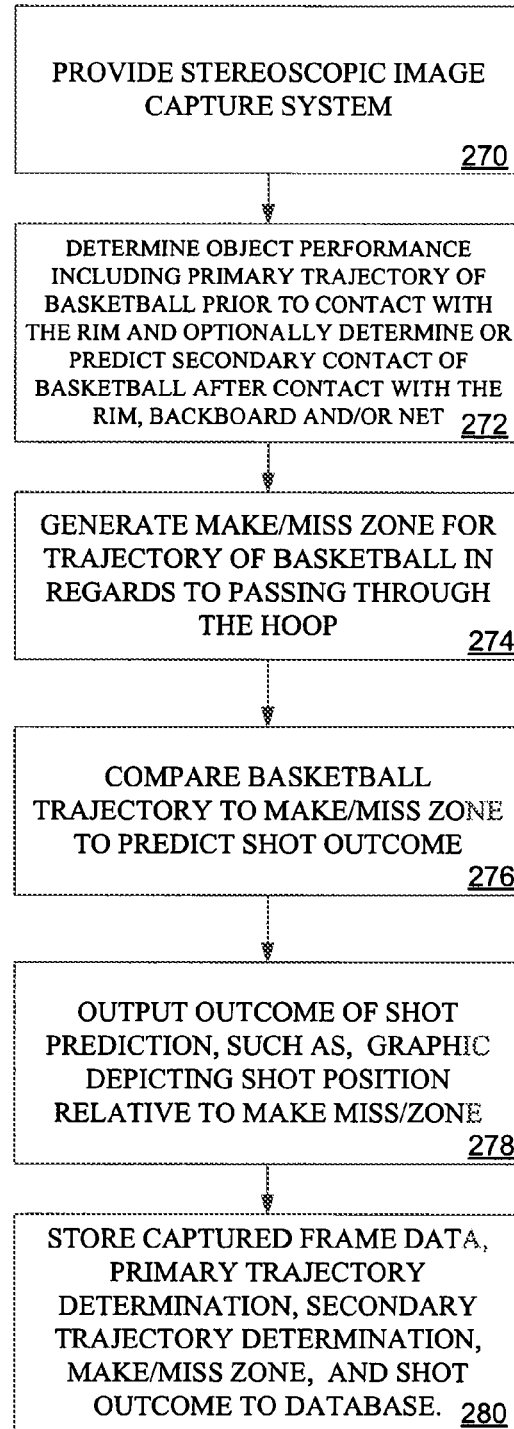
FIG. 4 is a flow chart of a specific embodiment related to basketball of the method described with respect to FIG. 3.

FIG. 4 is a flow chart of a specific embodiment related to basketball of the method described with respect to FIG. 3. In 270, a stereoscopic image system may be provided. Details of a stereoscopic image system are described in more detail with respect to FIGS. 13A-14B. The embodiments of the method and apparatus described herein are not limited to using a stereoscopic image system and other apparatus may be employed to capture trajectory data associated with the trajectory of an object employed in a sporting environment. In 272, the determination of the object performance may involve determining a primary trajectory of the basketball prior to contact with the rim and optionally a secondary trajectory if the basketball bounces off the rim, backboard and/or net. As described above and with respect FIGS. 15A-19B, the trajectory may be predicted using analytical, experimental data and combinations thereof.

In 274, a success criterion related to the basketball trajectory performance may be defined. The success criterion may not necessarily be defined as just made baskets but may be made baskets with particular trajectory characteristics. For instance, a player may wish to define a success criterion in regards to shots that don't touch the rim as opposed to all made shots. Further, even for shots that don't touch the rim, the shot may be off center. Thus, in another instance, a player may wish to define a success criterion that includes a swish where the ball doesn't touch the rim and further the amount the shot may be off center is limited. Thus, a made shot that even swishes through the net may be considered a miss for a success criterion defined in this manner.

In particular embodiments, the object performance of the basketball trajectory of a basketball approaching a hoop may be defined as a summation of independent variables that can include but is not limited to: 1) front to back position of the ball in the hoop plane, 2) left to right position of the ball in the hoop plane, 3) entry angle of the ball as it crosses the hoop plane, 4), rotation of ball as it crosses the hoop plane and 5) velocity of ball as it crosses the hoop plane.

In one embodiment, combinations of the independent variables may be defined that predict a made or missed basket. The made or missed basket may fall in the following categories:

1. Guaranteed made shot including but not limited to how the ball moved before falling through the rim, where the ball touched the rim or touched the backboard, how high the ball bounced off the rim, how the net moved as the ball passed through the rim, how the ball moved after passing through the rim.
2. Guaranteed missed shot including but not limited to how the ball moved before falling outside the rim, where the ball touched the rim or touched the backboard, how high the ball bounced off the rim, how the net moved as the ball passed outside the rim, how the ball moved after passing outside the rim.
3. Unpredictable shot without further refined information. Unpredictable shot could include a probability of make or miss scenarios. Further, empirical data on ball and net movement from prior actual shots with given sets of trajectory parameters can be used to further refine the ability to predict made or missed shots with the same/similar set of trajectory parameters and to predict ball and net movement of a made or missed shot, including the rebound path of a missed shot.

Figure 5A:
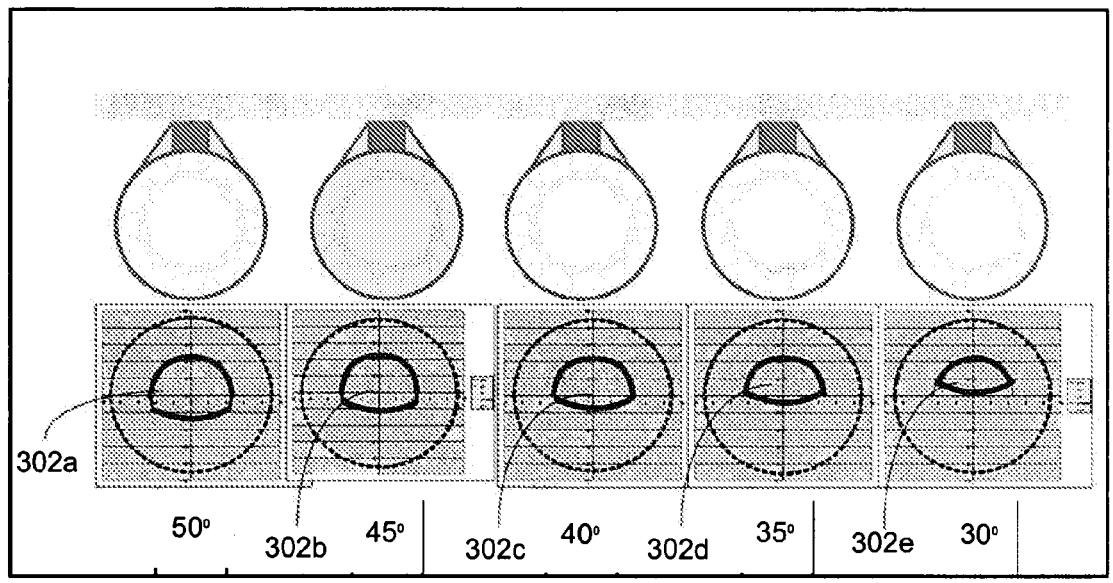
FIGS. 5A and 5B are examples of graphic output formats related to the evaluation of a basketball trajectory performance including outcome prediction.
Figure 5B:
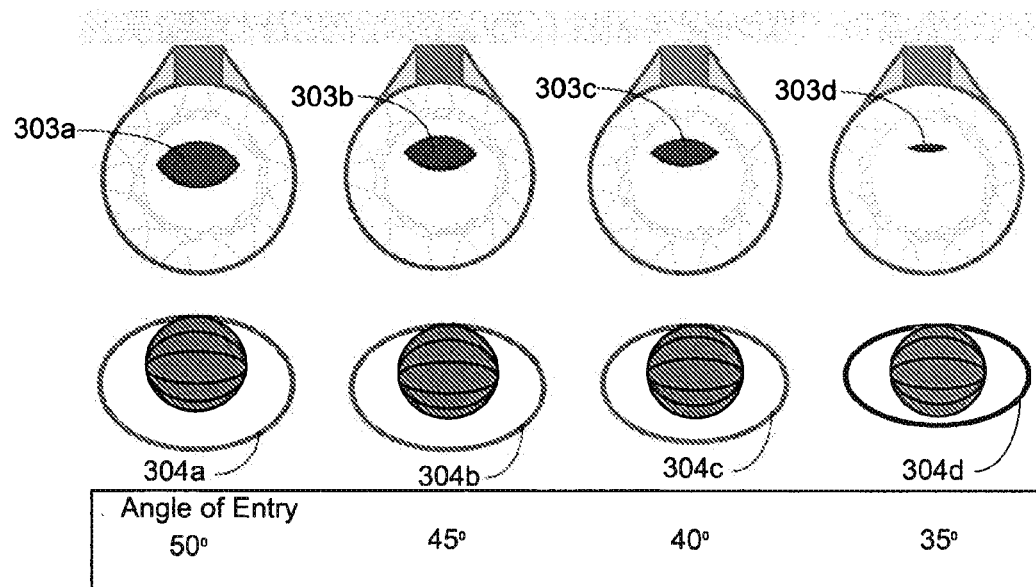

In 276, after the success criterion is defined, a make/miss zone consistent with the success criterion may be generated and one or more actual shots may be compared to some graphical representation of the make/miss zone. For example, the outcome of one or more basketball trajectories may be predicted and compared to a make/miss zone in accord with a defined success criterion. Next, in 278, the predicted shot outcome may be output in some format, such as but not limited to a graphic format. A few examples of an output format are shown in FIGS. 5A and 5B. In 280, information related to the basketball trajectory performance may be stored to a database, such as but not limited to captured frame data, primary trajectory determination, second trajectory determination, make/miss zone and shot outcome.

The following two FIGS. 5A and 5B, show the effect of the entry angle of the shot on the size of the make/miss zone. In FIG. 5A, the success criterion that leads to make miss/zones, 302a-302e, include shots that hit the rim and went in as well as shots that didn't hit the rim and went in. In FIG. 5B, the success criterion that leads to make/miss zones, 303a-303e, include only shots that don't hit the rim. For 302a-302e and 303a-303e, any shot where the center of the basketball passes through the make/miss zone as it enter the basketball hoop is predicted to be a made shot, which is graphically represented in FIGS. 5A and 5B. As is shown in the following section, "Calculating Basketball Trajectory Dynamics: Basketball Swish/Make Analysis," the prediction methodology is validated experimentally but may not be 100% accurate.

Figure 8A:
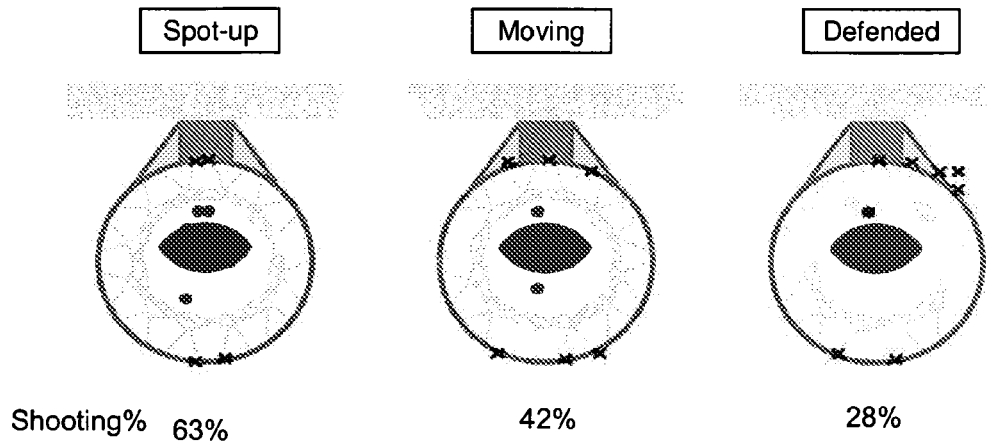
FIGS. 8A-8D are embodiments of graphical formats that include make/miss zones and the positions of individual shots relative to a defined make/miss zone for embodiments described herein.
Figure 8B:
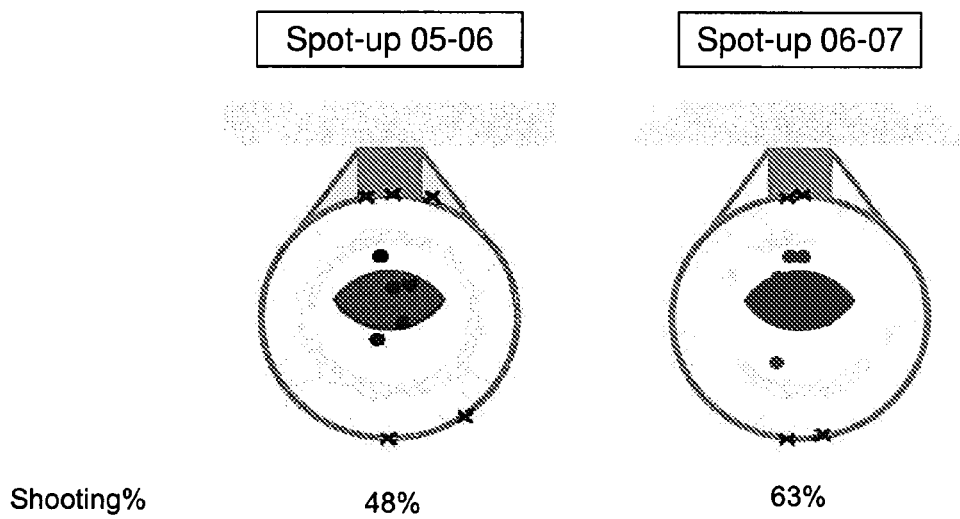

FIGS. 5A and 5B provide examples graphic output formats related to the evaluation of a basketball trajectory performance for embodiments described herein. More examples are shown in FIGS. 8A-8B. The make/miss zone for any entry angle may be generated, but for the FIGS. 5A and 5B increments of five degrees starting at 30 degrees are shown.

The location of shots in the make/miss zones for entry angles of 50, 45, 40, 35 and 30 are shown in FIGS. 5A and 5B. In FIG. 5A, the outline of the area defining the make/miss zone is shown. This make/miss zone includes shot that went in the hoop after hitting the rim and shots that went in the hoop without touching the rim. The outline of each of the make/miss zone is drawn in the plane defining a top of a basketball hoop.

In FIG. 5B, the outline of the area of the make/miss zone, which includes only shots that went through the hoop without touching the rim are shown. The make/miss zone is plotted for shots with entry angles of 50, 45, 40 and 35 degrees. Again, the outlines of the make/miss zones are drawn in the plane defining a top of a basketball hoop. The locations of individual shots are not shown in the FIGS. 5A and 5B. However, graphical formats that include make/miss zones and the positions of individual shots relative to a defined make/miss zone are shown and described with respect to FIGS. 8A-8D.

In FIG. 5B, a graphical format showing the rim size from the point of view of the basketball is shown. As the entry angle of the basketball as it approaches the hoop decreases, the hoop appears smaller to the basketball. The entry angle decreasing relates to a basketball shot with a decreasing arc. Drawing the hoop from the perspective of the basketball is a way to graphically indicate that as the arc of the shot decreases, there is less room for error in shooting the ball in regards to placement of the ball between the front and the back of the rim. As noted in FIGS. 2B-2E, however, the probability of making a shot decreases when the arc of the shot becomes too large. One reason for the decrease in shooting percentages at higher entry angles is that the amount of force needed to be applied to the basketball increases as the entry angle increases above a certain point. At high entry angles, velocity errors become more significant because of the increased force needed to be applied to the basketball for it to travel a trajectory with a high entry angle. For higher arcs, changes in release power and release angle have an exaggerated influence on distance variability. Hence, the shooting percentage decreases as shown in FIGS. 2B-2E.

Figure 6:
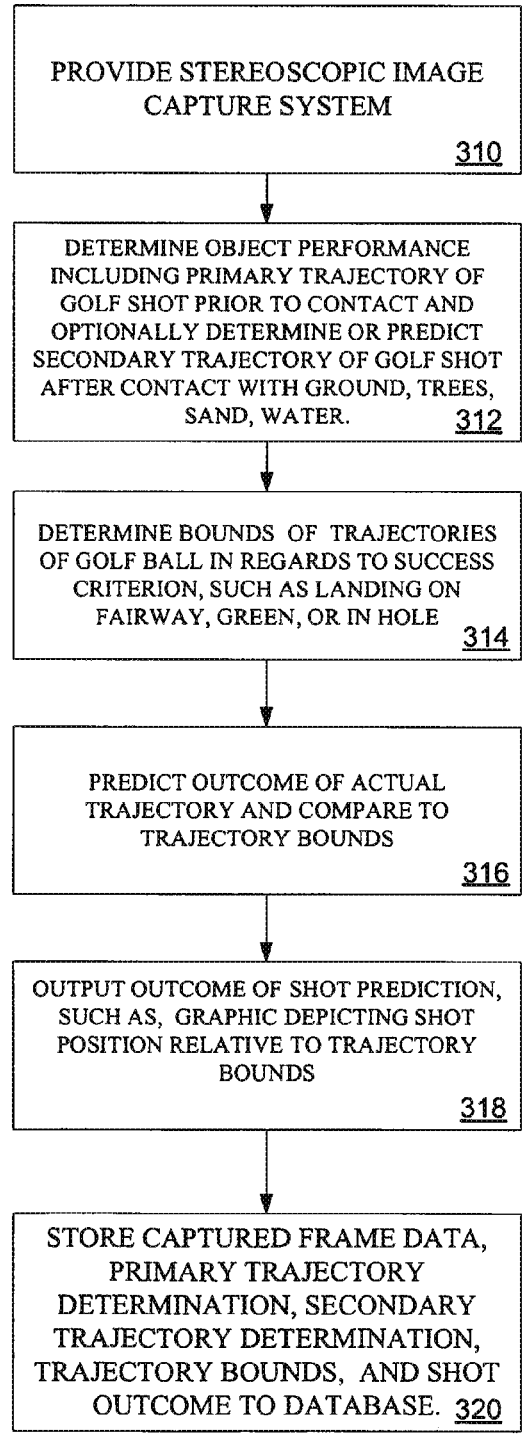
FIG. 6 is an embodiment for golf of the method described with respect to FIG. 4.

Next, a flow chart of a specific embodiment of image capture and analysis related to golf is described. FIG. 6 is an example of the method described above with respect to FIG. 4 which includes details that may be specific to the game of golf. In 310, a stereoscopic image system suitable for golf is provided. Examples of such a system are described with respect to FIGS. 21-23 as well as with respect to U.S. application Ser. No. 12/015,445, titled "TRAJECTORY DETECTION AND FEEDBACK SYSTEM FOR GOLF," incorporated by reference above. Trajectory dynamics of a golf ball are described with respect to FIG. 20. Further, Ser. No. 12/015,445 includes additional details in regards to calculating trajectory dynamics of a golf ball.

In 312, the primary trajectory of a golf ball from a point where it is struck with a club to a point where it lands may be predicted. The affects of bounce or roll of the golf ball may or may not be predicted. The trajectory after the ball firsts hits a surface may be referred to as a secondary trajectory. The affects of a ball hitting sand, water, short grass, tall grass, cart path, etc. may be modeled. If objects with a vertical height, such as trees, are defined. It may be possible to predict that the golf ball hits such an object.

The predicted data may be generated so that it matches some portion of the trajectory captured by the trajectory capture system. For example, if the end of the trajectory is captured, initial conditions of the trajectory may be predicted that match the end of the trajectory captures. As another example, when the beginning of the trajectory is captured, a prediction of the landing point of the golf ball may be predicted. If the initial portion and the landing portion of the golf ball are captured, then a trajectory that best matched the initial portion and landing portion may be captured. It may not be possible to exactly match the trajectory to the captured data because some inputs that affect the trajectory of the golf ball may be unknown, such as a wind speed along the golf ball's trajectory or the condition of the golf ball (if the golf ball is damaged, the trajectory of the golf ball may be affected.)

As described with respect to FIG. 4, a success criterion may be defined. One example, in golf, of a success criterion may be that the golf ball at least initially lands in a desired target area, such as on a green or within a fairway.

In 314, a range of trajectories of a struck golf ball that satisfy the constraints of the success criterion may be determined. In one embodiment, a range or set of potential trajectories that lead to successful shots may be determined using a Monte Carlo analysis as was described with respect to FIG. 2A. From this determination, a range of variables that lead to a success shot may be established. Further, as is shown with respect to FIGS. 2A-2E, the effects of variability of one or more parameters may be included in the determination. In 316, in one embodiment, an individual golf trajectory may be compared to the results of trajectory simulation to determine whether the shot meets the success criterion. In another example, the shot outcome may be predicted using analytical and/or experimentally generated data and then compared with the success criterion.

In 318, one or more predicted outcomes may be graphically represented. One example of the graphical representation is to indicate in some manner to the player how certain variables affect the predicted outcome of shot and its associated trajectory. In basketball, a make/miss zone is one example of such a graphical representation but many such representations are possible and are not limited to this graphical format. One example of a graphical representation for golf may show as a function of initial flight angle what locations the center of the club head needs to pass through to result in the ball landing at a location defined by the success criterion. These points could be plotted in a plane that is tangent to a surface of the ball at a location where it is struck, such as perpendicular to vector indicating a direction of movement of a center of a face of the golf club. This plot may be generated for a range of initial club speeds. In another example, the make/miss zone may be drawn on the face of the club where the size of the make/miss zone may be a function of the orientation of the club when it strikes the golf ball. This type of format may provide an indication to the player in regards to what is the best orientation of the club that leads to the defined success criterion.

Methods of Analyzing and Archiving Captured Image Data

FIG. 7A is a flow chart of a method for processing captured image data. It may be used in conjunction with the methods and apparatus for capturing, analyzing and storing results from a sporting performance described above. FIG. 7B is a flow chart that includes a specific embodiment of processing captured image related to basketball. Details of a system that may be used with method and additional details related to the method are described with respect following sections.

In 400, for one or more image frames objects in the frame may be identified. Examples of some objects that may be identified from image data include balls, sporting equipment, people and parts of people. One or more frames may be needed to identify an object. In 402, when data has been captured that allows the position of each object to be determined in some reference frame, then a position of each object in the reference frame may be determined. This step may be optional.

In 404, the self and relative characteristics of objects may be determined. A self-characteristic may relate to a property of an object relative to itself, such as identifying an object as a head with eyes gazing in a particular direction. A relative characteristic may relate to a property of an object that is determined in relation to another object. For instance, a player may be a shooter or a defender in a basketball game. The player may be identified as a shooter by identifying the basketball and then associating the basketball with a particular player. A defender may be defined as a player that is in the vicinity of the shooter, such as within a certain distance of the shooter. Again, all of the determinations may not be performed for an object that is identified.

In 406, identifiers may be associated with each of the determined self and relative characteristics associated with each object. These identifiers may be used for searching purposes. For instance, in basketball, defended/undefended or contested/uncontested may be used to describe whether or player was guarded while making a shot and could be used as identifiers. In general, an identifier may be defined for a particular relative or self characteristic of an object. When through analysis an object is determined to have a characteristic associated with a particular identifier at this step the identifier may be associated with the object.

Identifiers may be associated with a group of related objects that appear in multiple frames. For instance, a shot may refer to an object identified as the ball that appears in multiple frames. The position of the ball may change frame to frame and the relative size of the ball in each frame may change as a function of the position of the cameras. The term shot relates the object that has been identified as the ball in the multiple frames. Thus, characteristics of objects relative to different frames may also be determined and assigned an identifier.

In 408, raw data, analyzed data, such as, parameters that define the position/shape of an object in the frame, a position of the object in a related reference frame, information regarding relative and self characteristics and associated identifiers may be stored to a database. It is anticipated that the database may store many analyzed frame images and thus, an interface may be provided that allows information to be mined from the database and output to a user. In 410, an interface may be provided that allows a user to search the database for identified objects of interest.

A specific embodiment of the method described in FIG. 7A is described with respect to FIG. 7B. For the purposes of illustration, one or more mono, stereo or RGB-Z (Canesta-type) camera(s) and/or one or more microphones may be used to gather data at a location where basketball is played. Additional details of a data capturing system are described with respect to FIGS. 13A-14B. Although only image data is described as being analyzed in FIG. 7B, other data that may be associated with an object, such as sound data, may be captured and analyzed. For example, the use of a number of microphones may allow a determination that a sound has emanated from a particular position on the court. When an object is located at or near the position, the sounds may be associated with the object.

The cameras may allow information to be captured on one or more of the following parameters (color, size, shape, velocity, direction, rotation, sound) of one or more of the objects on or near the court, such as but not limited to a basketball, rim, backboard, shot clock, shooter #13, hands of shooter #13, head of shooter #13, eyes of shooter #13, gaze direction of shooter #13, shoulder rotation of shooter #13 with respect to the basket, feet of shooter #13, defender #15, hands of defender #15, feet of defender #15, head of defender #15, eyes of defender #15, gaze direction of defender #15, rebounder #20, hands of rebounder #20, head of rebounder #20, eyes of rebounder #20, gaze direction of rebounder #20, basket, referee, referee's hand motions, sideline, coach, bench players. The microphones may allow sound objects to be captured and possibly associated with a visual object. A few examples of sound objects may include but are not limited to a referee's whistle, ball hitting rim, coach's words.

The capture system may enable all sensors, such as the cameras and microphones, to automatically establish communication with a host computer which would allow additional sensors to be added to or removed from the matrix in a real-time manner. The sensors may have the ability to communicate useful data to the host and to ignore information that is not useful. Further, the host computer may be able to decide and communicate to the sensors what information is most useful in order to minimize bandwidth requirements and in order to maximize system reliability in the event that one or more sensors malfunction. The sensors may be powered by wire, by battery or by energy impulse sent from host causing the sensor to record and compute and send its data back to host.

For basketball, sensors may be mounted on the backboard, on the time clock or in other positions. The sensors may be physically placed on the players, coaches, referees or ball to aid in the collection of relevant data. These sensors might include, for example, RFID tags or wireless microphones sewn into the uniforms of the players and referees. As another example, 3-axis accelerometers shaped like a ring or a glove may be added to the player to gather detailed data on the 3-D motion of the hand during a shooting or passing motion.

The sensors may be automatically configurable to allow quick set-up and robust operation. For example, the cameras may observe the court markings and hoop position, allowing each camera to accurately place itself in 3-D space. A sensor network may be able to automatically adapt to an environment without court markings, for example on an outdoor court. In this environment, the sensors may find their own position in 3-D space relative to the hoop, other cameras and available navigation markers.

The gathered information may be tracked over time allowing important parameters to be analyzed and associated with one another. For example, a shot taken by player #3 after screen from player #5 off left hand dribble from top of key from a release height of 11', 6" at a release angle of 47 degrees while being guarded by player #5 with left hand occluding vision and right hand being 6" below and 6" back of ball at release. Shot travels to the basket reaching a total height of 17'3" and hits the rim at 2:00 position with an entry angle of 45 degrees and a velocity of 24 feet/second and rebounds to a height and position on the backboard of 2' right of hoop and 3' above hoop and then continues to a full height of 16'4". Rebounder #12 blocks out offensive player #15, then jumps from the right block to a height of 14'6" to acquire the rebound. Further, digital capture of information allows views to be indexed automatically so that any aggregation of sequences (Example: all shots taken by athlete #3 in the past 20 games from beyond the 3-point arc while being closely guarded) could be automatically assembled for review, coaching and learning.

Information in the above paragraph may be represented mathematically in 3-D space allowing information to be effectively stored, indexed, sorted, grouped, compared, retrieved, communicated and/or rendered as an animation. In addition, information can be modified by transformation algorithms to allow straightforward integration by broadcast, web, editing or video game developers in each of their preferred formats. For example, position data for Electronic Arts' NBA Live 2007 for XBOX 360 may be stored in a different manner than position data for Take-Two Interactive's NBA 2K7 for the Playstation 3.

Data from the database may also be presented in various forms on the web, on television or on a video game to a broadcast or to live audiences, such television audiences. A presentation may be real-time feedback to one or more of athlete, coach, local audience, remote audience. The data and/or presentation may be archived for later review, analysis or entertainment. The format of the presentation may vary according to the interface on which it is displayed. For example, the format of a presentation for a web-browser may differ from the format of a presentation for a television. Real-time feedback may involve simultaneous generation of presentations suited for different interfaces, such as the simultaneous generation of a web, television and radio presentations.

Returning to FIG. 7B, in 412, the basketball, players and characteristics of the player and ball may be identified from captured data, such as image data. In 414, a reference point may be selected and the position of objects relative to the reference point may be determined. In 416, the self and relative characteristics of identified objects, such as players, shooters, shot, pass, defender, etc., may be determined. In 418, a number of identifiers may be determined, such time/date, player name, team, 3-point shot, bounce pass, undefended shot, defended shot, etc., may be determined. In 420, data generated in 412, 414, 416 and 418, may be stored and archived. In 422, the stored data may be accessed via an interface of some type.

Examples of Real-Time Analysis and Data Presentation Using Database

As described with respect to elements, 410 and 422, of FIGS. 7A and 7B, an interface may be provided that allows captured data, such as captured image and sound data to be searched.

As an example, in basketball, a searchable, real-time database may be used to investigate questions such as:
1. Who should take the 3-point shot because they are hot this game?
2. Who should we foul because they are most likely to miss the 4th quarter free throws?
3. Does person shoot 3-point shots more accurately when guarded by_____ or by_____?

Figure 8C:
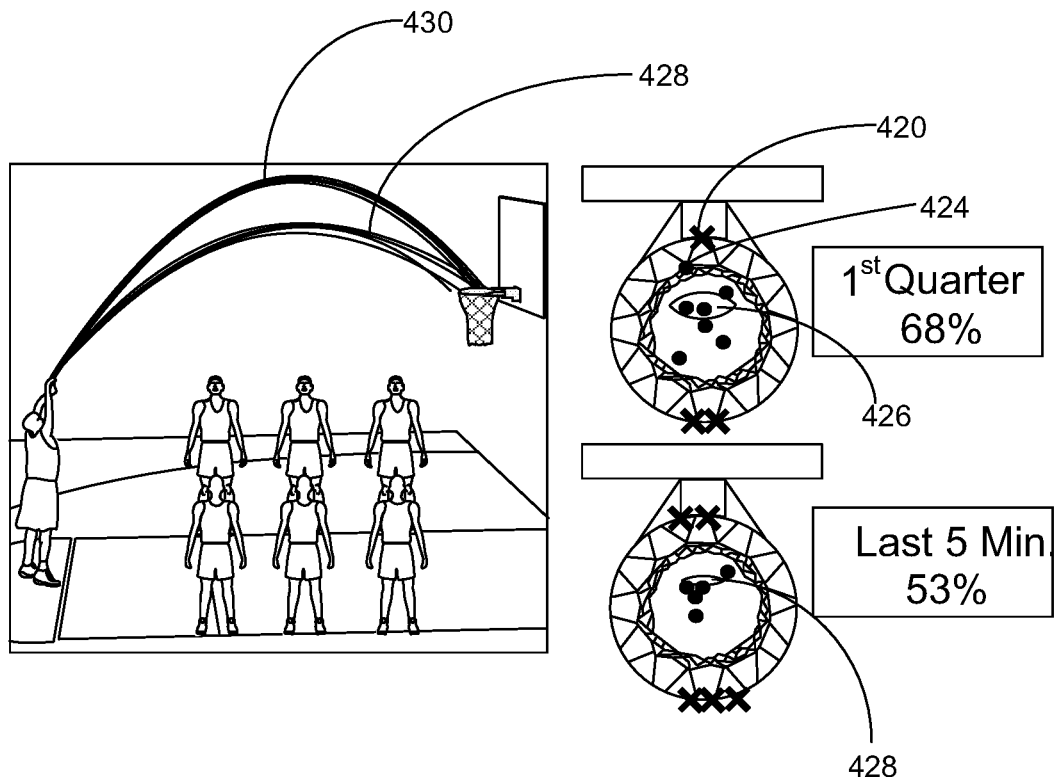
Figure 8D:
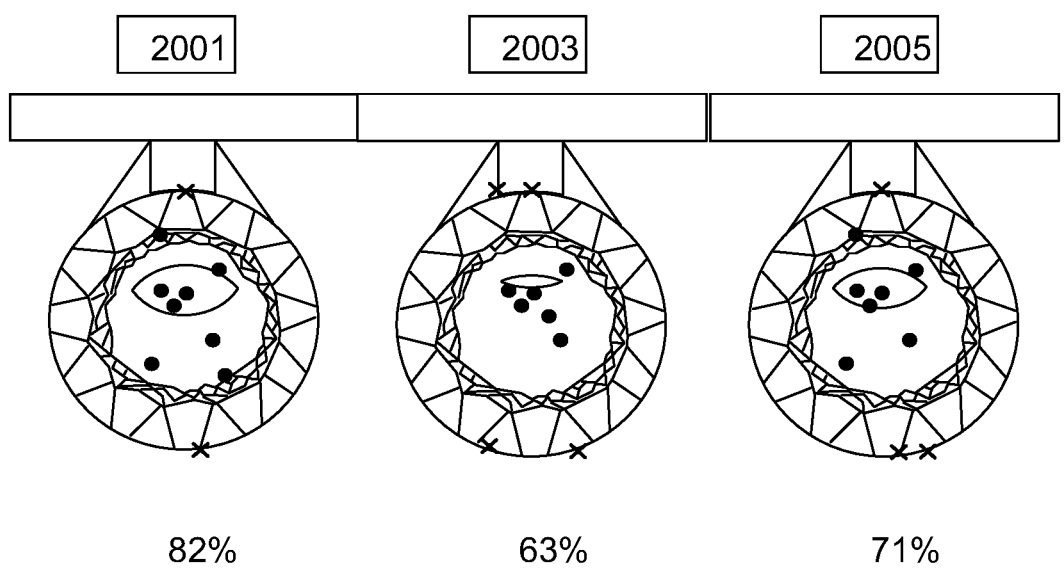

A few examples of graphic presentation that may be used to answer questions such as these are shown in FIGS. 8A, 8B, 8C and 8D. FIG. 8A is a comparison of shot locations for various types of shots and associated shooting percentage. FIG. 8B is a comparison of shot locations for one type of shot for different time periods along with the associated shooting percentage. FIG. 8D is a comparison of shot locations for different years as related to shot arc and associated shooting percentage. These types of figures may be output from an interface linked to a device that stores captured and archived data. In addition, these types of graphics may be generated in real-time, such as during a broadcast of an actual basketball game, using data captured from the current game as well as past games.

In each figure, the swish zone for swish shots is shown within a top view of a basketball hoop. The ellipses represent the swish zone. The dots represent made shots and the x's represent missed shots. Dots in the swish zone indicate swished shots that didn't hit the rim. Dots outside the swish zone are made shots that hit the rim and went in. FIGS. 8B, 8C and 8D include similar figures of a top view of a hoop with a swish zone, dots representing made shots and x's representing missed shots.

The locations of the dots and x's represent a location where the center of the basketball is predicted to pass through the plane of the hoop based on a trajectory analysis. In this example, the location of the x's is the location where the ball touched the rim causing the shot to fail. The x's could also be used to represent where the center of the ball would have been had the rim not caused the change in ball direction, since this would provide a good comparison basis for the shots that actually do pass through the plane of the hoop. As previously described, the outcome of the shot, i.e., whether it was made or not, may be based upon a predicted trajectory, where the prediction methodology may not be 100% accurate. In some embodiments, it may be possible to verify the accuracy of a predicted shot outcome using captured data, such as captured image data.

FIG. 8C is a comparison of shot locations for different game situations as related to shot arc along with the associated shooting percentage. An image of a player shooting a number of shots at the free throw line with associated trajectories for each shot is shown. The trajectories are indicated by two groups, 430 and 428. It can be seen that the trajectories in group 430 have a higher arc than the trajectories in group 428.

The trajectories associated with group 430 are associated with the $1^{st}$ quarter where the player shot 68%. The x, 420, is an example of a shot missed in this quarter. The dot, 424, is a shot made by the player in this quarter. The location of each shot relative to a swish zone 426 is shown.

The trajectories associated with group 428 are associated with the last 5 minutes where the player is shooting 53%. Since the players shooting arc is lower, the swish zone is much smaller. This comparison allows a person to determine why a player's shot is off. In this example, the player is shooting with a lower arc in the last minute which may be because the player is tired, whereas in the 1$^{st}$ quarter the player had more energy and thus, shot better.

The data represented as the 1$^{st}$ quarter and last 5 minutes may be from a single game or from multiple games. For instance, in one embodiment, the data from the 1$^{st}$ quarter may be from a game that is being broadcast and the data representing the last 5 minutes could be from previous games. As the end of the current game neared the last 5 minutes, a graphic, similar to the one shown in FIG. 8C, may be shown during a televised broadcast of the game and the announcers may comment on it. For example, an announcer may make comments such as, the player in the figure shooting at the free throw line looks tired and that he generally gets tired at the end of the game and his shooting percentage decreases. The announcer could then comment on FIG. 8C, to validate and quantify their comments.

Figure 9:
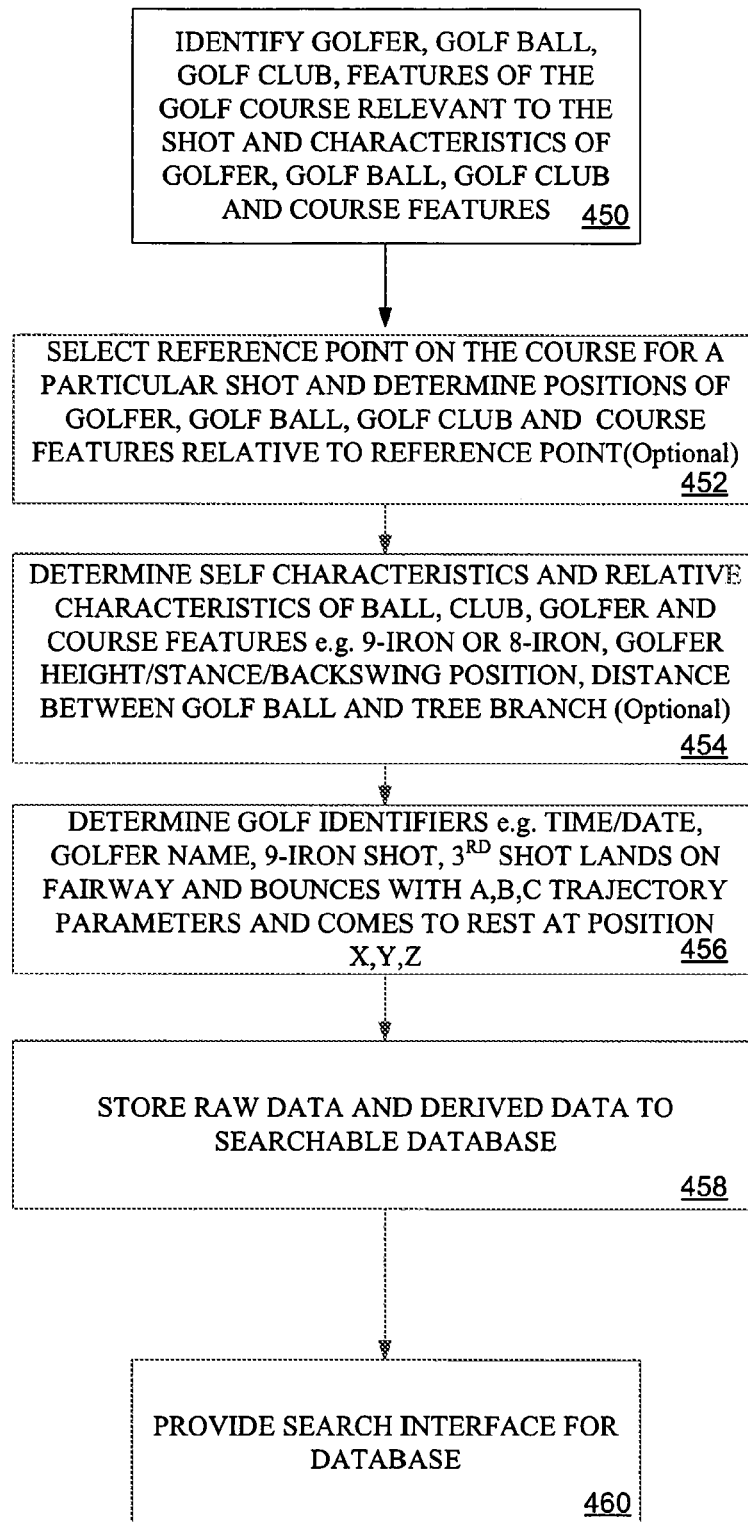
FIG. 9 is an embodiment for golf of the method described with respect to FIG. 7A.

Next, in FIG. 9, an embodiment of the method described above with respect to FIG. 7A is provided for golf. Using one or more mono, stereo or RGB-Z (Canesta-type) camera (s) and/or one or more microphones or other sensors to observe a scene allowing information to be captured on one or more of the following parameters (color, size, shape, velocity, direction, rotation, sound) of one or more of the objects on or near the course. Additional sensors may be used to capture information such as temperature, wind speed/direction, humidity.

In 450, various objects may be identified in captured data, such as video and sound data. Visual examples may include but are not limited to: a golf ball, a golf ball trajectory, a golfer, a golf club, a golf club head, a golf club head trajectory, a golf club head position, a golf bag, a caddy, trees, a water hazard, a sand trap, hands of golfer, a head of golfer, eyes of golfer, a gaze direction of golfer, a shoulder rotation of golfer with respect to the ball, feet of golfer, feet of golfer with respect to the ball, a position of fairway, an elevation of fairway, a position of tee box, an elevation of tee box, a position of green, an elevation of portions of the green, a hole position in the green, a hole number and other golfers. Sound examples may include but are not limited: a sound of club hitting ball, a sound of ball hitting tree, a sound of ball hitting sand, a sound of ball hitting water, a sound of ball entering hole, a player's words.

In 452, a reference point on the course for a particular shot may be selected and positions of identified objects relative to the reference point may be determine. In 454 and 456, the captured and derived information may be tracked over time allowing important parameters to be analyzed, including position, self and relative characteristics and identifiers. For Example, identifiers may be that Jim Smith takes 2nd shot on 3rd hole of Spyglass course from X1, Y1, Z1 position with 7-iron and ball goes to height of Y before bouncing 3 times and coming to rest in sand trap at position X2, Y2, Z2. In 458 and 460, digital capture of information allows views to be, aggregated, stored and searched via an interface of some type. For example, in 460, the interface may be used to perform a search, such as all shots taken by Jim Smith in the past 20 games with a 7-iron. Based on this query, relevant information could be automatically assembled for review, coaching and learning and displayed on the interface.

Method of Utilizing Captured Image Data for Simulation Purposes

Information gathered by a data capture system, such as but not limited to a stereoscopic image capture system and analyzed and stored may be utilized for simulation purposes. In FIGS. 10A and 10B, a method for using captured data in a simulation and a specific embodiment related to basketball are described.

In 800, data may be represented mathematically in 3-D models. For instance, a 3-D model of a participant in a sport may be generated. When the parameters of scenario to simulate are specified, these models may be used to generate scenario data for the simulation.

In 802, a number of parameters that define a scenario simulation may be specified and then, data that is used to provide the scenario may be gathered and/or generated. For instance, the specified parameters may relate to archived data from a trajectory capture system, which may be gathered. Further, the parameters may specify one or more participants for which a 3-D model is to be generated. In addition, the parameters may specify motions over a particular time period for one or more objects in the simulation. For example, an object may be a player rendered in 3-D and a specified motion may be to dribble from location A to location B and then take a shot at location B. In another example, the specified parameters may request that a search of a database including captured data be made to find a particular player executing a particular shot, such as drive to the basket. When the data is located, the player making the shot, defenders and team mates and their associated motions for some time period before and after the shot may be modeled for a 3-D simulation.

In 804, a view point within the 3-D simulation may be selected. The scenario simulation may be configured so that information may be delivered from a range of perspectives. For example, a shot sequence (shooter movement, offensive player screen, shooter receives pass, shooter's defender approaches, shooter jumps, defender responds, shooter releases shot, shot travels to basket and scores with a calculated rotation, entry angle and entry position) could be rendered into an animation from the viewpoint of the hoop, from the viewpoint of the shooter's eyes, from the viewpoint of the defender's eyes, from the viewpoint of the ball, from the viewpoint of a potential rebounder or from the viewpoint of the referee.

In one embodiment, the field of view generated may attempt to simulate aspects of actual perception. For instance, an animation for the perspective of a shooters eye may provide more detail in the direction the eyes are gazing and just blurred images to the aside. The blurred images to the side may just be general less detailed shapes that account for motion perception that is perceived with peripheral vision.

In a broadcasting environment, a broadcaster may comment on a generated simulation from a perspective not typically seen by the viewer, such as from a perspective of the eyes of shooter or the eyes of the defender in basketball or from the eyes of a server or from the eyes of a person receiving the serve in tennis. The different perspectives may provide a viewer with additional insight, such as better understanding of why or how some event happened.

One example of animation that may be useful in a broadcasting, video game or coaching environment may be an animation from a top view perspective. The animation from the top or from overhead, looking down on the court, may accurately track the movement of individual players, referees and the ball on the court. Gait, uniform number, uniform color and resting head height may be useful as parameters for keeping track of individual players at all times. Data tracked may include pass sequences for specific offensive plays, how often each play is run, position sequences for different defenses and how often each defense is run. Also, this type of animation might allow a person to understand how specific plays or defenses are improved or degraded depending upon the personnel on the court. Also, this type of information could be used to present data such as team speed down the court after a made basket, team speed down the court after a missed basket, average number of passes before the first shot is taken, etc. This type of animation may be generated in conjunction with images captured from an overhead camera system.

In 806, the 3-D simulation may be used to generate to render one or more rendered 2-D images that may be made available to a user of the system. A sequence of 2-D images rendered from the 3-D simulation may be provided as an animation. In one embodiment, the 3-D simulation may be incorporated into a video game. The 3-D simulation may be rendered using commercially available rendering graphics hardware and software such as those produced by Nvidia (Santa Clara, California). In 808, the 3-D simulation may be compared with an actual real world event to test and improve accuracy of broadcast replays or a video game experience.

In 810, the output generated from the 3-D simulation may be delivered to an interface for immediate display or stored for future display on the interface. In addition, the output of the information may be modified by transformation algorithms to allow straightforward integration by broadcast, web, editing or video game developers in each of their preferred formats. In a game developer example, position data for Electronic Arts' NBA Live 2007™ for XBOX 360™ may be stored in a different manner than position data for Take-Two Interactive's NBA 2K7™ for the Playstation 3™.

In an example related to video game development and video game play, data for unique real world basketball trajectories through 3-D space may be linked with data sets representing combinations of game controller commands that would produce the equivalent trajectory in a virtual video game representation. As an example, for a controller such as the Nintendo Wii™, the real world human shot motion with real world ball trajectory may be transformed into the accelerometer signals corresponding to the Wii™ controller shot motion and linked to the equivalent trajectory in a virtual video game representation. As another example, a wireless video game controller shaped like a ring or a glove, including a 3-axis accelerometer, may allow the gamer to have a natural shooting or passing motion while sending very complex and authentic game control commands to perform shooting or passing functions in the video game animation. This game controller may be used in conjunction with a main or master game controller. Applications of the above to games other than basketball include tennis, football, soccer, etc. are also possible and the examples provided above and below in relation to basketball and tennis are for illustrative purposes only.

In 812, 3-D models of a basketball court and one or more participants in a game, as well as coaches, referees, cheerleaders, etc., may be generated. In 814, captured video frame data (sound data may also be selected) stored in a database may be selected. Information extracted from the selected video frame data may be used to define aspects of one or more of the 3-D models, such as their dimensions, and their motions over some time period. In 816, a view point for the simulation may be selected, such as from the point of view of the rim, the eyes of a particular player, the eyes of a coach, etc. The point of view may not be fixed during a scenario simulation. For instance, if the simulation is from the point of view of the eyes of a particular player, then as the player moves around the court and turns their head, the simulation is affected.

In 818, the 3-D simulation related to basketball may be generated and in 822 video frame data and possibly sounds associated with the simulation may be output to a display for the selected perspective. In 820, the accuracy of the scenario may be assessed. For example, a selected perspective may be from the viewpoint of an actual video frame data was available and simulated frame data from the camera could be compared with actual frame captured using the actual camera.

Figure 11:
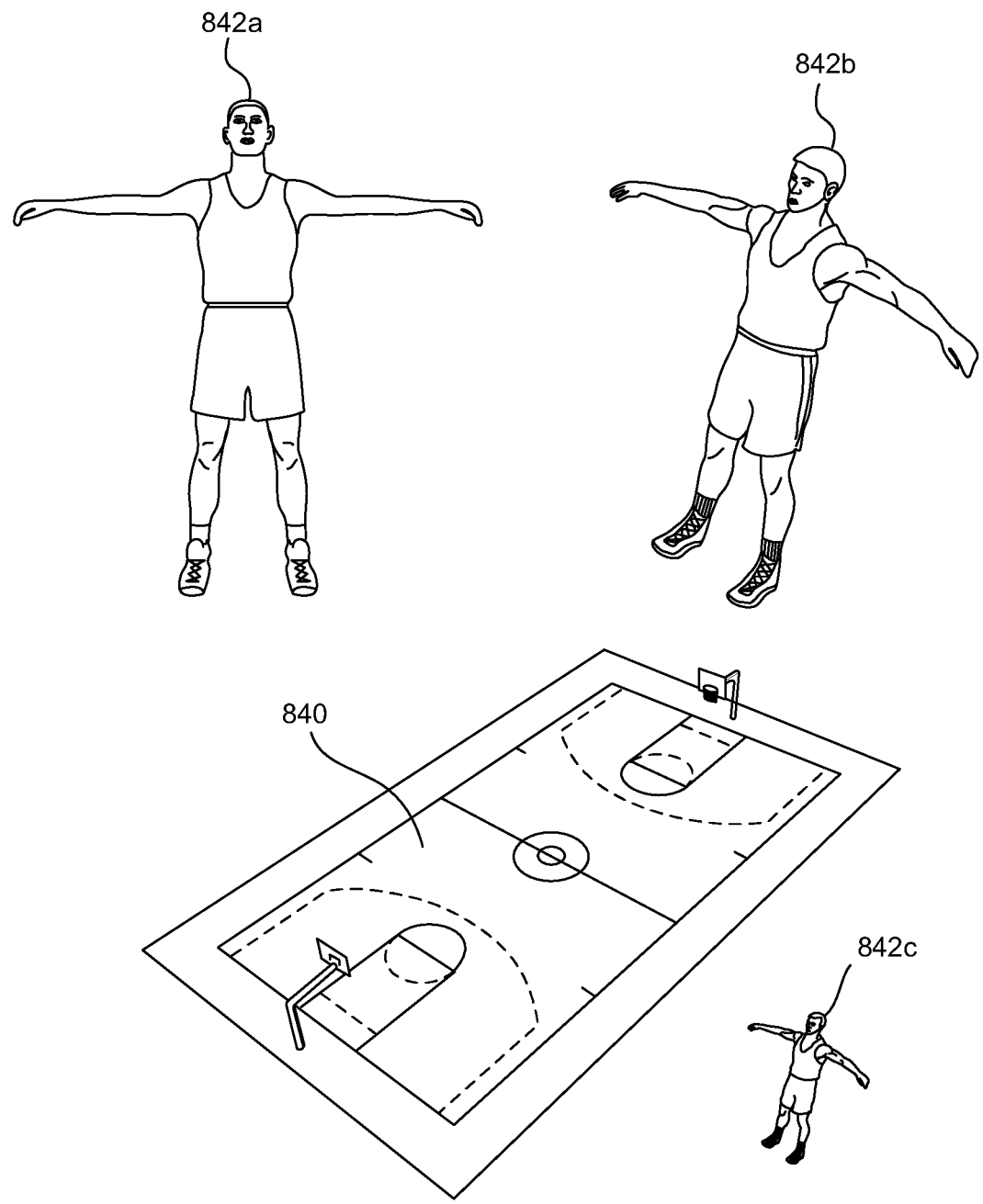
FIG. 11 are illustrations of a few examples of 3-D models of basketball player and basketball court.

A few examples of 3-D models that may be used in a virtual environment and then rendered to generate a 2-D image are shown below in FIG. 11. In FIG. 11, a player in various positions, 842*a* and 842*b* is shown. The size of the player may be adjusted as is shown in 842*c*. In the figure, a model of a basketball court, 840 is also presented. The model shown in the figure may include various degrees of freedom, such as a moveable head and limbs that may be articulated in various positions. For a particular, the manner of articulation of the various body parts may be determined to match movements of a particular player captured using the trajectory capture system. Further, the models may be configured to match a size and an appearance of a particular player, such as skin color of the player and facial features. Additional detail of the flow of information among optical capture system, full motion virtual server, synthesis server, data server, broadcast replay server and video game development server are described with respect to FIGS. 13A-14B.

To speed data extraction, in one embodiment, a pre-captured software model of each participant may be stored with the capture program. For example, if the capture program is to be used to a broadcast of a particular basketball game. The models of each of the participants may be generated prior to the broadcast. The 3-D models may include hand detail, freedom of motion for each joint, jersey detail, jersey number, body mesh, and gait. In additional, biometric information associated with each of the participants may be stored with the 3-D model, such as measured distances between a player's joints or a head size. This information may be used to recognize individual players more quickly and then to generate accurate animation replay of a particular play more quickly.

In particular embodiments, the methods and apparatus described herein and in particular with respect to FIGS. 10A-11 may provide to broadcast enhancements or internet data sets that take the mystery out of game shooting percentages in basketball. In particular embodiments, the enhancements may include automatically generated animations using machine vision collected trajectory parameters that accurately generate the make-miss-rebound result of the real shot. As previously described, the basketball trajectories may be generated using analytic predictions and/or actual data.

In addition, the methods and apparatus may provide video games that more accurately predict whether a virtual shot will score and more accurately display how the ball and net would have moved before and after the ball passes through or outside of the rim. Further, the methods and apparatus described herein may contribute to video games that more accurately display the movements of athletes and the ball during a game or virtual reality games with a real basketball that accurately predict whether that a basketball shot at a virtual 3-D basket would have scored if shot at a real basket. Also, the methods and apparatus describe herein may allow basketball coaches and trainer to increase the probability that a shooter will score or conversely to increase the probability that a defensive move will prevent the shooter from scoring. For instance, the coaches and/or trainers may show players various simulated scenarios to improve their game play.

Figure 12:
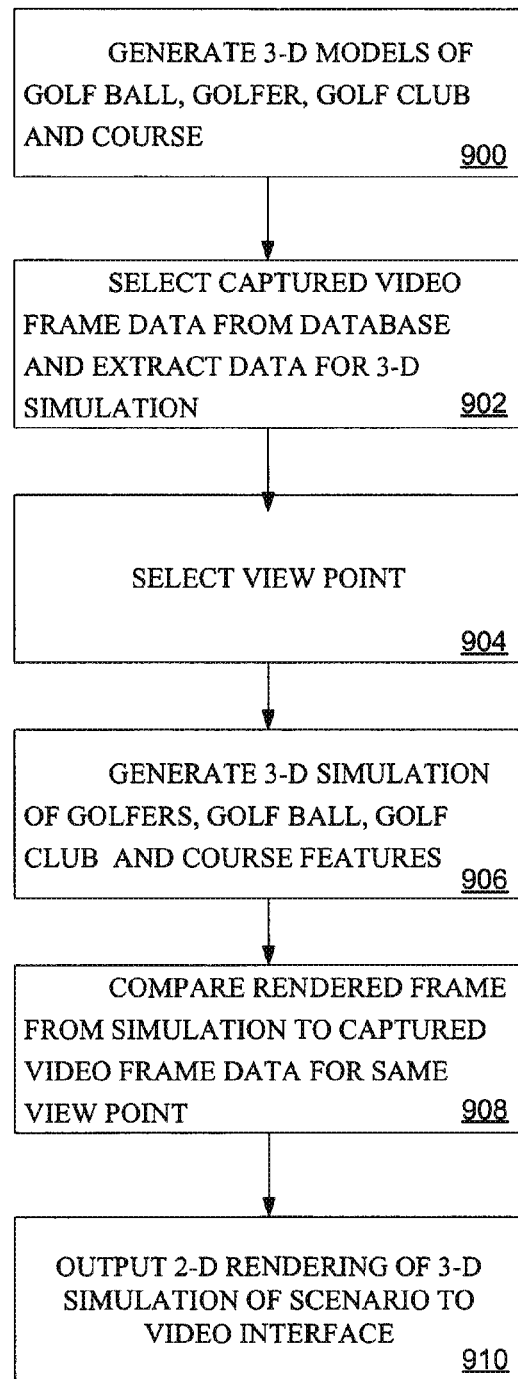
FIG. 12 is a specific embodiment for basketball of the method of FIG. 10A.

FIG. 12 shows a specific embodiment of the method described with respect to FIG. 10A as applied to golf. In 900, 3-D models of golf balls, golfers, golf clubs and one or more golf courses may be generated. In 902, captured video and sound data may be selected from a database of such data and information from the selected data may be extracted for use in a 3-D simulation. For instance, articulations of a player's various body parts during a swing may be extracted from capture video data and applied to a 3-D model of a golfer as a function of time. In 906, the 3-D simulation including one or more of golfers, golf balls being struck, trajectories of golf balls, etc. that may be seen on an actual golf course may be simulated from the view point selected in 904.

The 3-D model may be rendered into an animation from a number of viewpoints including the golfer's feet, the golfer's gaze, the ball, or the hole. In 908, the rendered animation may be compared to actual frame data if desired. For example, a 3-D simulation may be generated and rendered from the viewpoint of an actual camera and compared to video frame data captured from the camera. In 910, the rendered animation may be output to a video interface. The video interface may allow a user to speed up or slow down the simulation. In some embodiments, simulations from multiple view points may be generated and displayed simultaneously. For example, an animation from the view point of the ball could be viewed next an animation rendered from the view point of hole.

For gaming applications, data for unique real world golf ball trajectories through 3-D space may be linked with data sets representing combinations of game controller commands that would produce the equivalent trajectory in a virtual video game representation. As an example, for a controller such as the Nintendo Wii,™ the real world human swing motion with real world ball trajectory could be transformed into the accelerometer signals corresponding to the Wii™ controller swing motion and linked to the equivalent trajectory in a virtual video game representation. As another example, a wireless video game controller shaped like a ring or a glove, including a 3-axis accelerometer, may allow the gamer to have a natural swinging motion with a standard golf club handle while sending very complex and authentic game control commands to perform swinging functions in the video game animation. This game controller might be used in conjunction with a main or master game controller. Additional detail of the flow of information among optical capture system, full motion virtual server, synthesis server, data server, broadcast replay server and video game development server are shown in FIGS. 13A-14B.

The simulations and their associated methodology described herein may provide broadcast enhancements or internet data sets that take some of the mystery out of golf scores. The enhancements may include automatically generated animations using machine vision collected trajectory parameters that accurately generate the result of the real shots and relate those results to objectives such as drive distance, fairway placement and green placement. Further, the methods and apparatus described herein may provide video games that more accurately predict where a virtual shot will land and more accurately display how the ball would have moved before and after the ball hit the fairway, green or obstacle and video games that more accurately display the movements of athletes and the ball during a round of golf. Further, the methods and apparatus described herein may be utilized in a virtual reality games with a real golf ball and golf clubs that accurately predict where a shot on a virtual 3-D course would have settled if the shot had been taken on the real course from the view point of what a player actually playing on the course would see. In addition, the methods and apparatus may be utilize for golf coaching and training to increase the probability that a golfer will play the course in an optimal manner given his capability and the specifics of a given golf course.

Image Capture and Analysis System

There are aspects of the game of basketball that may lend itself to the use of the methods and apparatus described herein, such as a stereoscopic imaging system. A few of these aspects may be as follows:

1. Basketball may be played in a confined space with a small scoring target.
2. The scoring occurs only when the basketball has gone above 10 feet, allowing scoring to be clearly identified and most player movements (offensive and defensive) to be associated with a particular shot (either prior to the shot or after the shot).
3. Basketball is often played in venues, such as an arena or gyms, where clear views of the entire court are valued, so camera positions that obstruct fan views are discouraged. Nevertheless, as described herein, outdoor applications using systems that may be temporarily set-up are also possible.
4. Basketball is played in a way that for most of the playing minutes, all 10 players are on only one end of the court rather than spread over the entire court.
5. Basketball has only 10 players on the court at a time.
6. For most of the minutes, the offensive players face the basket (post moves are the exception) and the defensive players have their backs to the basket. Players are usually separated from each other (post players the exception). Since there are large numbers on both front and back of uniforms, this allows a single camera system above the basket a clear view of player numbers.

Because of these aspects of the game of basketball, it may be possible, in one specific embodiment, to capture all important activity of a basketball game from two small, unobtrusive, relatively inexpensive, relatively easy to operate camera systems (one above each basket). However, other more complex camera systems may also be utilized.

Figure 13A:
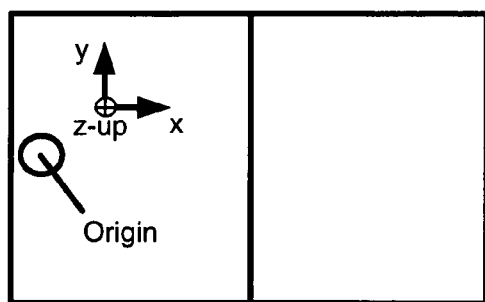
FIGS. 13A-13D are illustrations of image capture system.

In one implementation, which is provided for illustrative purposes only, there is a camera system positioned above and behind the basket on each on each end of the floor. In FIG. 13C, the camera systems, 1000a and 1000b, above each basketball and behind on end of the floor are shown. Each camera system may have 6 stereo camera pairs with capability similar to the TYZX 3D Aware Stereo Vision product:

30 frames per second
   22 cm baseline
   512×480 resolution
   45 degrees field of view
   2.6 meter to 19 meter viewing range Range resolution of 0.6 cm at 2.6 meters and 34 cm at 19 meters Spatial resolution of 0.4 cm at 2.6 meters and 3 cm at 19 meters 2.6 billion pixel-disparity evaluations per second Five of the stereo camera pairs are focused on the floor action as shown in FIG. 13C. A field of view for each of the cameras in the camera system 1000a focused on the floor for one half of the court is shown in the figure. These cameras may be able to capture 3-D position of all movement of the ball, 10 players and 3 referees for the half court.

One of the stereo camera pairs, contained in the same enclosure as the other 5 pairs of 1000a, may be focused on the hoop and the surrounding vicinity as shown in FIG. 13C. This camera pair may be able to accurately resolve ball entry angle to +/−1 degree and ball entry position to +/−0.2 cm in the X and Y axis and to +/−0.3 cm in the Z axis. The x, y, z coordinate system is shown in FIG. 13A where the origin of the system may be the geometric center of the hoop.

Figure 13B:
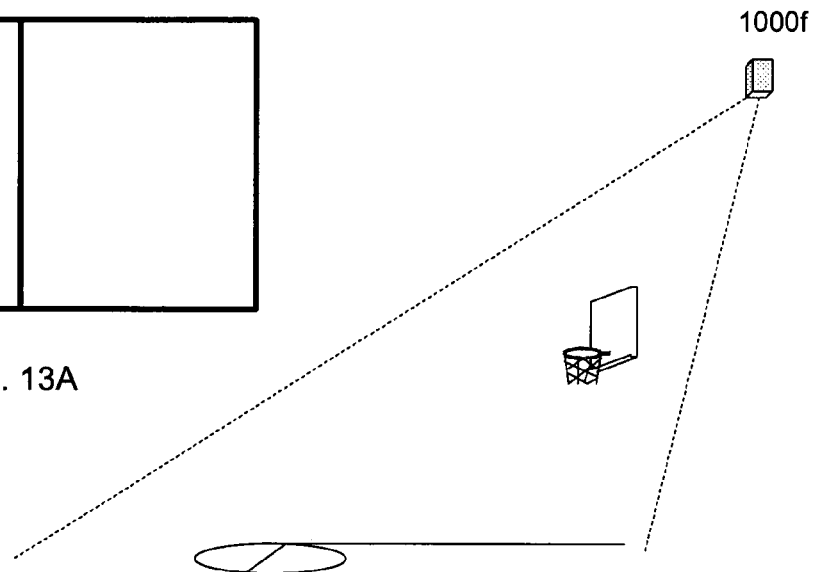
Figure 13C:
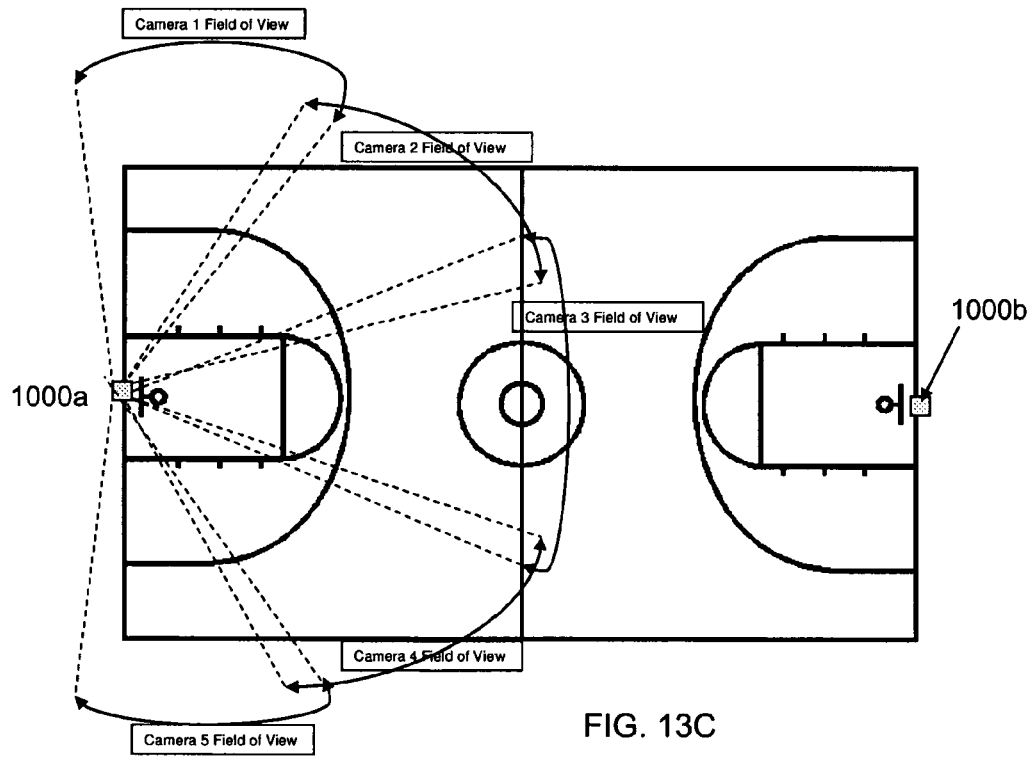
Figure 13D:
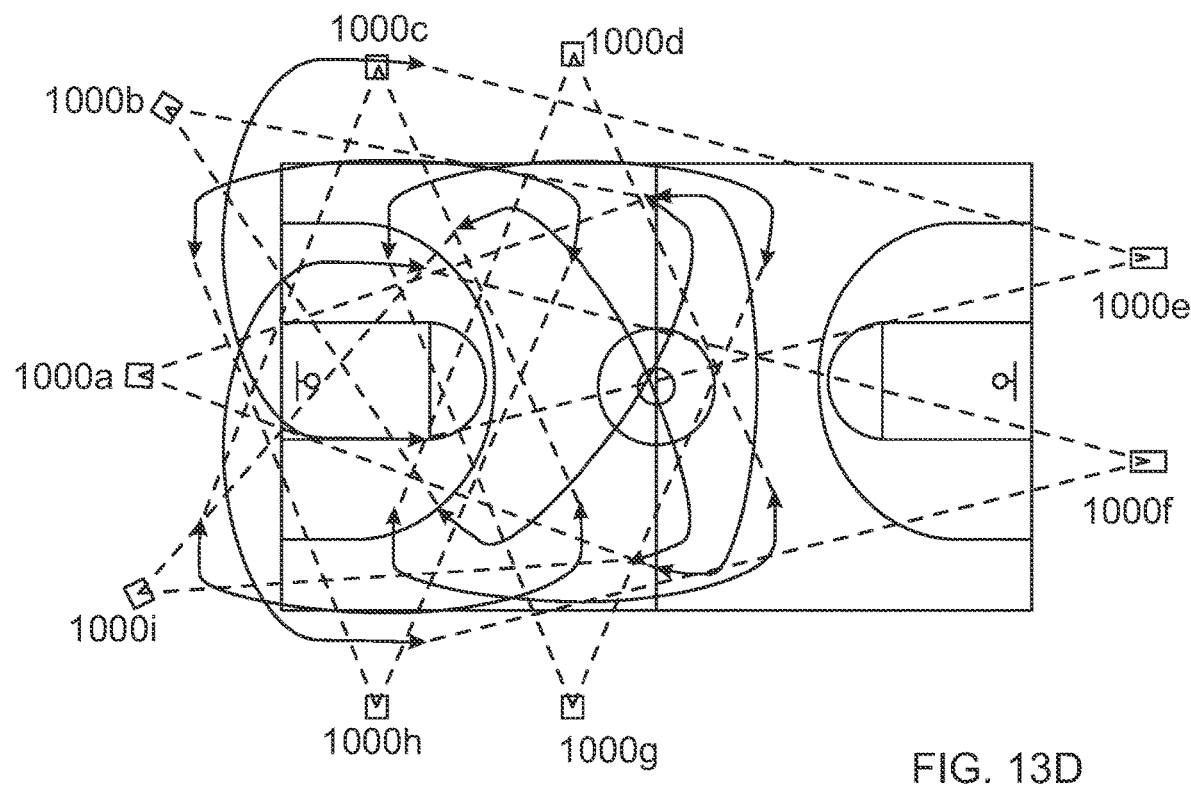

Another example of camera system set-up is shown with respect to FIGS. 13B and 13D. In FIG. 13D, the camera system set-up includes 9 camera systems, 1000a-1000g, focused on ½ of the basketball court. A simplified view of images that may be captured from camera 1000f is shown in FIG. 13B. In this embodiment, the primary cameras may be fixed in position at about a 45 degree angle to the court with at least 8 cameras per side. This angle may minimize occlusion for the camera views while increasing camera separation for accurate 3-D object/human placement.

Figure 13E:
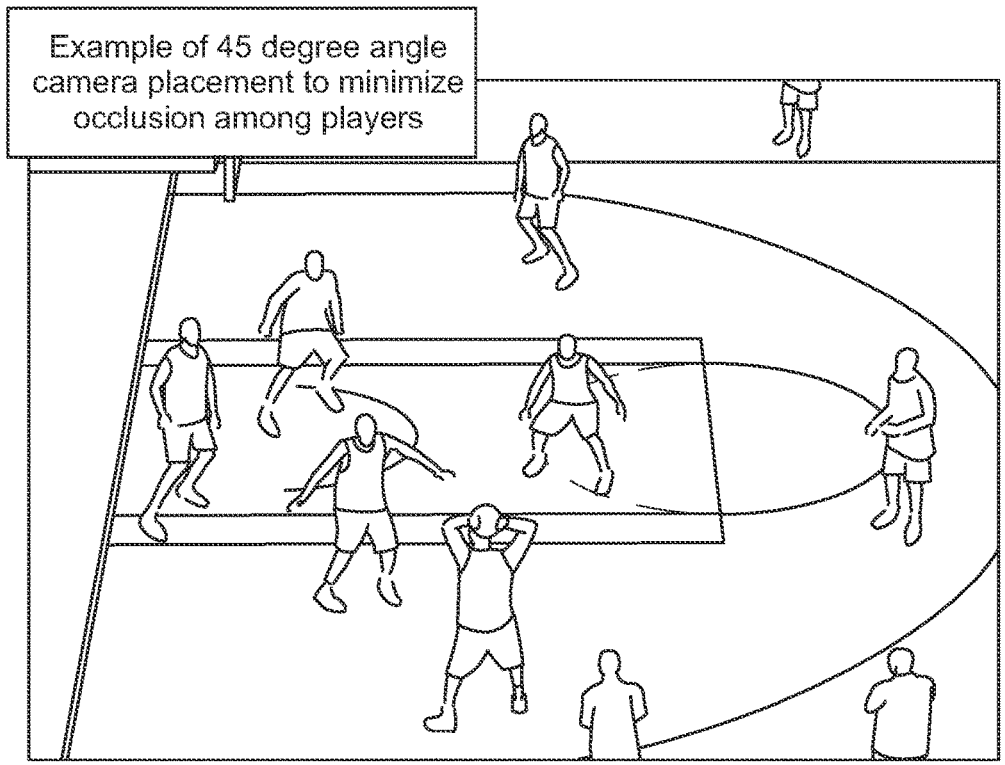
FIG. 13E is an example frame of image data generated from an image capture system.

FIG. 13E shows an image captured with 45 degree camera placement. In the figure, the position of 7 players participating in a 3-on-4 game can be seen where three coaches are standing on the side-lines. One player with the number eight on their back is holding the ball. This image is an example of a video frame that may be stored and archived and then later mined for relevant data, such as player positions, player motions, pass trajectories and shot trajectories that were recorded in a sequence of video frames.

Additional cameras that may be utilized include cameras looking straight down from above, cameras placed on the top of the time clock, cameras placed on the basket pole, and cameras near (or in) the floor. The camera positions may be selected to avoid creating safety issues or blocking the view of coaches or fans. Cameras positioned in the fan seating may also be of value even though the view would often be obstructed due to movement of the fans. When the view is clear, then the cameras would provide useful additional information. Further, in one embodiment, images from cameras positioned in these locations may be used to generate simulations that compare a fans view with a player's view or a coach's view.

Camera calibration, both absolute across the field and relative camera-to-camera may be important for all 3-D motion capture systems. For the 45 degree cameras and the top view cameras, calibration may be performed using floor markings and hoop/backboard positions. For floor cameras and fan seating cameras, the floor markings may not be adequate and hoop/backboard position may not be sufficient for calibration purposes. Since these cameras may need to be calibrated in both absolute terms and relative to other cameras, one method for this calibration may be to use LED dots near the 45 degree cameras in conjunction with hoop and backboard position to perform the calibration for these cameras.

The captured image data may be analyzed to calculate important attributes that impact game performance. These attributes for a player or for a team may include maximum or average or average determinations of a number of parameters including but not limited to height of maximum jump, height and distance of maximum dunk shot, height of maximum rebounding hand, quickness of shot release, quickness of cross-over dribble, quickness of between the leg dribble, quickness of behind the back dribble, quickness and length of first drive step from triple threat position, etc. The captured image data may be stored in a searchable data and determinations above may be generated via an interface coupled to the database.

Like basketball, there are aspects of golf, as a game, that may lend itself to the use of the method and apparatus described herein. A few of these aspects are as follows:

1. Golf is played in an open space with wide varieties of lighting.
2. Scoring consist of a series of shots on each of 18 holes.
3. Physical features of the holes change from course to course and also change on any given day. For example, the hole location changes daily and obstacle features like trees are trimmed, removed or added.
4. Only a small number of golfers (2 or 4) play a particular part of the course at any given time.
5. Each golf shot is taken after a pause of time from a known location (where the ball lies on the ground).
6. Each golf shot is taken with only one club, but the club can be uniquely chosen by the golfer for each shot.
7. Environmental factors such as wind, humidity and temperature have a material impact on the flight of a golf ball.

In view of the above, it may be possible to capture important activity of a round of golf from an unobtrusive, relatively easy to operate camera system that follows each playing group during the round of golf. However, in some instances, it may be possible or desirable to set up fixed system(s) at a number of locations, such as at locations or near the greens that may be shared by all golfers. A portable camera system could be transported on a modified golf cart. This camera system could utilize multiple pairs of stereo cameras similar to those described above with respect to FIGS. 13A-13E but could also utilize a 3-D Flash Imaging LIDAR system similar to that supplied by Ball Aerospace. This camera system might also include a global positioning system and include environmental sensors to measure humidity, temperature, wind and sound. This camera system may capture the course and golf swing conditions for each shot at the beginning of the shot (camera position 1) and at the end of the shot (camera position 2). The integration of 3-D data from these two positions for each shot would enable data acquisition without negatively impacting the golfer, the observers or broadcast television.

Accurate camera calibration, both absolute across the field and relative camera-to-camera may be performed for golf 3-D motion capture systems. In one embodiment, a calibration approach may be an extension of the approach used for the Ricoh Caplio 500SE (Ricoh Company, Ltd., Tokyo, Japan) and may include GPS position, a compass for horizontal rotation and an accelerometer for vertical rotation. Absolute calibration across the field may be done prior to the motion capture event. During the motion capture event, the cameras may be instantly calibrated relative to other cameras. In one embodiment, 8 cameras may be utilized. The capture image data may be used to generate relatively accurate 3-D models of the motion capture event, such as 3-D models of a golfer swinging a club.

Image Analysis, Synthesis, Storage and Retrieval System.

Figure 14A:
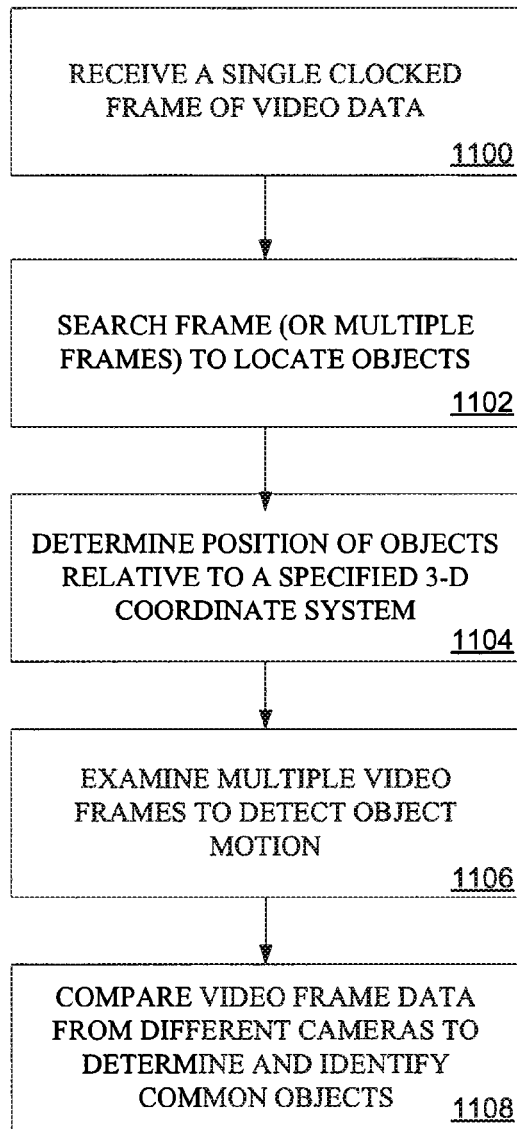
FIGS. 14A and 14B is flow chart of a method of image capture and decomposition and an associated system, respectively, for embodiments described herein.

A method of image capture and decomposition is described with respect to FIG. 14A. In 1100, a single clocked frame or plurality of related frames of video data may be received from a camera. For example, in basketball environment, the clocked frame of video data may be received from one of the camera systems described with respect to FIGS. 13A-13E or from the camera or camera described with respect to the device in FIGS. 22A-22C.

In 1102, the frames or multiple frames may be searched for objects of interest. For instance, for frames related to basketball, the frames may be searched to locate, a basketball, one or more players, referees, a basketball hoop, a basketball net, floor markings and a backboard in a 2-D pixel coordinate system. The search may involve identifying patterns associated with each object, such as patterns associated with a uniform including a name or a number worn by a player, patterns associated with floor markings including markings on a tennis court or a basketball court or patterns associated with equipment markings including markings on a backboard. The search may also involve identifying shapes associated with particular objects including body parts associated with individual players.

In 1104, a position relative to a defined coordinate system may be generated for each identified object. For example, in one embodiment, object identification and location information from a single camera frame in a 2-D coordinate system may be matched with object identification information from a stereo camera partner to place each identified object within a 3-D coordinate system. This information may allow an orientation of one or more objects relative to one another to be determined. For example, a position of fingers on a basketball, a position of a wrist joint for a player shooting, a position of an elbow of a player shooting, a head position of the player shooting, a foot position of the player shooting, a knee position of the player shooting, a position of a basketball, a position of a hand of a player different from the shooter in 3-D coordinate system and relative to one another may be determined. Identifiers may be associated with groups of related objects so that information associated with all of the objects and in related group may later be retrieved. For example, an identifier, such as "player body," may be used to group all of the body parts associated with a particular player in a video frame when a group of body parts has been identified.

In 1106, multiple frames of data may be examined to determine motions of identified objects over time. For basketball for example, an identified motion may be for a body part, such as a motion of an elbow as a ball is being shot, a motion of a defenders hand as a ball is being shot, a motion of a shooters hands from receiving a pass to shooting and then releasing a shot, a motion of a shooters head while receiving a pass and then shooting while shooting a basketball may be identified. In another example, a motion of the basketball may be determined. In another example, a motion of an offensive player without the ball may be determined. This type of identification may be performed for other sports as previously described and is not limited to basketball which is described for the purposes of illustration only.

In one embodiment, body motions may be used to predict an outcome of a trajectory of a shot basketball. For instance, the motions of the hands, wrist, arms of a player, while making a shot may be used to determine an initial force vector and position for the basketball as it is shot. The position data may be related to a distance from the hoop and a distance above the floor associated with the ball over time as the ball is shot.

In one embodiment, the initial force vector and initial position may be used to perform a simulated trajectory calculation with outcome prediction. The initial for vector and initial position may be used to establish a release angle and release height for the shot (i.e., as the ball leaves the hand) The initial force vector may be provided as input for an analytic set of equations that allow the trajectory of the basketball to be determined. In another embodiment, one or more parameters, such as an initial position and an initial force vector, may be used with a routine, such as a table look-up routine, that correlates the one or more parameters to an outcome of shot. The table look-up routine may use data that is experimentally generated such as via using a shooting machine. In this embodiment, a simulated trajectory may not be generated as the outcome is provided based upon the one or more parameters correlated to the outcome.

In 1108, video data from multiple camera pairs may be compared and analyzed to identify, when, where and how a same object appears in the fields of view of multiple camera pairs. In one embodiment, when it is determined that an object, such as a basketball, appears in multiple frames of data from different camera pairs, some duplicate data may be eliminated. The elimination of duplicate data may occur when data from multiple camera pairs is synthesized.

Figure 14B:
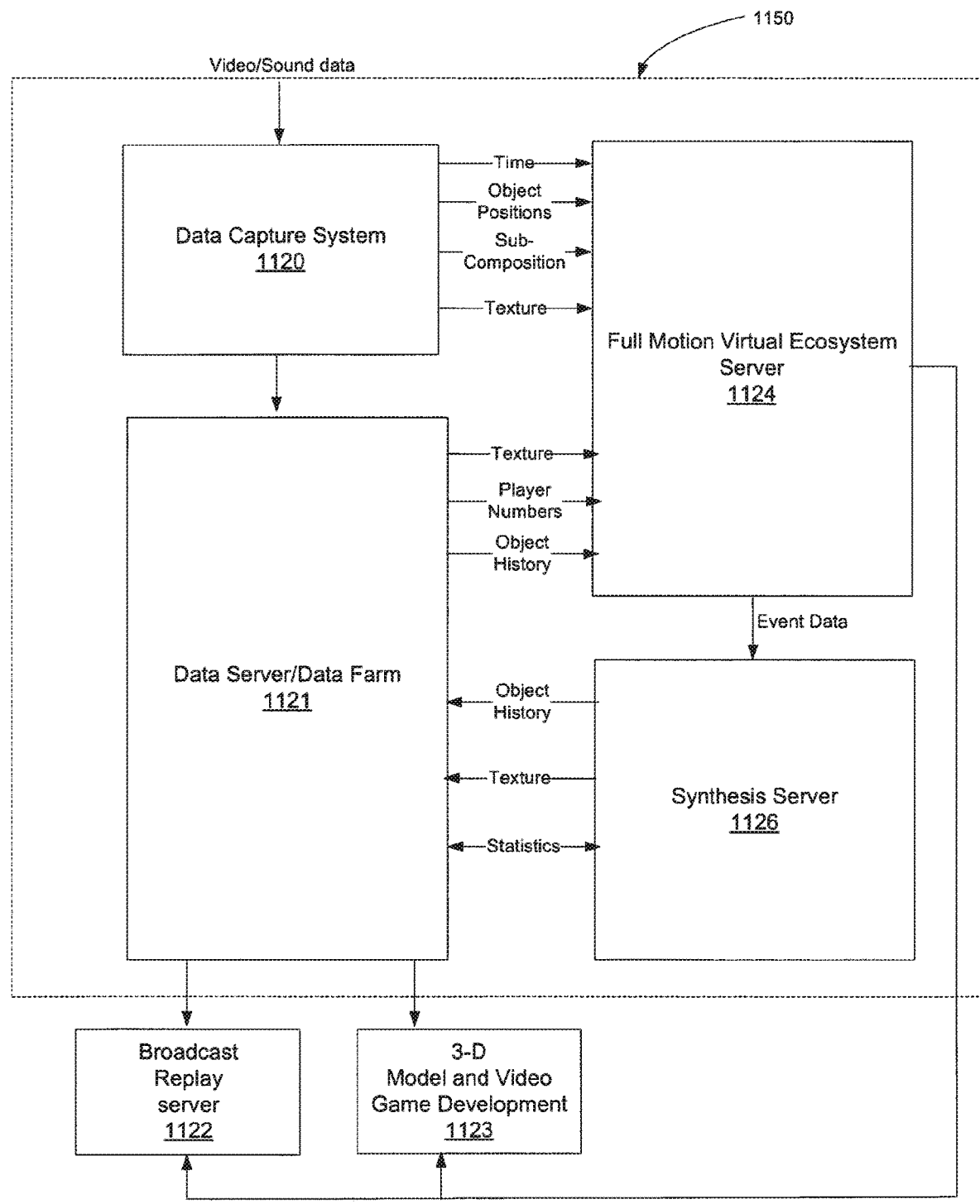

FIG. 14B shows a number of components of a data capture, analysis and simulation system for one embodiment of the present invention. This system may be used with embodiments of the methods described herein. The system 1150 may include 1) a data capture that receives video and/or sound data from one or more cameras and microphones coupled to the system, 2) data server/data farm 1121 for storing and analyzing captured data, 3) a virtual ecosystem server 1124 and a synthesis server 1126. The system 1150 may provide data to 1) a broadcast replay/server 1122 for providing static and animated images for use in a broadcast environment and a 3-D model and video game development server 1123 that may utilize captured and animated data from system 1150.

As previously described, captured video data from one or more cameras may be used in 3-D simulations. To generate the 3-D simulation, a sub-composition may be applied to the captured video data. For example, in basketball, body parts (head, eyes, gaze direction, neck, shoulders, torso, upper arms, elbows, lower arms, hands, hand position, upper legs, lower legs, feet) of 10 players and X referees may be identified as logically connected groups and represented in a 3-D wire frame. As part of the simulation, one or more players of the 10 players and X referees may be removed from the simulation if desired, such as to emphasize a match-up between a player and a defender. The data capture system 1120 may provide time information, object position data, texture data and sub-composition data to the virtual ecosystem sever 1124.

Actual appearances of 3-D wire frame objects may be mapped to a virtual representation. The actual appearance may be a compilation of earlier visual data from the data capture system 1120. In one embodiment, the data capture system may be generating and processing a set of video and/or sound data utilized by server 1124, such as during a broadcast of a sporting event. In another embodiment, sever 1124 may be operable to use video data captured and stored from other camera systems not associated with the data capture system 1120 and referenced on a server. For instance, data capture system 1120 may be associated with a particular facility and server 1121 may store data captured at a number of facilities, such as different arenas or venues where a sport of interest is played.

The full motion virtual ecosystem server 1124 may be used to track and provide mathematical representations of object motions captured in video data. Full action of a number of objects may be captured and represented mathematically. For instance, ball movement may be accurately tracked during a flow of a game, such during a dribble, pass, shot, held, turn-over, etc. for basketball. In addition, a motion of balls shot toward the basket may be tracked whether the ball scores or rebounds. The synthesis server may be used to synthesize results. When logic is applied to a mathematical representation of a sporting environment, higher level outcomes may emerge. For example, for basketball, information related to a final score, number of points, rebounds, assists, blocks, fouls by a particular player, shooting percentage, shot trajectories, shooting mechanics, such as various body motions may be obtained.

Calculating Basketball Trajectory Dynamics: Basketball Swish/Make Analysis

Figure 15A:
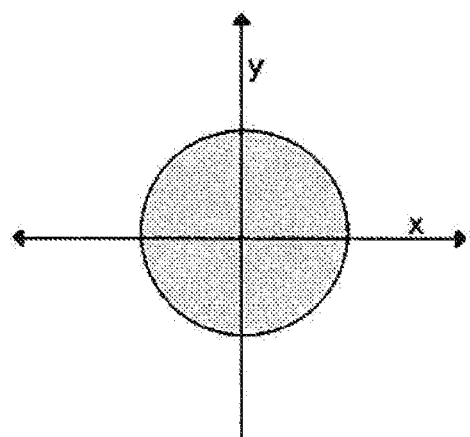
FIG. 15A is an illustration of coordinate system for determining a make/miss zone for basketball.

When a basketball shot goes through the hoop without contacting any part of the rim, we call it a "swish." Since the hoop is larger than the ball, there can be some variation in the shot and still get a swish. This analysis first determines the range of straight-on shots that will swish. The shot possibilities may be described by locating the center of the ball at the instant it passes through the hoop or, more technically, when the center of the ball lies in the plane of the hoop. The locus of points that describe shots that swish may be referred to as the swish zone, and can be illustrated by drawing a top view of the hoop with the swish zone defined within that circular region. The reference point (coordinate system origin) is the center of the hoop, with the positive x-axis projecting to the right and the positive y-axis projecting toward the back of the hoop, as shown in FIG. 15A.

For the purposes of illustration, it may be assumed that the hoop is 9" in radius and the ball is a men's pro ball, approximately 4.77" in radius. These assumptions may be varied to address different hoop and ball geometries as desired. For this example, it may be assumed that the ball's trajectory is a straight line in the immediate vicinity of the hoop, described by the hoop entry angle and measured from the horizontal. In this frame of reference, a perfectly flat shot would be 0 degrees and a ball dropped from directly above the hoop would be 90 degrees. This analysis may be generalized to include a more representative parabolic trajectory, or even a trajectory corrected for aerodynamic and buoyant forces, if necessary. For this example, it may be assumed the curvature of the trajectory in the immediate vicinity of the hoop is insignificant.

Figure 15B:
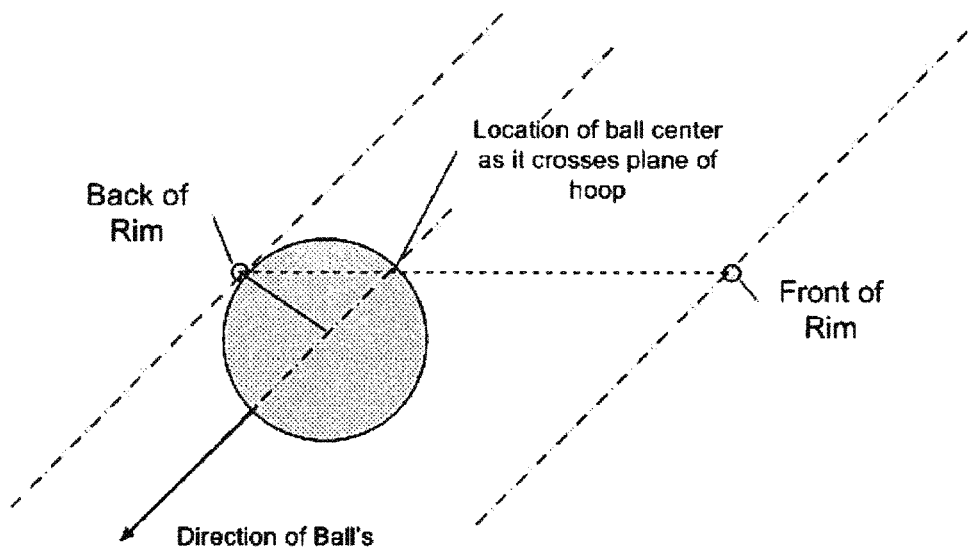
FIG. 15B is a side view of basketball shot passing through hoop at location of longest possible swish.
Figure 15C:
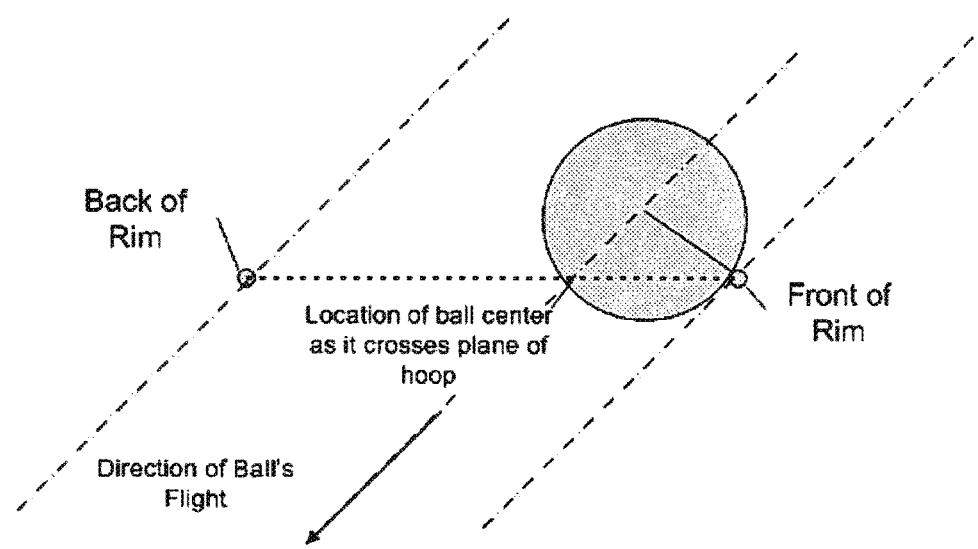
FIG. 15C is a side view of basketball shot passing through hoop at location of shortest possible swish.

For the ball to swish, it must pass over the front of the rim and under the back of the rim. These constraints limit the range of possible shots that may swish for a given entry angle, and the widest part of the ball (its diameter) determines the extent of that range. The geometry may be described for the longest possible swish at a particular entry angle and shortest possible swish at a particular entry angle. FIG. 15B is a side view of basketball shot passing through hoop at location of longest possible swish and FIG. 15C is a side view of basketball shot passing through hoop at location of shortest possible swish.

As can be seen in FIG. 15B, the center of the ball is below the rim when the widest part of the ball passes the rim for the longest possible swish. This is because the radius of the ball is measured perpendicular to the flight path in order to ensure the ball is a sufficient distance away from the rim to pass without hitting it. Similarly, for the shortest possible swish, the center of the ball is above the hoop when the widest part of the ball passes the rim, as shown in FIG. 15C. In order to define the range of swish shots for a given entry angle, the location of the center of the ball must be projected onto the plane of the hoop. This is accomplished by simple trigonometric computation using the expression $$y = R_{hoop} - R_{ball} / \sin(\theta)$$

where
y=location of center of ball in plane of hoop
$R_{hoop}$=radius of basketball hoop (set at 9")
$R_{ball}$=radius of basketball (set at 4.77")
θ=shot entry angle measured from horizontal This formula results in the following values for the longest and shortest possible swish shots as a function of shot entry angle:

| Angle | Y long | Y short |
|---|---|---|
| 90 | 4.23 | −4.23 |
| 89 | 4.229273 | −4.22927 |
| 88 | 4.227092 | −4.22709 |
| 87 | 4.223454 | −4.22345 |
| 86 | 4.218352 | −4.21835 |
| 85 | 4.211779 | −4.21178 |
| 84 | 4.203726 | −4.20373 |
| 83 | 4.194178 | −4.19418 |
| 82 | 4.183122 | −4.18312 |
| 81 | 4.170541 | −4.17054 |
| 80 | 4.156415 | −4.15642 |
| 79 | 4.140721 | −4.14072 |
| 78 | 4.123435 | −4.12344 |
| 77 | 4.104529 | −4.10453 |
| 76 | 4.083973 | −4.08397 |
| 75 | 4.061733 | −4.06173 |
| 74 | 4.037772 | −4.03777 |
| 73 | 4.01205 | −4.01205 |
| 72 | 3.984525 | −3.98453 |
| 71 | 3.955149 | −3.95515 |
| 70 | 3.923872 | −3.92387 |
| 69 | 3.890638 | −3.89064 |
| 68 | 3.855389 | −3.85539 |
| 67 | 3.818061 | −3.81806 |
| 66 | 3.778585 | −3.77858 |
| 65 | 3.736887 | −3.73689 |
| 64 | 3.692889 | −3.69289 |
| 63 | 3.646504 | −3.6465 |
| 62 | 3.597641 | −3.59764 |
| 61 | 3.546201 | −3.5462 |
| 60 | 3.492078 | −3.49208 |
| 59 | 3.435159 | −3.43516 |
| 58 | 3.375319 | −3.37532 |
| 57 | 3.312427 | −3.31243 |
| 56 | 3.24634 | −3.24634 |
| 55 | 3.176905 | −3.17691 |
| 54 | 3.103956 | −3.10396 |
| 53 | 3.027313 | −3.02731 |
| 52 | 2.946783 | −2.94678 |
| 51 | 2.862157 | −2.86216 |
| 50 | 2.773207 | −2.77321 |
| 49 | 2.679688 | −2.67969 |
| 48 | 2.581332 | −2.58133 |
| 47 | 2.477848 | −2.47785 |
| 46 | 2.36892 | −2.36892 |
| 45 | 2.254201 | −2.2542 |
| 44 | 2.133315 | −2.13332 |
| 43 | 2.005848 | −2.00585 |
| 42 | 1.871347 | −1.87135 |
| 41 | 1.729313 | −1.72931 |
| 40 | 1.579197 | −1.5792 |
| 39 | 1.420395 | −1.42039 |

| Angle | Y long | Y short |
|---|---|---|
| 38 | 1.252236 | −1.25224 |
| 37 | 1.073977 | −1.07398 |
| 36 | 0.884791 | −0.88479 |
| 35 | 0.683759 | −0.68376 |
| 34 | 0.469849 | −0.46985 |
| 33 | 0.241906 | −0.24191 |
| 32 | 0 | 0 |

Figure 16:
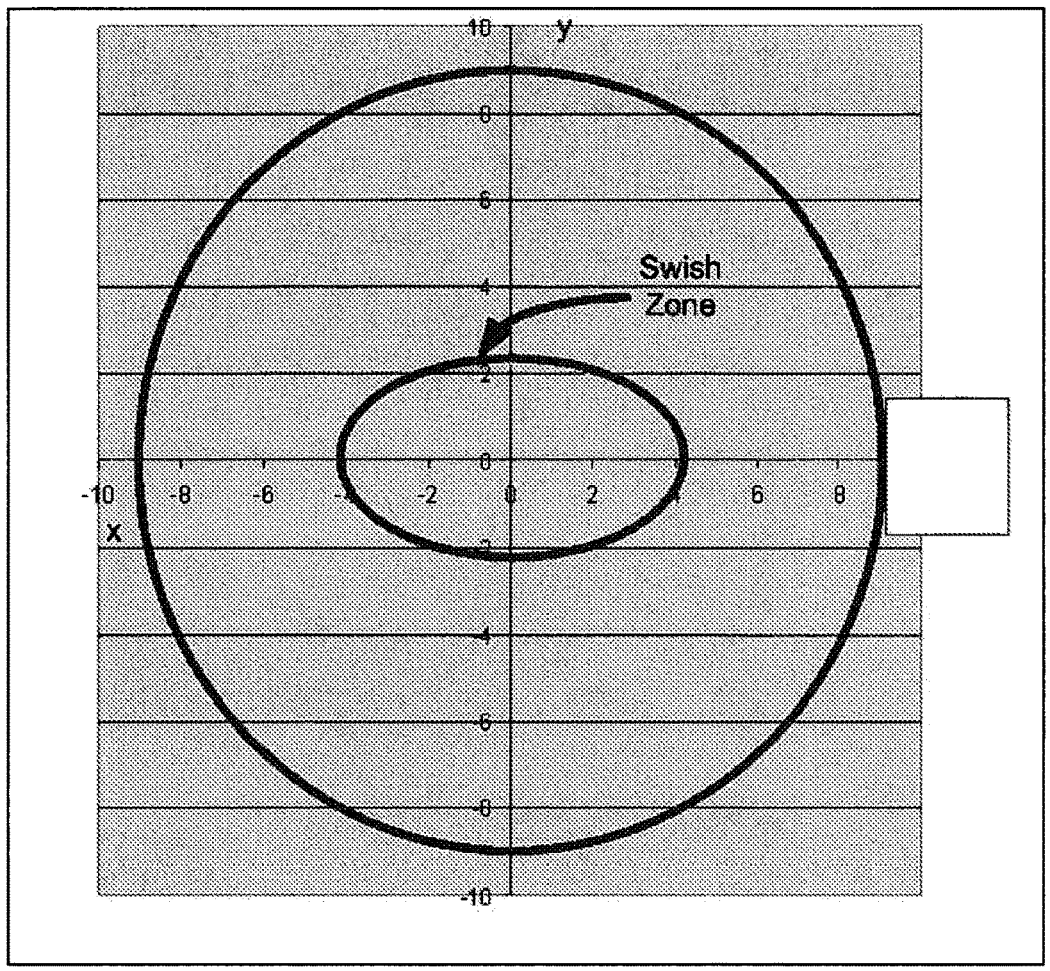
FIG. 16 is an illustration of the swish zone for a 45-degree hoop entry angle.

These results apply to a straight-on shot. In order to calculate the swish zone for off-center shots, compound angles must be computed that are difficult to illustrate geometrically. The result is more easily depicted graphically by showing the swish zone within the hoop. For example, the swish zone for a 45-degree shot is shown in FIG. 16.

Make Zone

Figure 17:
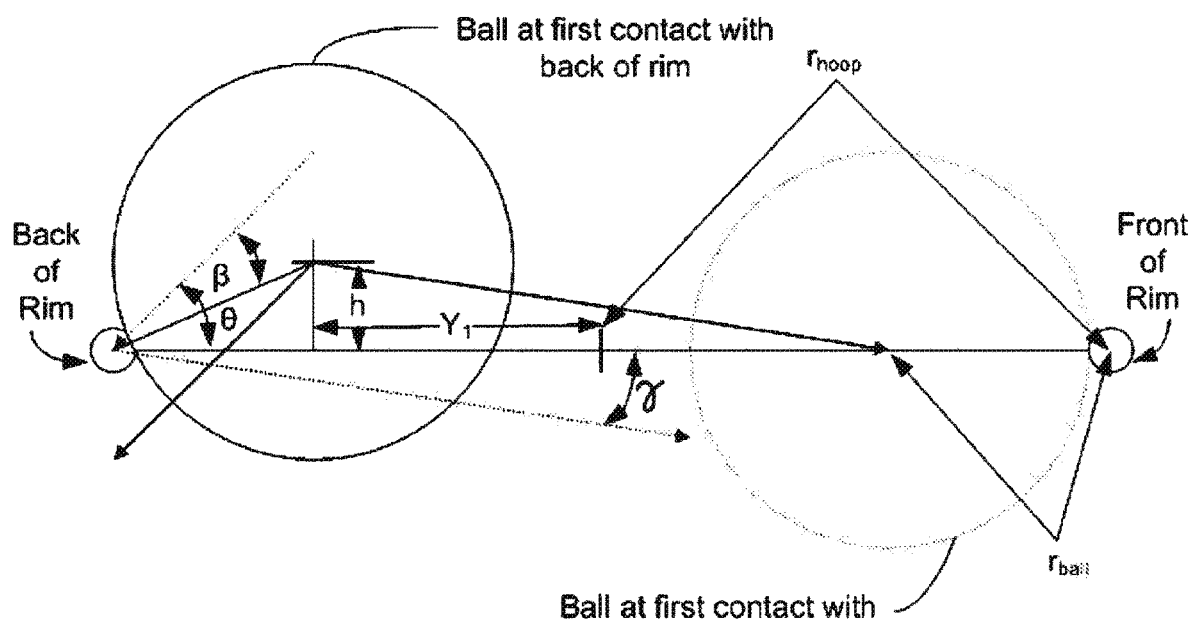
FIG. 17 is an illustration of the geometry of rim-in shot off the back rim.

It is still possible for the ball to go through the hoop if it does not pass through the swish zone. Shots near the swish zone will hit the rim. Depending on the shot and hoop geometry, it is possible for the ball to bounce off the rim and pass downward through the hoop. The locus of points for which this occurs may be called the make zone. The boundary of the make zone may be defined by the longest shot that can hit the back rim and rebound downward to the plane of the hoop before contacting the front rim. FIG. 17 is an illustration of the geometry of rim-in shot off the back rim.

The location of the boundary of the make zone for a straight-on shot may be determined from the following system of equations, which are shown in FIG. 17.

$$h = \sqrt{r_b^2 - (r_h - y_1)^2}$$
$$\beta = \sin^{-1}(h/r_b)$$
$$\gamma = \theta - \beta$$
$$\gamma = \tan^{-1}(h/(r_h - r_b + y_1))$$

where
h=height of center of ball above plane of hoop when ball strikes back rim
$r_b$=radius of ball
$r_h$=radius of hoop
$y_1$=y-location of center of ball in plane of hoop when ball strikes back rim
β=angle between rim-normal and plane of hoop
γ=angle between plane of hoop and resultant ball direction after rebounding off back rim These equations do not have a closed-form solution. Nevertheless, the equations may be solved iteratively using a variety of progressive solution techniques, such as the Newtonian method. Using this method, the location of the make zone boundary may be determined as a function of entry angle. The results of a sample calculation are given in the table below.

| Entry angle, deg. | Make zone boundary, in. |
|---|---|
| 50 | 5.04 |
| 45 | 4.88 |
| 40 | 4.73 |
| 35 | 4.61 |
| 30 | 4.51 |
| 25 | 4.42 |
| 20 | — |

The table indicates that below 25 degrees entry angle, there is no make zone. The geometry for off-center rim shots is more complicated, but the make zones may be depicted graphically. There are some idealizations used in generating these plots that may be relaxed if necessary to produce a more accurate depiction of the make zone.

Figure 18B:
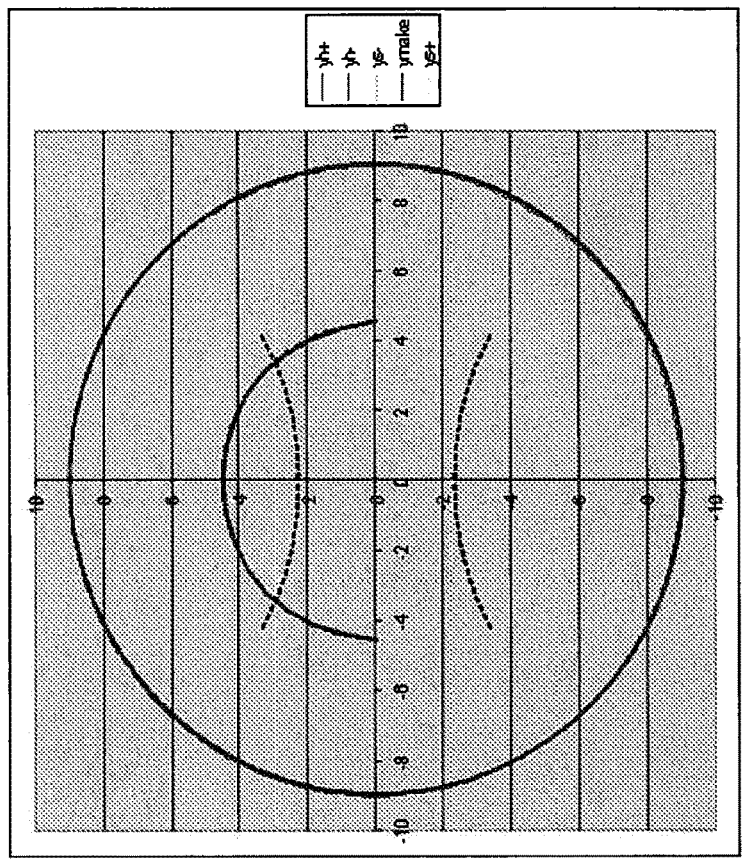
FIG. 18B is a plot of the make zone for a hoop entry angle of 25 degrees.
Figure 18A:
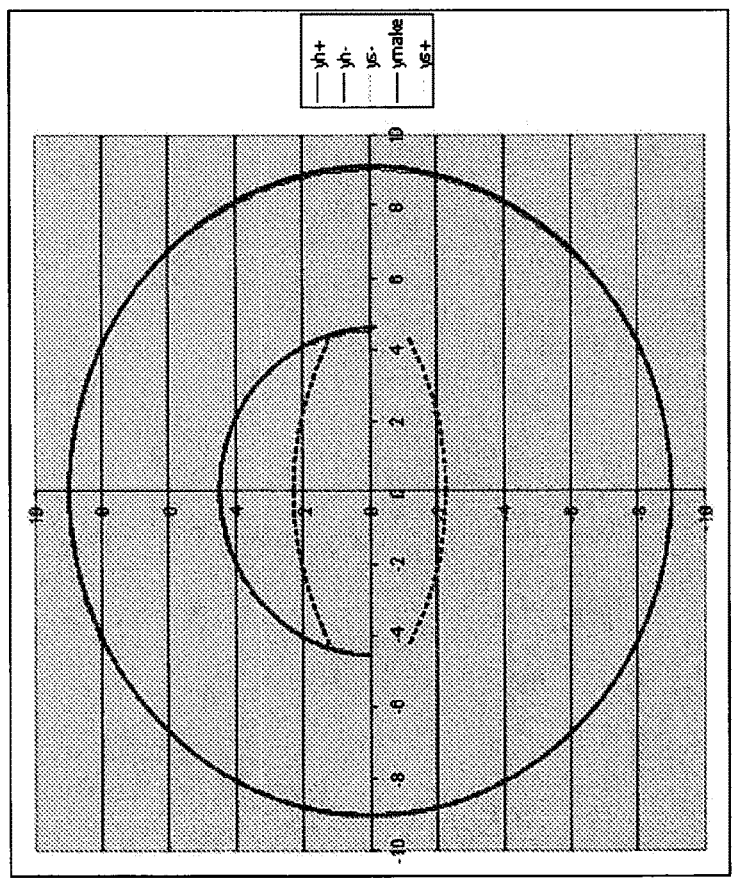
FIG. 18A is a plot of a make zone for a hoop entry angle of 45 degrees.

FIG. 18A is a plot of a make zone for a hoop entry angle of 45 degrees. Three curves are depicted in a circle, which depicts the hoop. The area between the dashed lines represents the swish zone. The area between the upper solid line the lower dashed line represents the make zone. FIG. 18B is a plot of the make zone for a hoop entry angle of 25 degrees. Again, three curves are depicted in a circle. There is no swish zone at this entry angle. This is indicated by the dashed curves in the figure where the lower dashed curve and upper dashed curves depicted in FIG. 18A have switched positions in FIG. 18B. The make zone in FIG. 18B is defined by the area between the solid downward turned curve and the upwardly turned dashed curve depicted in the figure.

In performing this analysis, a conservative assumption has been made that only rim bounces that cause the ball to continue downward have the potential to score. In practice, many shots are observed to bounce up off the rim, then either drop through the hoop or make subsequent contact with the rim and/or backboard ultimately resulting in a made shot. As a result, the make percentage calculated by the present method may be lower than what would be expected in practice. This observation has been confirmed with empirical data as is described with respect to FIGS. 19A and 19B.

One means of addressing this under-prediction of made shots may be to develop a calibration factor based on empirical evidence. The make zone may be enlarged by a multiplicative factor such that the calculated made shots more nearly replicate observations. This factor, which may be dependent on a number of variables such as entry angle and speed, may be deduced from an experimental dataset, then applied to the algorithm for use in subsequent predictions.

Another approach to developing a more accurate make zone may be to incorporate a more complete kinetic model of the ball and its interactions with the hoop, bracket, and backboard. Effects to be included may include the angle of rebound when the ball contacts a solid surface, the effects of spin and ball friction against a solid surface, energy loss of the ball as a result of its impact, and the flexibility and energy absorption of the hoop and associated hardware. This would allow the calculation to model multiple ball/rim interactions and thereby determine the make zone even for very complex dynamics. The bounce dynamics may also be verified experimentally.

Figure 19A:
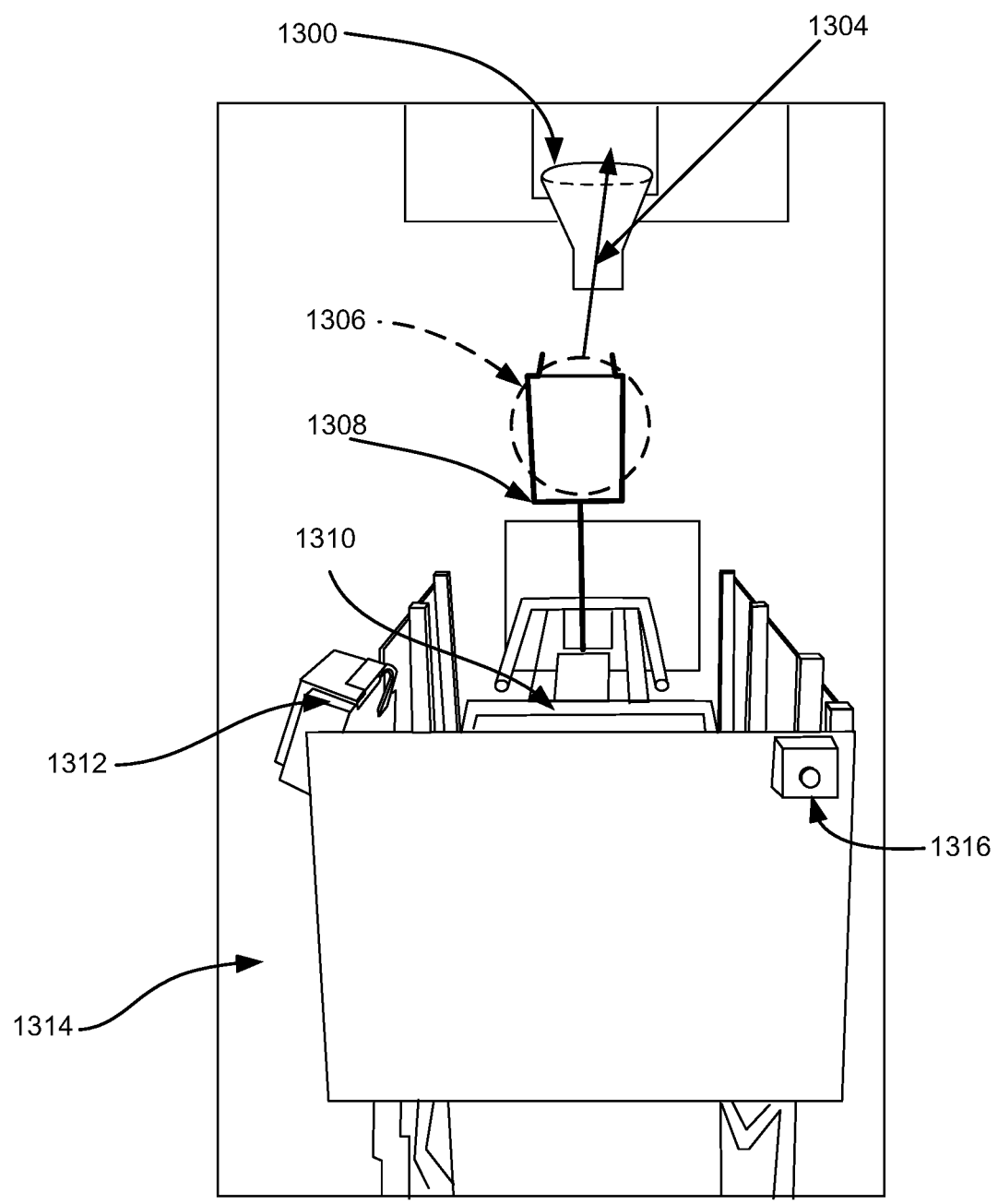
FIG. 19A is a rear view of an experimental set-up for generating basketball trajectories.

A rear view of an experimental set-up for generating basketball trajectories is shown with respect to FIG. 19A. The shooting machine 1302 includes an arm 1308 that can launch a basketball 1306 (a real basketball is not shown in the figure only an outline of a basketball is shown) towards a basketball hoop 1300 along a trajectory 1304. The arm is propelled by mechanism 1310. The shooting machine 1302 includes an on-off switch and a display/control mechanism 1312.

The machine 1302 may be programmed to execute a large number of shots and the outcome for each shot may be recorded. The release height of the device may be set to a particular value. From shot to shot, a left-right orientation of the shot relative to the center of the basketball hoop, a release velocity and a release angle may be automatically adjusted. Each of the values, left-right orientation, release velocity and release angle may be varied to generate a number of shots, such as but not limited to 10,000 shots. Different ball sizes may be employed with the machine 1302, such as a men's ball or a women's ball.

The shooting machine may be positioned at a location on the court 1314 that is a fixed distance from the basketball hoop. In this example, the shooting machine 1302 is positioned to generate a shot near the free throw line. The shooting machine is mobile and may be moved to different locations to generate a set of shots at each location.

Figure 19B:
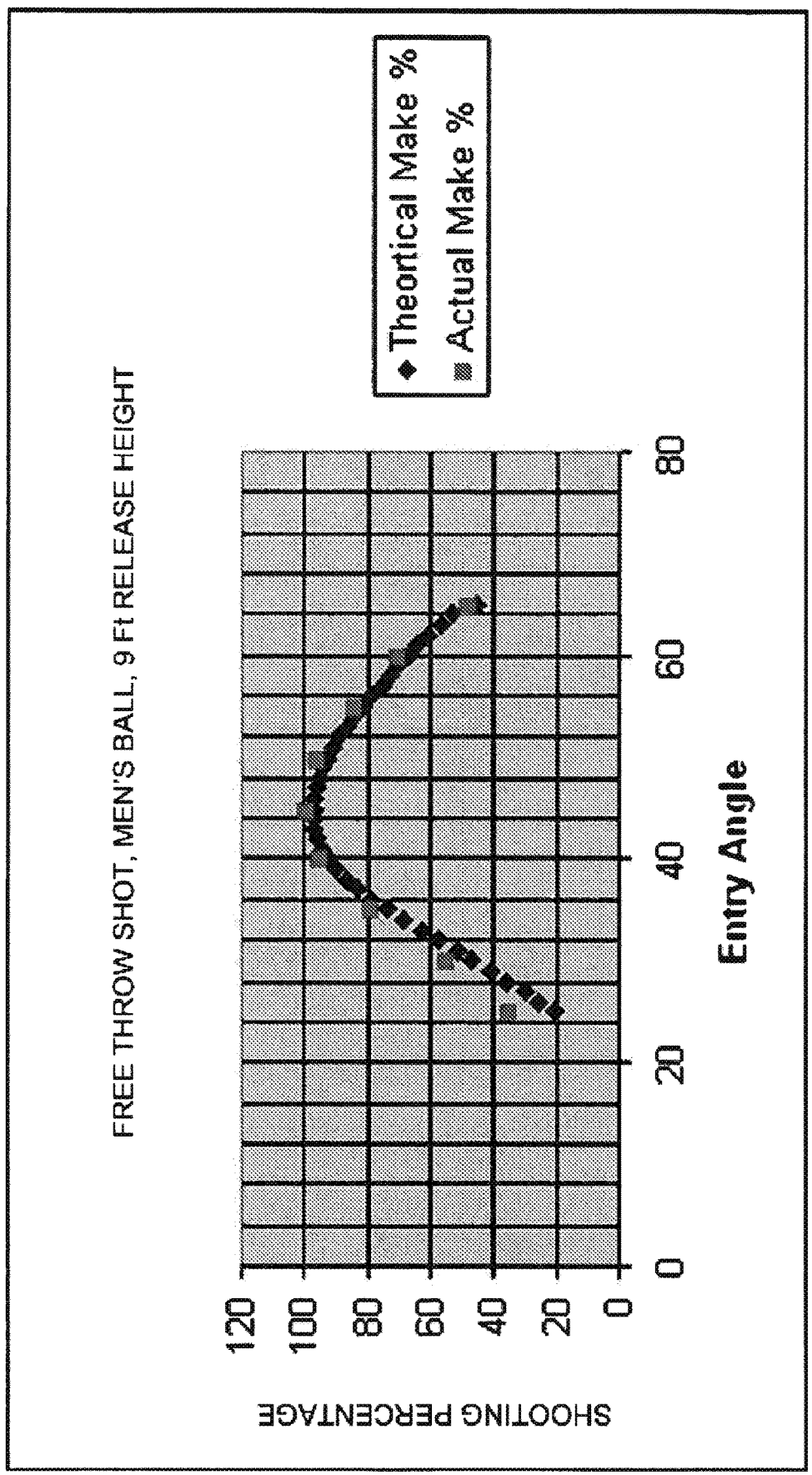
FIG. 19B is a graph of shooting percentage as a function hoop entry angle generated both experimentally and analytically.

FIG. 19B is a plot of a theoretical make percentage predicting from analytical method previously described as compared to an actual make percentage generated using the shooting machine described with respect to FIG. 19A. The shooting machine was positioned to generate a free throw shot at a release height of 9 feet using a men's ball. The range of parameters used to perform both the theoretical calculations and the actual shots generated using the shooting machine were selected to match a variability of a particular individual. The variability and the associated range of parameters was determined from a number of shots actually made by the individual From an entry angle between 40-65%, the theoretical make/miss percentage is 2-3 percentage points less than the experimentally predicted values. Below 40%, the error between the calculations is greater. As previously, mentioned some rebound dynamics were not considered in the theoretical calculations for the embodiments described herein and hence some shots that may be made are not captured by the methodology, such as hitting the back rim, then the front rim and then going in. At lower entry angles, shots such as these are more prevalent as compared to the higher entry angles and hence there is a larger error in the calculations at lower entry angles.

As previously noted, it may be possible to better model the rim effects and hence produce a more accurate simulation. In another embodiment, it may be possible to correct the theoretical simulation using a correction factor derived from the shooting machine data. In yet another embodiment, it may be possible to generate a series of curves like the one shown in FIG. 19B. The curves may be generated based upon data generated using the shooting machine, data generated from theoretical calculations, alone or in combination. Next, based on a measured variability of a particular individual, an existing curve that is appropriate for the variability of the individual may be located or a curve may be interpolated or extrapolated from existing curves as needed. Thus, it may not be necessary to perform additional trajectory simulations to determine an optimal or maximum shooting percentage for the individual in the manner shown in FIG. 19A.

Of note in FIG. 19B, an optimum shooting angle is predicted for the individual based upon their measured variability in their shooting mechanics (i.e., body motion and body orientation). The theoretical and experimental data both predict an optimum entry to be about 45 degrees. In this example, the shooter had a variability that was characteristic of a highly skilled shooter. Thus, a recommendation for this type of player may be to adjust their shot so that their average entry angle is a close to 45 degrees as possible.

Calculating Golf Trajectory and Distance

The trajectory (flight) of a golf ball may be predicted based on an understanding of the dynamics of the club motion and the interaction of the club head with the ball, when contact occurs. Many parameters may be potentially significant: Club geometry (shaft length, weight, club head loft, and stiffness properties, to name a few), the speed and direction of the club head at the moment of contact, the angle of the shaft to the vertical at the moment of contact, the shape of the shaft due to flexing, and the location on the club head where the ball makes contact are some of the primary determinants of ball trajectory. These parameters can be measured either in advance (shaft length and club weight, for example), or in real time by the system (club head speed and direction, for example).

The interaction of the club head and the ball produces the motion of the ball. The ball motion at the instant it loses contact with the club head may be fully described by its position (x,y,z), velocity (Vx, Vy, Vz), and spin (Wx, Wy, Wz). This initial condition can be predicted by modeling the characteristics of the collision using the principles of Newtonian physics.

The speed of the club head approaching the ball can be decomposed into a component normal to the club head and a component tangential to it. For the moment, any club head motion lateral (sideways) to the club head is neglected as a second-order effect. The normal component of the speed determines the speed and direction of the ball, while the tangential component determines the spin (most often backspin). If the club head is much more massive than the ball, the ball speed is approximately double the club head normal speed. If this approximation is not valid, a more detailed analysis of the momentum transfer from the club to the ball is required, involving the relative weights of the two objects, the elasticity of the collision, and the energy contribution of the person swinging the club. This type of analysis may be utilized with the embodiments described herein.

The spin imparted to the ball by the club is the result of torque applied to the ball by the tangential speed of the club head. The torque is the result of frictional force during the time of contact, and the initial spin of the ball can be determined by calculating the impulse of angular momentum that this interaction generates. The angular momentum impulse is proportional to the square and cube of the club normal speed. Using empirical determination of the coefficients of the squared and cubed terms in this proportionality, a computation of initial ball spin can be performed in real time by measuring the club head speed. The component of spin about the lateral axis, representing topspin or backspin, typically has the most effect on the trajectory of the ball. The spin about the vertical axis, representing sidespin resulting in hooking or slicing motions is usually less important. Spin about the longitudinal axis, representing a type of rifling spin of a bullet, is considered insignificant, for this example, but may be included in a trajectory simulation.

Once the initial motion of the ball is known—position, velocity, and spin vectors—the trajectory of the ball can be calculated from its dynamics of flight and used to provide a player feedback information in real-time. The variation of the aerodynamic properties (lift, drag, and side force) with the ball's velocity and spin is a potentially significant effect that may be included as needed to achieve the desired level of accuracy in the performance parameters of interest.

An example of one methodology for calculating the trajectory of a golf ball is provided below for the purposes of illustration only. More or less complex simulations may be used and this example is not meant to be a limiting description of analysis and feedback devices described herein.

Equations of Motion

Figure 20:
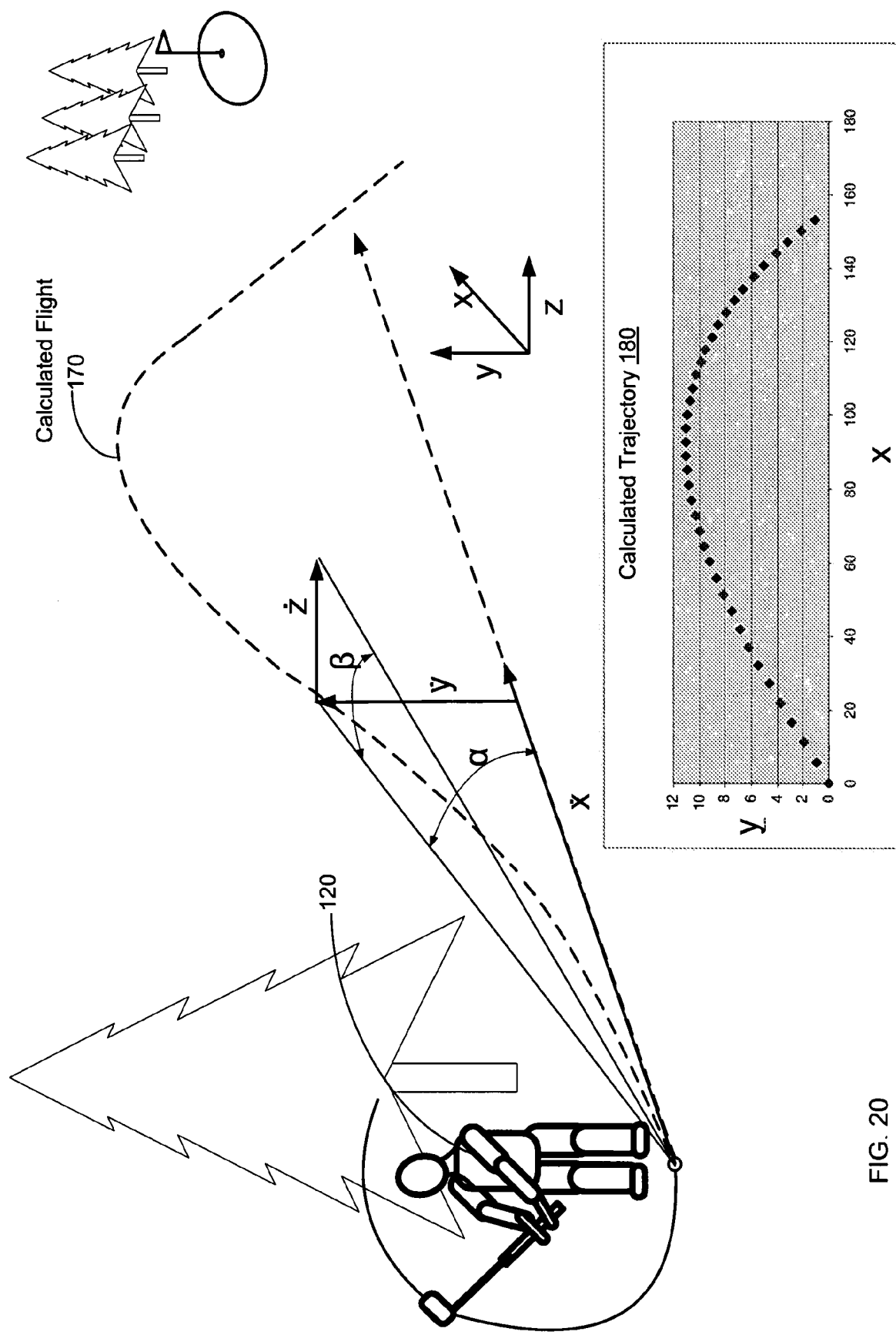
FIG. 20 illustrates variables related to equations of motion and a sample trajectory determined from the equations for a trajectory of a golf ball.

The motion of a golf ball in flight may be described by the following equations.

$$\ddot{x} = \frac{\rho s}{2m}[(\dot{x}+w_x)^2 + \dot{y}^2 + (\dot{z}+w_z)^2][C_D\cos\alpha\cos\beta + C_L\sin\alpha\cos\beta]$$

$$\ddot{y} = \frac{\rho s}{2m}[(\dot{x}+w_x)^2 + \dot{y}^2 + (\dot{z}+w_z)^2][C_L\cos\alpha\cos\beta - C_D\sin\alpha\cos\beta] - g$$

$$\ddot{z} = \frac{\rho s}{2m}[(\dot{x}+w_x)^2 + \dot{y}^2 + (\dot{z}+w_z)^2][C_D\sin\beta + C_N\cos\alpha]$$

where the variables are defined as,
$\ddot{x},\ddot{y},\ddot{z}$ Acceleration components in x, y, z direction
$\dot{x},\dot{y},\dot{z}$ Velocity components in x, y, z, direction
y Direction toward target
z Vertical
ρ
s To the right when facing target
m Air density
$w_x, w_z$
$C_D$ Cross-sectional area of ball
$C_L$ Mass of ball
$C_N$ Wind velocity components
α
β Drag coefficient
g The coordinate system is shown with respect to FIG. 20. The equations of motion shown above may represent a system of coupled nonlinear ordinary differential equations, as such, no analytical, closed-form solution exists. With the computing power readily available in today's low cost personal computers, or even portable devices, such as cell phones, one practical approach to solving these equations may be to apply a numerical integration scheme. For example, it is possible to perform an explicit time integration scheme using a small time increment, Δt, to advance the solution until the desired results are obtained. This example is provided for illustrative purposes only as many other types of numerical schemes may be employed with devices of the present disclosure.

The present method performs a numerical integration by using a spreadsheet computation to generate a database of the trajectory. The database contains all the relevant variables at each time step-acceleration, velocity position, flight angle, etc. A database query is then performed to extract the parameters of interest, such as but not limited to flight distance, maximum height, final speed, angle, etc.

The inputs to the trajectory computation are initial ball speed and flight angle and wind speed. The ball speed and flight angle may be deduced from the club speed and loft angle, and if desired as well as a calculation of the ball spin. The analysis and feedback devices described herein may be used to acquire these initial conditions.

For example, using a camera based system, capturing the position of the ball 5 or more times within the first 0.1 seconds of flight, or within the first 5 meters of flight, alternatively, allows the initial conditions for trajectory computation of a golf ball to be determined. The calculations are fast enough to allow immediate feedback to be provided to a user. For instance, the calculation described above may be performed in less than 1 sec. An example calculation is provided as follows.

As described above, the portion of the trajectory captured to determine the initial conditions for the ball as it leaves the club head may be about 5 meters along its flight path. The total distance of the shot along its flight path may be 10 meters or longer. The distance along its flight path is distinguished from the ground track of the shot, which may be much shorter than the distance along its flight path for a high arcing short. The devices described herein may be operable to predict trajectories for shots with ground tracks of various lengths (straight line distance from where the shot leaves the club to where it first hits the ground). For example, an initial portion of a trajectory of a shot with an actual ground track distance of 10 meters or longer, 20 meters or longer, 50 meters or longer, 100 meters or longer, 200 meters or longer may be captured with devices described herein and a prediction of the trajectory for the shot including a predicted ground track. In some embodiments, the device may be operable to determine an actual ground track for the shot including the location where it first impacts the ground, which may be compared with the predicted ground track of the shot including a predicted location where the shot first hits the ground.

The topography changes may or may not enter into the trajectory calculations. For instance, it may be assumed that the elevation of course is constant between where the shot is made to where it lands. In other embodiments, if an elevation map surrounding the shot is available, it may be possible to account for a change in elevation in predicting where the shot first lands. For example, a player may hit a shot from a higher elevation to a lower elevation which may result in a longer shot then if the ground is flat, which may be accounted for in the predictions of the trajectory devices described herein.

Sample Trajectory Calculation

| | | | |
|---|---|---|---|
| Club loft angle, deg. | 10 | Initial horizontal velocity, m/s | 57.02037 |
| Initial speed, m/s | 57.9 | Initial vertical velocity, m/s | 10.05423 |
| Headwind, m/s | 0 | Flight distance, m | 153.3384 |
| Initial flight angle, deg. | 10 | Max height, m | 11.02684 |
| Initial spin, rpm | 3500 | Final speed, m/s | 32.11952 |
| Time step, sec | 0.1 | Final angle, deg. | −20.4306 |
| Air density, kg/m^3 | 1.225 | Final horizontal velocity, m/s | 30.09907 |
| π | 3.141593 | Final vertical velocity, m/s | −11.212 |
| Ball radius, m | 0.02055 | | |
| Drag area, π*R2, m2 | 0.001327 | | |
| Ball mass, kg | 0.05 | | |
| CD | 0.25 | | |
| CL | 0.16 | | |
| Initial inclination, rad | 0.174533 | | |

| | |
|---|---|
| Initial x-velocity, m/s | 57.02037 |
| initial y-velocity, m/s | 10.05423 |
| Gravitational Acceleration, m/s | 9.8 |

In the example above, as previously described, in one embodiment the initial conditions may be derived from data captured using an analysis and feedback device. In embodiment, the player may enter the loft of the club manually. In another embodiment, the device may store a database of club types and their characteristics. Thus, the player may simply enter the club set they are using and the club they used to make the shot and the device may be operable to look up the appropriate data associated with club. Similarly, the device may store a database of ball characteristics, such as coefficients of lift and drag. Thus, the player may enter the ball type they are using and the device may look up needed properties associated with the ball.

In addition, the analysis and feedback device may be operable to identify the club automatically that a player is using for a particular shot. For example, radio identification tags may be attached to the clubs that allow the device to determine what club is being used. In another embodiment, stickers or some other attachment may be provided to each club that may be uniquely identified by the vision system. In some embodiments, the device may allow a player to enter an estimated wind speed. In other embodiments, the device may have some wind measuring capabilities as well as other capabilities for determining ambient conditions that may affect a trajectory, such as temperature, humidity and air density (which may vary with altitude as well).

In FIG. 20, the calculated trajectory 180 shows x and y distances where y is a height above the ground. The maximum height that the ball reaches is approximately 11 meters and the shot travels approximately 153 meters. Although not shown, it may also be possible to estimate a roll of the shot after landing if desired by the player. For example, if the device has GPS detection, then when the player moves to the location of the ball for the next shot, the device may be operable to estimate the distance between shots based upon its lasts position, thus, the amount of roll may be estimated as the calculated distance of the trajectory relative to the actual position of the ball. In another example, the device may be able to estimate a roll distance based upon an angle that the ball hits the ground, its velocity at impact and conditions on the course, such as a hard or soft ground, etc. This information may be manually input by a player in one embodiment.

The analysis and feedback device may store the calculated trajectory results and the trajectory shown above may be displayed to the player. Also, as previously, feedback information, derived from the trajectory may be output to the player. The ground track of the ball, which may show, the amount of slice or draw may also be shown to the player. As another example, a trajectory of the ball may be output in a 3-D format including but not limited to one or more of simulated flight path in 3-D and a ground track of the ball. Many different aspects of the trajectory may be output and these are provided for illustrated purposes only.

In some embodiments, a quantification of some aspect of the flight of the golf ball derived from a predicted trajectory may be compared with a quantification derived from other means including more direct measurements or other prediction methods. For example, it may be possible for some shots to measure a distance from the analysis and feedback device to a final position of the golf ball or a position to where the golf ball first lands using an additional camera, a range finder coupled to the golf bag or some other direct measurement technique. In another example, a maximum height of a shot may be derivable from a sensor, such as a camera coupled to the feedback device. In yet another example, a player may use a range finder to determine the distance to their ball and then input the data into the analysis and feedback device.

When two techniques are available that provide a prediction or measurement of the same quantity, it may be possible to correct or adjust one or the other. For example, if it is possible to directly measure the height of a shot and to predict the height of a shot, then it may be possible to attribute differences between the trajectory prediction of the height of the shot and the measure height of the shot to a factor, such as wind speed, which may not be directly measurable. If it were possible to attribute the difference in heights to a factor, such as wind speed, then the trajectory prediction might be re-run with one or more variables adjusted, such as wind speed so that the trajectory prediction of the maximum height of the shot more closely matches the measure maximum height of the shot. This type of trajectory prediction adjustment may be performed when a quantity is both predicted using one means and then measured using a separate means.

In another embodiment, the analysis and feedback device may include a GPS device. As part of a calibration procedure, a player may play a few holes or a round of golf where predictions of a golf ball's trajectory are made. The device may record its position using a first GPS measurement at a location where the shot is hit, the player may then move the analysis and feedback device to the location where the golf ball landed as part of the preparation for the next shot and the analysis and feedback device may then record its position using a second GPS measurement. A distance derived from comparing the first GPS measurement and the second GPS measurement may be compared with a distance derived from a trajectory prediction. One or more factors that affect the trajectory prediction may then be adjusted so that the trajectory prediction and the GPS measurements more closely match. This process may be repeated over a number of shots to using data fitting techniques to provide a set of parameters for the trajectory prediction. The data may be fitted to choose a set of parameters that produce the best results over the range of shots considered.

In one embodiment, the analysis and feedback device may store data related to layouts of various golf courses or data from the analysis and feedback may be uploaded to a site that stores layouts of various golf courses. Using the layouts, a player may be able in practice, such as at a driving range, to play a simulated golf course of their choice. For instance, the device may provide a display showing a layout to the hole and possible club recommendations for each shot. After the player makes a shot that is analyzed by the device, the device may show the player's calculated position on the hole. Using this method, a player could see go through a round on a golf course during practice where the player could see how long it took them to reach the green for each hole playing a golf course of their choice. In another example, if a particular hole on a course that a player usually plays provides a challenge to the player could practice various shots they make when they play the hole, such as an initial shot and an approach shot where their progress could be charted.

In another embodiment, the analysis and feedback device may include a GPS location device that records the position of the player while they are playing on a golf course. Using the GPS data, a calculated trajectory and a layout of the course (e.g., a layout of the course may be obtained from a source such as Google Earth™), after a round a golf, a player may be able to view their round on a shot by shot basis as visual simulation progression through the course. The device or an associated device that has received data from the analysis and feedback device may be able to provide the player a 3-D simulation of their round from different perspectives, such as from a player's view after each shot or from a perspective that travels with the ball along the actual course layout. The 3-D simulation may display trajectory information that was previously recorded and any feedback information that was provided to the player during the round.

Calculating Tennis Stroke Dynamics

The trajectory (flight) of a tennis ball may be predicted based on an understanding of the dynamics of the racquet motion and the interaction of the racquet face (strings) with the ball when contact occurs. Depending on the type of shot (serve, ground stroke, volley, overhead), different parameters are important in measuring performance.

The serve involves the most complex combination of movements of the player, racquet, and ball. All of these are important in producing the serve. The first part of the ball's motion is the toss. From the instant the ball is released from the server's hand, the trajectory of the ball is primarily affected by gravity. A secondary, but potentially important, effect is the action of wind on the ball while it is on its way up or down. The trajectory of the ball may be observed directly by the vision system, or it can be calculated based on the initial conditions (position and velocity) at the instant the ball is released from the server's hand Accounting for the effects of wind on the trajectory of the toss requires the wind speed and direction to be known a priori and provided as an input to the calculation.

While the ball is in motion from the toss, the server swings the racquet overhead to strike the ball near the apex of its trajectory. Several parameters are important at the instant of contact: racquet head speed and direction, orientation of the racquet head, location of the ball at time of impact (height, longitudinal, and lateral positions), and ball speed. It may also be important to account for the properties of the ball (size, pressure, felt), racquet (frame stiffness, string type and tension), and environment (temperature, air density, humidity).

The interaction of the racquet face and the ball produces the motion of the ball. The ball motion at the instant it loses contact with the racquet face may be fully described by its position (x,y,z), velocity (Vx, Vy, Vz), and spin (Wx, Wy, Wz). This initial condition may be predicted by modeling the interaction of the racquet strings and ball, or measured by direct observation of the ball using the vision system (The vision system may comprise cameras or other measuring devices, associated software and processors used to determine a trajectory of an object, such as tennis ball).

The speed of the racquet approaching the ball may be decomposed into a component normal to the racquet face and two components tangential to it. The normal component of the speed determines the speed and direction of the ball, while the tangential components determine the spin (topspin/underspin and side spin). The speed of the ball leaving the racquet depends on the efficiency of momentum transfer from the racquet to the ball. This, in turn, depends on the elasticity of the strings and the ball. If the collision is perfectly elastic and the racquet is much more massive than the ball, then the speed of the ball as it leaves the racquet will be twice the normal speed of the racquet face. If this approximation is not valid, it may be possible to calibrate the momentum transfer efficiency by using the vision system to observe a number of racquet strokes under a variety of conditions (such as speed and spin) and "learn" the characteristics of a particular racquet and ball pair.

The spin imparted to the ball by the racquet is the result of torque applied to the ball by the tangential speed of the racquet face. The ball will acquire angular velocity about the vertical axis (side spin) and lateral axis (top spin) that are important in predicting the subsequent trajectory of the ball. As a first approximation, it can be assumed that the ball acquires all of the tangential velocity of the racquet. If this approximation is not valid, it may be possible to calibrate a racquet/ball pairing by direct observation as described in the preceding paragraph.

Once the initial motion of the ball is known—position, velocity, and spin vectors—the trajectory of the ball may be calculated from its dynamics of flight and used to provide a player feedback information in real-time. The variation of the aerodynamic properties (lift, drag, and side force) with the ball's velocity and spin is a potentially significant effect that may be included as needed to achieve the desired level of accuracy in the performance parameters of interest.

An example of one methodology for calculating the trajectory of a tennis ball is provided below for the purposes of illustration only. More or less complex simulations may be used and this example is not meant to be a limiting description of analysis and feedback devices described herein. The equations of motion shown represent a system of coupled nonlinear ordinary differential equations; as such, no analytical, closed-form solution exists. With the computing power readily available in today's low-cost personal computers, one practical approach to solving these equations is to apply a numerical integration scheme. For example, it is possible to perform an explicit time integration scheme using a small time increment, $\Delta t$, to advance the solution until the desired results are obtained. This example is provided for illustrative purposes only, as many other types of numerical schemes may be employed with devices of the present disclosure.

Using a spreadsheet computation, a numerical integration may be performed to generate a database of the trajectory. The database may contain the relevant variables at each time step—acceleration, velocity position, flight angle, etc. A database query may then performed to extract the parameters of interest, such as, but not limited to, flight distance, maximum height, final speed, angle, etc.

Equations of Motion:

The motion of a tennis ball in flight may be described by the following equations.

$$\ddot{x} = \frac{\rho s}{2m}[(\dot{x}+w_x)^2 + \dot{y}^2 + (\dot{z}+w_z)^2][C_D\cos\alpha\cos\beta + C_L\sin\alpha\cos\beta]$$

$$\ddot{y} = \frac{\rho s}{2m}[(\dot{x}+w_x)^2 + \dot{y}^2 + (\dot{z}+w_z)^2][C_L\cos\alpha\cos\beta - C_D\sin\alpha\cos\beta] - g$$

-continued $$\ddot{z} = \frac{\rho s}{2m}[(\dot{x}+w_x)^2 + \dot{y}^2 + (\dot{z}+w_z)^2][C_D \sin\beta + C_N \cos\alpha]$$

where the variables are defined as,
$\ddot{x},\ddot{y},\ddot{z}$ Acceleration components in x, y, z direction
$\dot{x},\dot{y},\dot{z}$ Velocity components in x, y, z, direction
y Direction toward target
z Vertical
ρ
s To the right when facing target
m Air density
$w_x$, $w_z$
$C_D$ Cross-sectional area of ball
$C_L$ Mass of ball
$C_N$ Wind velocity components
α
β Drag coefficient
g The equations of motion shown above represent a
The inputs to the trajectory computation may be initial ball speed and flight angle and wind speed. The ball speed, flight angle, and spin may be deduced from the racquet speed and orientation. The analysis and feedback devices described herein may be used to acquire these initial conditions.

For example, using a camera based system, capturing the position of the ball 5 or more times within the first 0.1 seconds of flight, or within the first 1 meter of flight, alternatively, allows the initial conditions for trajectory computation of a tennis ball to be determined. The calculations are fast enough to allow immediate feedback to be provided to a user. For instance, the calculation described above may be performed in less than 1 second. Of course, this calculation time may very depending on the performance of the computer hardware employed and the numerical integration scheme used.

An example calculation is provided as follows.
Sample Trajectory Calculation

| | | | | |
|---|---|---|---|---|
| Racquet orientation, deg. | 0 | | Initial horizontal velocity, m/s | 40.0 |
| Initial speed, m/s | 40 | | Initial vertical velocity, m/s | 0.0 |
| Headwind, m/s | 0 | | Flight distance, m | 25.0 |
| Initial flight angle, deg. | 0 | | Max height, m | 9.0 |
| Initial spin, rpm | 0 | | Final speed, m/s | 21.8 |
| Time step, sec | .01 | | Final angle, deg. | −17.2 |
| Air density, kg/m^3 | 1.225 | | Final horizontal velocity, m/s | 20.8 |
| π | 3.141593 | | | |
| Ball radius, m | .033 | | Final vertical velocity, m/s | −6.5 |
| Drag area, π*R², m² | 0.001327 | | | |
| Ball mass, kg | 0.05 | | | |
| $C_D$ | 0.63 | | | |
| $C_L$ | 0.0 | | | |
| Initial inclination, rad | 0.174533 | | | |
| Initial x-velocity, m/s | 40.0 | | | |
| initial y-velocity, m/s | 0.0 | | | |
| Gravitational acceleration, m/s | 9.8 | | | |

The calculated trajectory (not shown) provides x and y distances where y is a height above the ground as a function of time. The table above lists some constants used in the calculation and some results from the calculation.

In the example above, as previously described, in one embodiment the initial conditions may be derived from data captured using an analysis and feedback device. In another embodiment, the device may store a database of racquet and ball properties. Thus, the player may simply enter the racquet and ball descriptors (e.g., string type and tension, brand and age of ball), and the device may be operable to look up the appropriate data. In other embodiments, the device may have some wind measuring capabilities as well as other capabilities for determining ambient conditions that may affect a trajectory, such as temperature, humidity and air density (which may vary with altitude as well).

The analysis and feedback device may store the calculated trajectory results and the trajectory shown above may be displayed to the player. Also, as previously, feedback information, derived from the trajectory may be output to the player. As another example, a trajectory of the ball may be output in a 3-D format including, but not limited to, one or more of simulated flight paths in 3-D and a ground track of the ball. Many different aspects of the trajectory may be output and these are provided for illustrated purposes only.

The trajectory for strokes other than the serve—ground strokes, volleys, and overheads—can be predicted using the same techniques described above. The only difference is that in the case of strokes other than the serve, the ball is approaching the player's racquet with significant velocity and spin. It is necessary to initialize the computation of the stroke with the velocity and spin of the ball, which maybe measured by the vision system by direct observation.

Another potentially useful aspect of the tennis ball's trajectory to understand is its bounce dynamics. Depending on the speed, angle, and spin the ball possesses as it contacts the court surface, and the physical properties of the ball and court, the bounce exhibits significant variation. This is an important strategic aspect of the competitive game of tennis, and players expend considerable effort understanding and controlling the bounce. A kick serve, for example, produces a bounce that sends the ball in a significantly different direction than it was traveling immediately before the bounce, resulting in a particularly difficult shot for the opponent to return. A flat ground stroke results in a shallow bounce angle, keeping the ball low after the bounce and therefore difficult to return with power. Grass courts produce skidding bounces that don't take as much speed off the ball as hard courts, resulting in more challenging conditions for the return shot. This encourages grass court competitors to volley the ball more often, so that they do not have to deal with a difficult bounce. In contrast, clay courts and some hard courts slow the ball significantly, and the bounce responds more strongly to spin, favoring a style of play that utilizes a variety of spins to be imparted on the ball.

Figure 21:
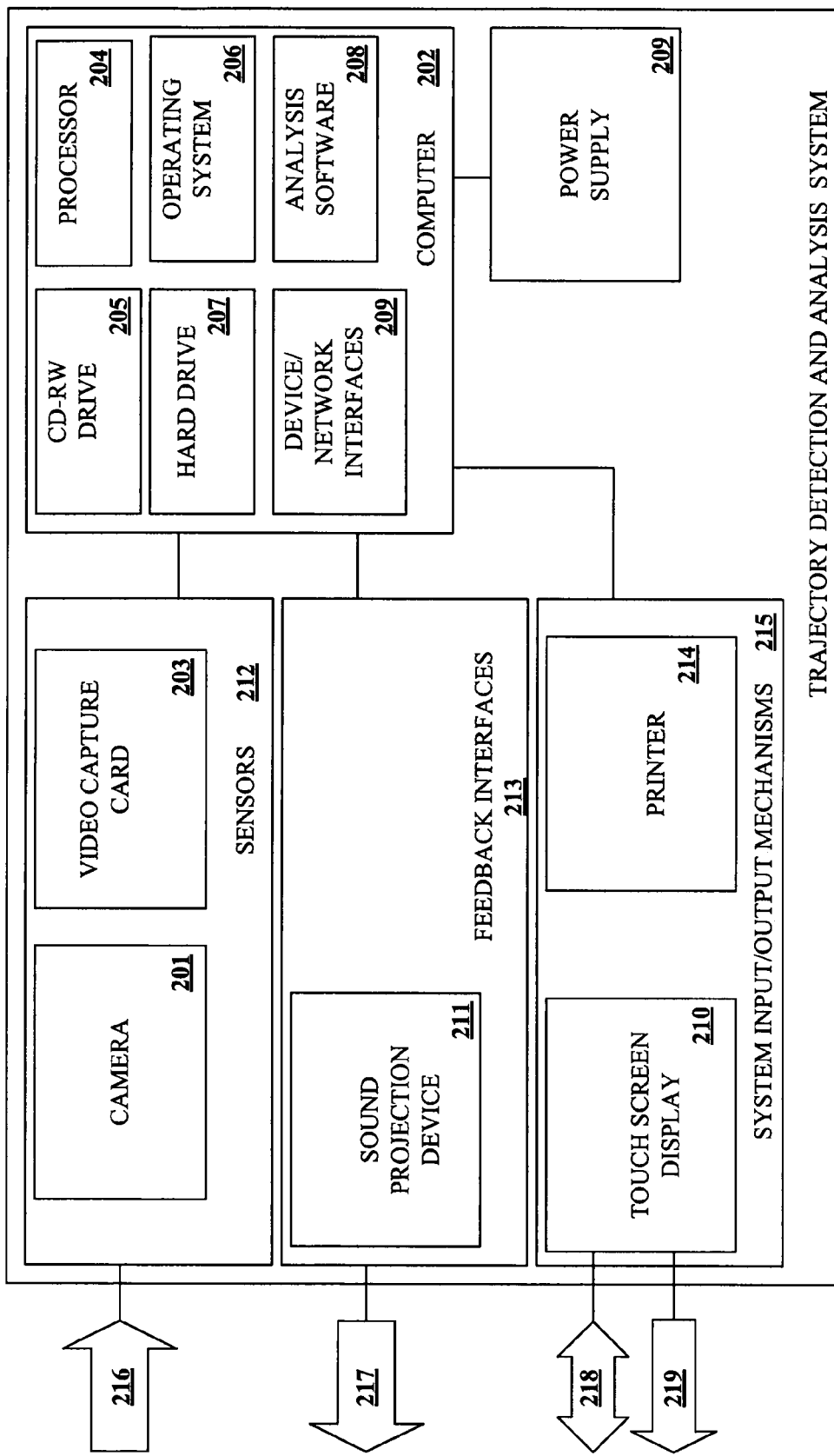
FIG. 21 is a block diagram of an embodiment of a trajectory detection and analysis system.

Because the path of the ball after the bounce is so important to the competitive game, providing feedback about the bounce in training sessions may be valuable. This can be done by direct observation using the vision system, or it can be predicted from the trajectory and an understanding of the bounce characteristics. Using the trajectory prediction method described above, the location, speed, and spin of the ball when it contacts the court surface can be predicted. Then, a model of the bounce dynamics can be used to calculate the change in velocity resulting from contact with the court. This will produce a new initial condition for the ball (location, velocity, and spin) that can be used to continue the trajectory prediction as the ball continues into the opponent's court. The speed of the ball, height of the bounce, and resultant spin after the bounce are examples of parameters useful in assessing a player's performance on a particular shot. FIG. 21 is a block diagram of a trajectory detection and analysis system 100 for one embodiment. The components of the system 100 may be enclosed within a single housing or may be divided between a plurality of different housings enclosing different components of the system. Further, the system 100 may include different components that are not shown, such as the peripheral devices and remote servers.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, school, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for in-door/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone w/voice recognition software may be used to input operation information 218 into the system.

FIGS. 22A-22C are perspective drawings of exemplary components of a trajectory detection and analysis system. The figures provided to illustrate types of components in a trajectory system and not mean to limit various form factors and configurations of these components. For instance, the locations, sizes and form factors of these components could look substantially different if they were integrated into a golf bag. Further, every component of the system need not be included in every embodiment. For instance, the sound output device 211 may be eliminated in some designs or made substantially smaller, which could alter the form factor of the design.

In FIGS. 22A-22C, a camera 201 used in a machine vision system, a touch screen display 210, a computer 202 and a sound projection device 211 are integrated into a housing 300 with a support chassis 301. The system 100 may also include an amplifier for the speaker 211 (not shown).

Wheels 304 are attached to the chassis 301 to allow the system 100 to be easily moved and positioned for use. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table, a chair or even coupled to a golf bag or golf cart. The travel system may provide feedback information via a wireless communication interface to audio device, such as an "earbud," worn by the player or wearable feed back device. In another embodiment, the travel system may generate output signals that may be routed through a portable audio system (e.g., a boom box) for amplification via speakers on the audio system to provide feedback information.

Figure 23:
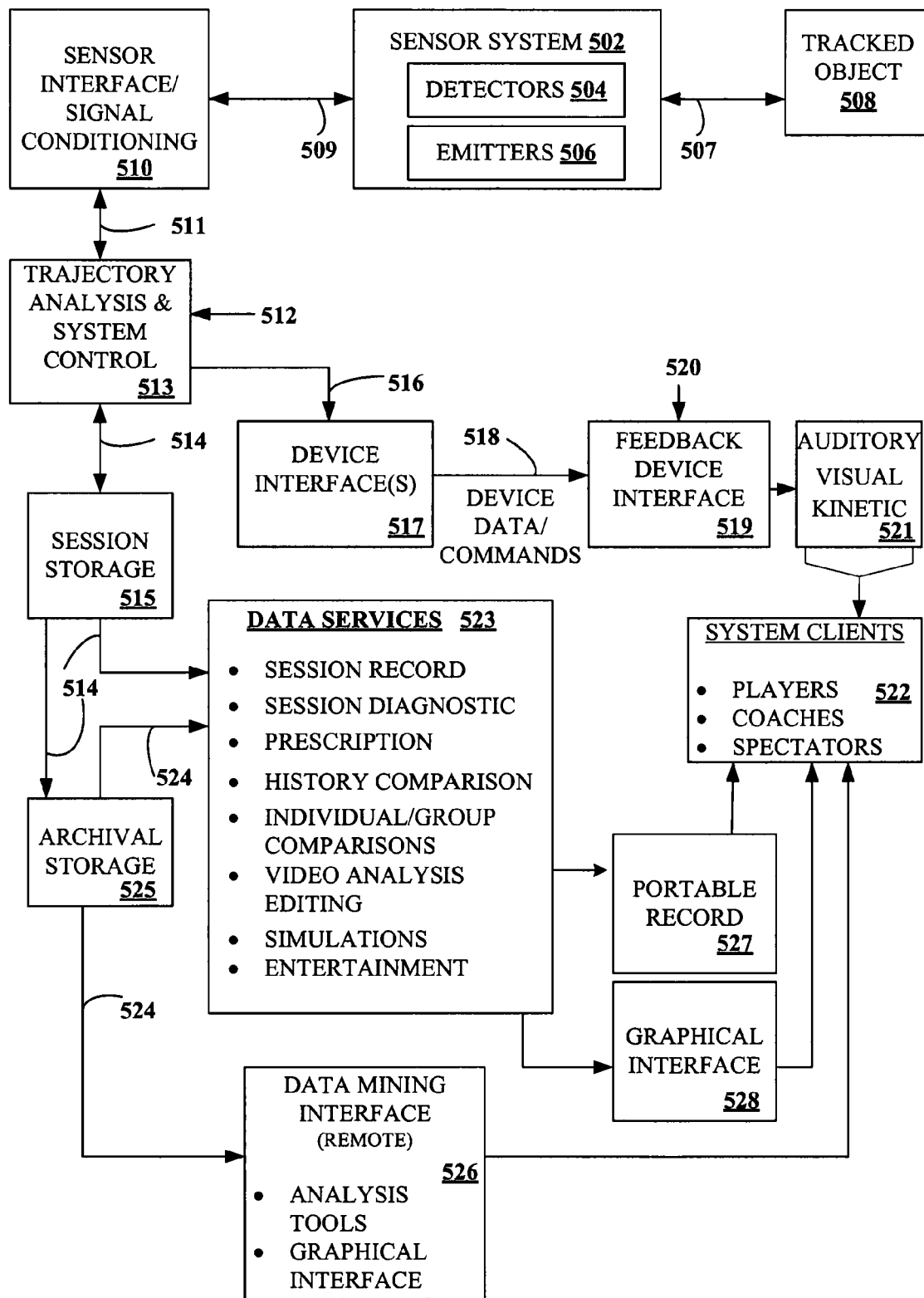
FIG. 23 is an information flow diagram of an embodiment for of a trajectory detection and analysis system.

FIG. 23 is an information flow diagram for a trajectory detection and analysis system of the present invention. A sensor system 502, which may comprise emitters 506 and detectors 506, receives physical information 507. The physical information 507 may be energy signals reflected from a tracked object 508, such as a golf ball. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge-coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, prior to analysis, video frame data may be digitized by a video capture card.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the senor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may be measured from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters, 2) session diagnostics, 3) prescription for improvement, 4) a history comparison of trajectory data from different sessions, 5) individual/group comparisons of trajectory session data, 6) video analysis and editing tools, 7) simulations (e.g., predicting a player's driving distance improvement based upon changing one or more of their swing parameters and 8) entertainment. As an example of entertainment, a player's trajectory average trajectory parameters and variability may be used in trajectory simulations for a video golf game or another game where the parameters have been measured. Two players that have used the system 100 may both enter their parameters and compete against one another in the video game. The player may also use the game to see how they match up against professional or other athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for basketball, comprising:
capturing images of at least a portion of a basketball shot towards a basketball hoop;
identifying by at least one processor the basketball and a hand of a player in the images;
determining locations of the hand in the images during motion of the hand for the basketball shot;
determining by the at least one processor, based on the images and the determined locations of the hand in the images during the motion, at least one location of the basketball in three-dimensional (3D) space relative to the hand of the player in the images;
determining by the at least one processor a trajectory of the basketball in 3D space based on the images;
determining by the at least one processor, based on the determining the locations of the hand in the images during the motion, an extent to which the hand affects the trajectory of the basketball;
providing an output by the at least one processor based on the determined at least one location of the basketball relative to the hand and indicating the extent to which the hand is determined to affect the trajectory of the basketball;
displaying at least a portion of the basketball shot with a display device; and
presenting on a display of the portion of the basketball shot by the display device visual information or graphics based on the determined trajectory, the visual information or graphics based on the extent to which the hand is determined to affect the trajectory of the basketball.

2. The method of claim 1, wherein the displaying comprises rendering an animation of the basketball shot based on the determined trajectory.

3. The method of claim 2, wherein the animation depicts a motion of the basketball along the determined trajectory and a motion of the hand.

4. The method of claim 1, further comprising determining by the at least one processor when the hand exerts a force on the basketball based on the images.

5. The method of claim 4, further comprising calculating by the at least one processor a force vector for the force based on the motion of the hand in the images, wherein the determining the extent to which the hand affects the trajectory of the basketball is based on the force vector.

6. A system, comprising:
at least one camera configured to capture images of at least a portion of a basketball shot towards a basketball hoop;
at least one processor configured to identify the basketball and a hand of a player in the images and determine locations of the hand in the images during motion of the hand for the basketball shot, the at least one processor configured to determine, based on the images and the determined locations of the hand in the images during the motion, at least one location of the basketball in three-dimensional (3D) space relative to the hand of the player in the images and to determine a trajectory of the basketball in 3D space based on the images, the at least one processor configured to determine, based on the motion, an extent to which the hand affects the trajectory of the basketball, the at least one processor further configured to provide an output based on the determined at least one location of the basketball relative to the hand and indicating the extent to which the hand is determined to affect the trajectory of the basketball; and
a display device for displaying at least a portion of the basketball shot,
wherein the at least one processor is configured to control a display of the portion of the basketball shot by the display device such that visual information or graphics is presented on the display based on the determined trajectory, the visual information or graphics based on the extent to which the hand is determined to affect the trajectory of the basketball.

7. The system of claim 6, wherein the at least one processor is configured to control the display by causing the display device to render an animation of the portion of basketball shot based on the determined trajectory.

8. The system of claim 7, wherein the animation depicts a motion of the basketball along the determined trajectory and a motion of the hand.

9. The system of claim 6, wherein the at least one processor is configured to determine when the hand exerts a force on the basketball.

10. The system of claim 9, wherein the at least one processor is configured to calculate a force vector for the force based on the motion of the hand in the images, and wherein the at least one processor is configured to determine the extent to which the hand affects the trajectory of the basketball based on the force vector.

* * * * *